United States Patent
Song et al.

(10) Patent No.: US 6,995,987 B2
(45) Date of Patent: Feb. 7, 2006

(54) DC—DC CONVERTERS PROVIDING REDUCED DEADTIME

(75) Inventors: Wei Song, Boston, MA (US); Yan Zhu, Malden, MA (US); Bradley M. Lehman, Belmont, MA (US)

(73) Assignee: Northeastern University, Boston, MA (US)

( * ) Notice: Subject to any disclaimer, the term of this patent is extended or adjusted under 35 U.S.C. 154(b) by 15 days.

(21) Appl. No.: 10/499,937

(22) PCT Filed: Dec. 27, 2002

(86) PCT No.: PCT/US02/41434

§ 371 (c)(1),
(2), (4) Date: Jun. 23, 2004

(87) PCT Pub. No.: WO03/058800

PCT Pub. Date: Jul. 17, 2003

(65) Prior Publication Data

US 2005/0078491 A1    Apr. 14, 2005

Related U.S. Application Data

(60) Provisional application No. 60/430,585, filed on Dec. 3, 2002, provisional application No. 60/343,607, filed on Dec. 28, 2001.

(51) Int. Cl.
*H02M 3/335* (2006.01)

(52) U.S. Cl. .......................... 363/17; 363/98

(58) Field of Classification Search ............ 363/15–17, 363/97, 98, 131, 132
See application file for complete search history.

(56) References Cited

U.S. PATENT DOCUMENTS

| | | | | |
|---|---|---|---|---|
| 5,255,174 A | | 10/1993 | Murugan | 363/17 |
| 5,963,436 A | * | 10/1999 | Yoshida | 363/17 |
| 6,130,825 A | | 10/2000 | Imamura et al. | 363/17 |
| 6,341,078 B1 | * | 1/2002 | Miller | 363/98 |
| 6,862,195 B2 | * | 3/2005 | Jitaru | 363/17 |

* cited by examiner

*Primary Examiner*—Gary L Laxton
(74) *Attorney, Agent, or Firm*—Weingarten, Schurgin, Gagnebin & Lebovici LLP

(57) ABSTRACT

A DC-DC power converter (100) that provides increased power density, reduced size, and reduced costs of manufacture. The DC-DC power converter (100) includes first and second input terminals (101, 102), a plurality of output terminals (116, 117), and at least one electrical element (108/109) connected to at least one of the first and second input terminals (101, 102). In the event a first voltage is applied across the first and second input terminals (101, 102), the electrical element (108/109) provides a second voltage having a value between the first voltage value and a reference voltage value. The DC-DC power converter (100) further includes a transformer (110) having a primary winding (111) and a secondary winding (112), and a switch assembly (103–107) operatively connected to the first input terminal (101), the second input terminal (102), the electrical element (108/109), and the transformer primary winding (111). In the event the first voltage is applied across the first and second input terminals (101, 102), the switch assembly (103–107) switchably applies the first, second, and reference voltages across the transformer primary winding (111) to generate at least one third voltage across the transformer secondary winding (112). The DC-DC power converter (100) further includes a rectifier (113) connected between the transformer secondary winding (112) and the output terminals (116, 117).

67 Claims, 34 Drawing Sheets

$n_{odd}$ = number of electrical elements (odd)

$n_{even}$ = number of electrical elements (even)

US 6,995,987 B2

DC—DC CONVERTERS PROVIDING REDUCED DEADTIME

CROSS REFERENCE TO RELATED APPLICATIONS

This application claims priority of U.S. Provisional Patent Application No. 60/343,607 filed Dec. 28, 2001 entitled DUAL BRIDGE CONVERTER, and U.S. Provisional Patent Application No. 60/430,585 filed Dec. 3, 2002 entitled THREE-LEVEL FAST TRANSIENT LOW OUTPUT VOLTAGE DC-DC CONVERTERS.

STATEMENT REGARDING FEDERALLY SPONSORED RESEARCH OR DEVELOPMENT

N/A

BACKGROUND OF THE INVENTION

The present invention relates generally to power converters such as DC-DC power converters, and more specifically to DC-DC power converters configured to provide reduced deadtime.

DC-DC power converters are known for converting an input DC voltage into an output DC voltage having a value smaller or larger than the input voltage value, possibly with opposite polarity and/or with isolation of the input and output ground references. DC-DC converters normally accept input energy from a voltage source at a voltage input, and provide converted output energy at a voltage (and current) output, which is usually a filtered output that operates as a voltage sink.

When isolation is employed in a DC-DC converter, the input voltage is typically switched on and off at a high frequency, and provided to a transformer, which provides the input/output isolation and the suitable voltage conversion. However, because the input voltage is switched at the high frequency, the output voltage and current typically cannot be directly provided to a load in a regulated manner. An inductor is generally required in the energy conversion to act as a current filter. The size and value of the inductor are often critical to meeting the performance specifications. A large inductance volume normally reduces the power density of the converter. Further, because inductors with large inductance values have low slew rates, the response time of the converter to load current disturbances is slowed down. Accordingly, smaller inductance volumes and values are desirable.

Isolated DC-DC converters typically operate with at least some amount of deadtime. For example, a conventional full-bridge converter has deadtime during its operation. Besides preventing switches in the same leg of the converter from conducting simultaneously, this deadtime allows conventional dual-end (e.g., half-bridge, full-bridge, push-pull, etc.) converters to have a regulated output voltage when the input voltage changes.

During the deadtime, the energy into the input is discontinuous, causing a large input current ripple. Large input filters are therefore employed to satisfy conducted Electromagnetic Compatibility (EMC) requirements. This deadtime also necessitates a large output inductor to smooth the output voltage, and to limit the current ripple through it. However, the large output inductor slows the output response time. The volume of the output inductor also takes up valuable board space. Further, as the length of the deadtime increases, the size of the output inductor often increases. Because of this deadtime, simple self-driven synchronous rectification schemes typically cannot be used to achieve high efficiency of power conversion in low voltage, high current output DC-DC converter applications.

Certain topologies produce little or no deadtime, which means that energy is continuously transmitted from the input DC source to the output load during the entire switching period. Other topologies may provide a reduced deadtime. Because the input and output current ripples are generally lower in DC-DC converters having reduced or no deadtime, the input filter is generally smaller. Further, the lower output inductance value improves the output transient speed and reduces the output filter size, thereby improving the power density and output transient response of DC-DC converter. Moreover, the peak to peak voltage ripple across the inductor generally decreases, which allows a reduced inductor volume. Conventional techniques for reducing deadtime include magnetic transformer tapping, and two transformer implementations. However, magnetic transformer tapping typically has manufacturability problems, which can lead to difficulties in transformer operation such as high leakage inductance or magnetic flux imbalance. In addition, the extra switches employed in magnetic transformer tapping can increase losses. Further, the two transformer implementation typically requires an additional magnetic core, which takes up valuable board space. The power density of such conventional DC-DC converter implementations may also be reduced.

Accordingly, there is a continuing need to develop and improve DC-DC converters that operate with reduced or no deadtime.

BRIEF SUMMARY OF THE INVENTION

In accordance with the present invention, DC-DC power converters are disclosed that provide increased power density, reduced size, and reduced costs of manufacture. Benefits of the presently disclosed DC-DC power converters are achieved at least in part by reducing or eliminating the amount of deadtime during power converter operation.

In one embodiment, a DC-DC power converter includes first and second input terminals, a plurality of output terminals, and at least one electrical element connected to at least one of the first and second input terminals. The electrical element is operative, in the event a first voltage is applied across the first and second input terminals, to provide a second voltage having a value between the first voltage value and a reference voltage value. The DC-DC power converter further includes a transformer having at least one primary winding and at least one secondary winding, and a switch assembly having a plurality of switching elements operatively connected to the first input terminal, the second input terminal, the electrical element, and the transformer primary winding. The switch assembly is operative, in the event the first voltage is applied across the first and second input terminals, to switchably apply the first voltage, the second voltage, and the reference voltage, across the transformer primary winding to generate at least one third voltage across the transformer secondary winding. The DC-DC power converter further includes a rectifier connected between the transformer secondary winding and the output terminals.

In a second embodiment, a DC-DC power converter includes a switch assembly, and a second DC-DC power converter operatively connected to the switch assembly. The switch assembly includes first and second input terminals, first and second output terminals, and at least one electrical element connected across the first and second input terminals. The electrical element is operative, in the event a first voltage is applied across the first and second input terminals, to provide a second voltage having a value between the first voltage value and a reference voltage value. The switch assembly further includes a switch subassembly having a plurality of switching elements. The switch subassembly is operatively connected to the first input terminal, the second input terminal, and the electrical element. Further, the switch subassembly is operative, in the event the first voltage is applied across the first and second input terminals, to switchably apply the first voltage, the second voltage, and the reference voltage across the first and second output terminals. The second DC-DC power converter is operatively connected to the first and second output terminals of the switch assembly, and configured to receive the first voltage, the second voltage, and the reference voltage applied across the first and second output terminals of the switch assembly, and to generate at least one third voltage.

By applying the above-described first voltage having a maximum value less than or equal to two times the first voltage minimum value, while operating the respective switching elements according to at least one predetermined duty ratio, the DC-DC power converter can be made to operate with no deadtime. Further, by applying the first voltage having a maximum value greater than two times the first voltage minimum value, while operating the respective switching elements according to at least one predetermined ratio, the DC-DC power converter can be made to operate with a predetermined amount of deadtime.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 3a is a schematic diagram of a first alternative embodiment of the converter of FIG. 1;

FIG. 3b is a timing diagram illustrating circuit waveforms produced by the converter of FIG. 3a;

DETAILED DESCRIPTION OF THE INVENTION

U.S. Provisional Patent Application No. 60/343,607 filed Dec. 28, 2001 entitled DUAL BRIDGE CONVERTER, and U.S. Provisional Patent Application No. 60/430,585 filed Dec. 3, 2002 entitled THREE-LEVEL FAST TRANSIENT LOW OUTPUT VOLTAGE DC-DC CONVERTERS, are incorporated herein by reference.

DC-DC power converters are disclosed that provide increased power density, reduced size, and reduced costs of manufacture. The presently disclosed DC-DC power converters are configured to substantially reduce or eliminate the amount of deadtime occurring during power converter operation.

Figure 1:
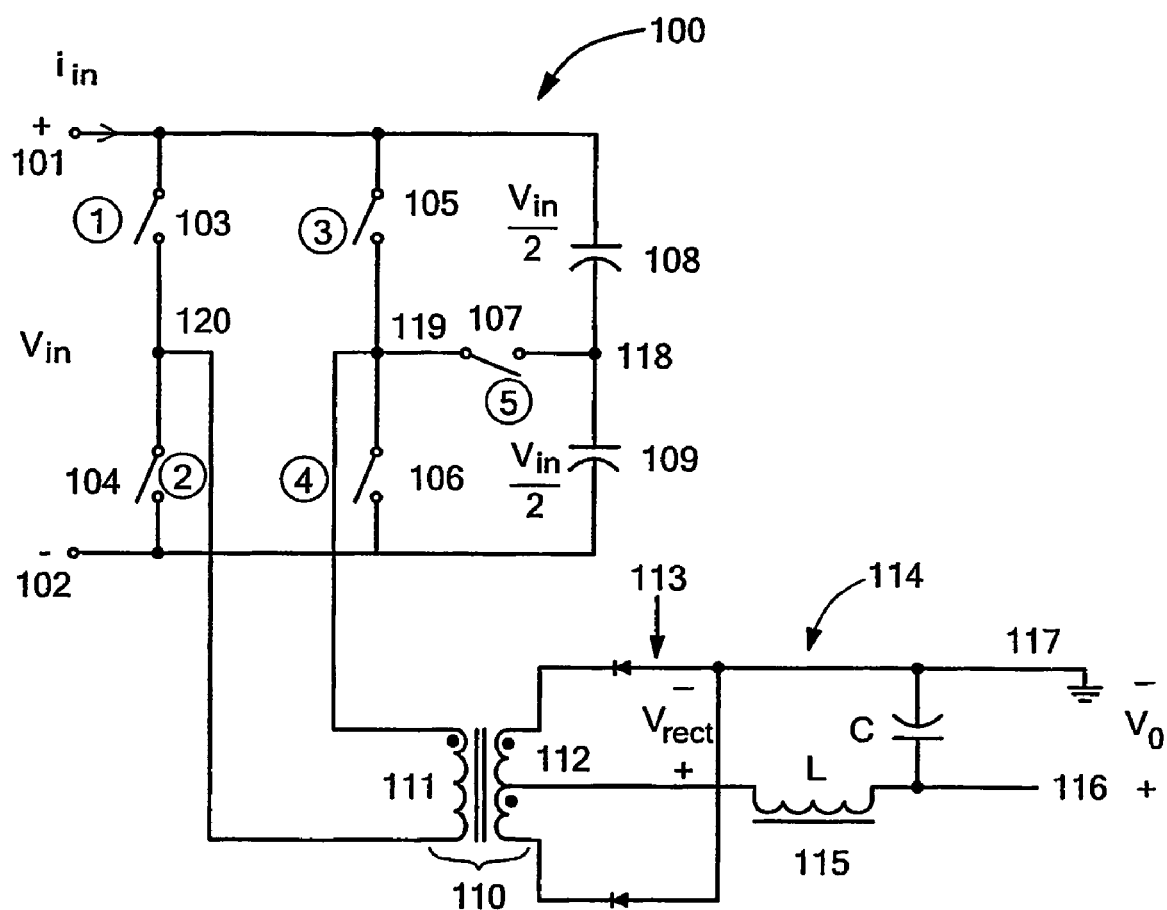
FIG. 1 is a schematic diagram of a full-bridge DC-DC converter according to the present invention.

FIG. 1 depicts an illustrative embodiment of a DC-DC power converter 100, in accordance with the present invention. In the illustrated embodiment, the converter 100 comprises a full-bridge converter including a plurality of switching elements 103–107. The switching elements 103–104 are connected in series across input terminals 101–102, and form a node 120. The switching elements 105–106 are also connected in series across the input terminals 101 and 102, and form a node 119. The converter 100 further comprises a transformer 110 having a primary winding 111 and a secondary winding 112, and electrical elements 108–109. The primary transformer winding 111 is connected across the nodes 119–120. The electrical elements 108–109 are connected in series across the input terminals 101–102, and form a node 118. The switching element 107 connects the nodes 118–119. In the presently disclosed embodiment, the electrical elements 108–109 comprise respective capacitors. It is understood, however, that the electrical elements 108–109 may alternatively comprise respective batteries, DC-DC converters, or any other suitable electrical and/or electronic components or devices.

It is noted that the phrase "switching element" is employed herein to represent one or more electronic components (e.g., switching transistors and diodes) that (1) when turned "on", allow current to pass in one or two directions, and (2) when turned "off", block current in at least one direction. Any suitable combination of switching elements such as transistors or diodes may be employed to achieve the desired switching operation. For example, a diode is a switching element that carries current in one direction, and blocks current in the opposite direction. A Field Effect Transistor (FET) carries current in both directions when turned on, but blocks current in only one direction when turned off. Two FETs connected in series, with the source of the first FET connected to the source of the second FET, can carry or block current in either direction. A diode in series with a FET can carry current in one direction, and block current bi-directionally. Other suitable switching elements (e.g., Silicon Controlled Rectifiers (SCRs), TRIACS, thyristors, etc.) and combinations thereof may also be employed. The diode is a two terminal device that does not use a separate control signal to determine its switching action. Other switching elements such as FETs are three terminal devices that employ a control signal to determine the timing for turning the element on and off. The choice of which switching elements or combinations thereof to use is generally determined by the conducting, blocking, turn-on, and turn-off requirements of the switching element within the target circuit application.

As shown in FIG. 1, the DC-DC converter 100 further includes a rectifier 113 and a filtering circuit 114, which in the illustrated embodiment comprises a low pass filter. The voltage across the secondary winding 112 is applied to the rectifier 113 to obtain a rectified voltage $V_{rect}$, which is then applied to the filtering circuit 114. The output voltage of the converter 100 is the filtered output voltage $V_o$ taken across nodes 116–117. It is noted that all of the components of the converter 100 of FIG. 1, including the switching elements 103–107, are considered to be ideal components for clarity of discussion.

FIG. 1 depicts one center tapped secondary winding 112 of the transformer 110 connected to the two-diode full wave rectification circuit 113. This is a preferred approach among several possible approaches that may be used to obtain the rectified voltage $V_{rect}$. In alternative embodiments, other approaches may be employed including, but not limited to, a secondary winding that is not center tapped with four-diode bridge rectification, or a secondary winding that is not center tapped with one-diode half wave rectification. Accordingly, the converter 100 may employ any suitable technique for connecting the transformer secondary winding 112 (e.g., center tapped or not center tapped) to the rectification circuit 113 (e.g., half wave, full wave, bridge, or any other suitable rectification type).

Specifically, when the switching element 107 is open, the converter 100 operates as a full bridge converter. When the switching element 107 is closed, and the switching element 106 is open, the voltage at the node 118 is approximately equal to the voltage across the capacitor 109. In this configuration, it is possible to create a voltage across the primary winding 111 having a value between $V_{in}$ and 0 volts. In the illustrated embodiment, the voltage across the capacitor 108 is equal to the voltage across the capacitor 109. The voltage at the node 119 is therefore approximately equal to one half of the input voltage (i.e., $V_{in}/2$). It is noted that in a conventional full bridge converter, the voltage across the primary transformer winding switches between $V_{in}$ and 0 volts. It is possible to operate the converter 100 when these voltages are not equal, provided that the operation maintains an AC signal on the transformer 110 with no sustainable DC component.

Figure 2:
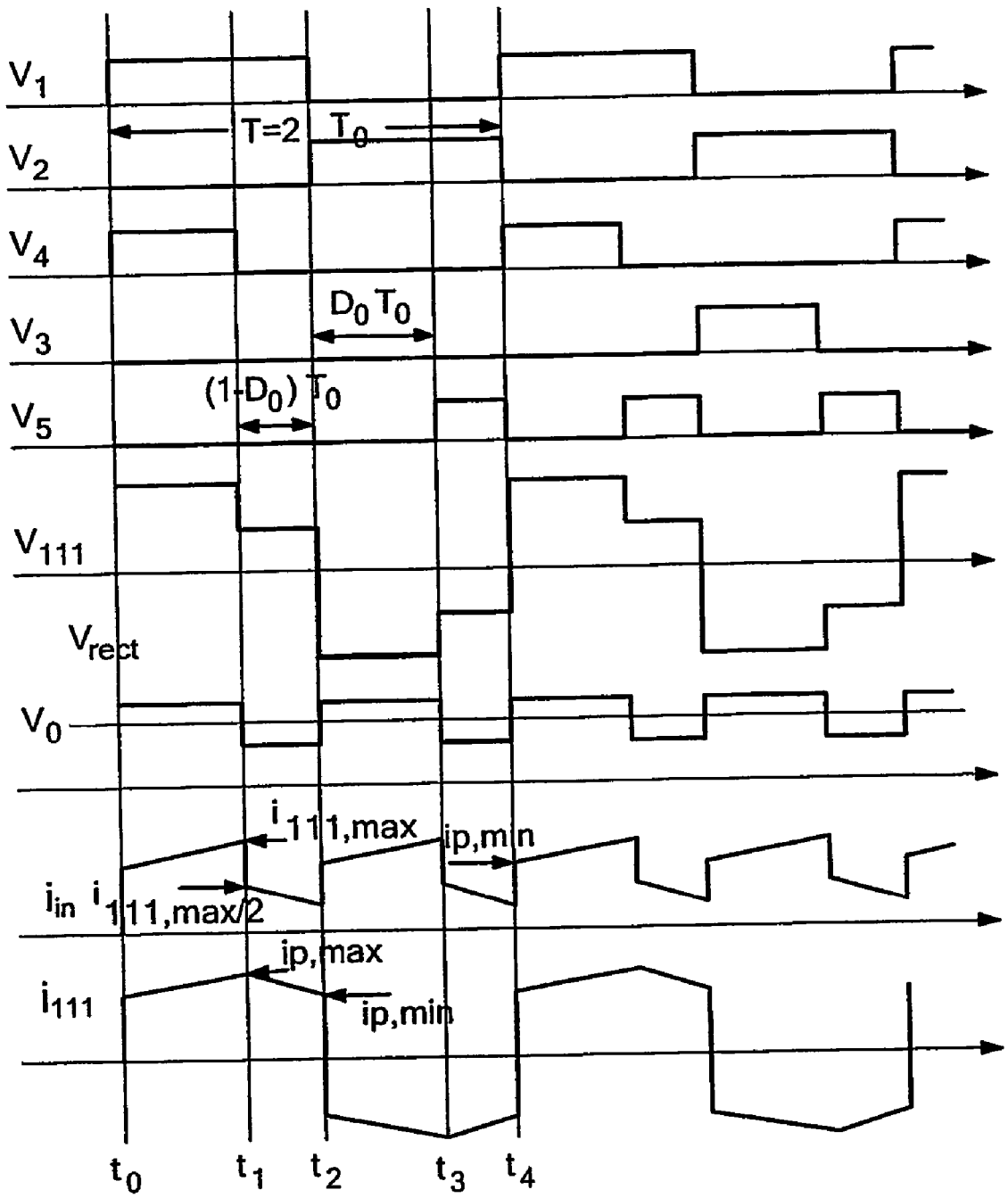
FIG. 2 is a timing diagram illustrating circuit waveforms produced by the converter of FIG. 1.

FIG. 2 depicts illustrative circuit waveforms for the DC-DC converter 100 (see FIG. 1). In the illustrated embodiment, a signal $V_1$ controls the switching element 103. Specifically, when $V_1$ is a high voltage level, the switching element 103 is closed, and current passes through the switch 103. When $V_1$ is a low voltage level, the switching element 103 turns off and blocks the current. In a similar manner, a signal $V_2$ controls the switching element 104, a signal $V_3$ controls the switching element 105, a signal $V_4$ controls the switching element 106, and a signal $V_5$ controls the switching element 107.

In the presently disclosed embodiment, the signals $V_1$ and $V_2$ depicted in FIG. 2 are two 50% duty ratio complementary control signals with a switching frequency f. The signals $V_3$ and $V_4$ are control signals with a duty ratio of D, and a switching frequency f. The signal $V_5$ drives the switching element 107 at an operating frequency of $f_0=2f$. It is noted that the switching element 107 is turned on when both of the switching elements 105–106 are turned off.

For example, suppose that the DC-DC converter 100 operates in steady state, and its output inductor current is in the continuous conduction mode. As shown in FIG. 2, from time to to $t_1$, $V_1$ and $V_4$ are both high voltage levels, and therefore the switching elements 103 and 106 are both turned on. Further, the voltage $V_{111}$ of the transformer primary winding 111 is approximately equal to the input voltage $V_{in}$. During the time $t_0$ to $t_1$, the input current $i_{in}$, which is approximately equal to the primary winding current $i_{111}$, increases until it reaches $i_{111,max}$ at time $t_1$.

From time $t_1$ to $t_2$, $V_4$ is a low voltage level and $V_5$ is a high voltage level, and therefore the switching element 106 is off and switching element 107 is on. Further, the primary winding voltage $V_{111}$ is approximately equal to $V_{in}/2$, and the input current $i_{in}$ decreases from $i_{111,max}/2$. In addition, the current $i_{111}$, which decreases from $i_{111,max}$, is supplied by $i_{in}$, the discharging current of the capacitor 108, and the charging current of the capacitor 109.

From time $t_2$ to $t_3$, because $V_1$ and $V_5$ are low voltage levels, the switching elements 103 and 107 both turn off. In addition, because $V_2$ and $V_3$ are high voltage levels, the switching elements 104–105 turn on. After a short transient time, the primary winding voltage $V_{111}$ is approximately equal to the negative input voltage, $-V_{in}$. Further, the primary winding current $i_{111}$ transitions to a negative current value, specifically, from a current value of $i_{111}=i_{111,min}$ immediately before time $t_2$, to a current value of $I_{111}=-i_{111,min}$ just after time $t_2$. From time $t_2$ to $t_3$, $i_{111}$ changes from $-i_{111,min}$ to $-i_{111,max}$.

At time $t_3$, because $V_3$ is a low voltage level and $V_5$ is a high voltage level, the switching element 105 turns off and the switching element 107 turns on. Further, the primary winding voltage $V_{111}$ is approximately equal to $-V_{in}/2$, and the input current $i_{in}$ is approximately equal to $i_{111,max}/2$. After time $t_3$, the primary winding current changes from $-i_{111,max}$ towards $-i_{111,min}$, reaching $-i_{111,min}$ at time $t_4$. From time $t_3$ to $t_4$, the primary winding current $i_{111}$ is supplied by the input current $i_{in}$, the charging current of the capacitor 108, and the discharging current of the capacitor 109. From time $t_4$, after a very short transient time, $V_{111}$ and $i_{111}$ change polarity, and the process repeats hereafter as described above.

The voltage on the secondary winding 112, i.e., $V_{112}$, is linearly related to the voltage on the primary winding 111, i.e., $V_{111}$, as follows:

$$V_{112} = nV_{111}, \qquad (1)$$

in which "n" is the turns ratio $n=n_{112}/n_{111}$, $n_{112}$ is the number of secondary windings, and $n_{111}$ is the number or primary windings. The secondary winding voltage $V_{112}$ is rectified, and depicted as $V_{rect}$ in FIG. 2. Assuming ideal rectification, $V_{rect}$ is approximately equal to the absolute value of the primary winding voltage $V_{111}$ times the turns ratio n. Further, the average value of $V_{rect}$ is approximately equal to the DC output voltage $V_o$ after it is sent through the filter 114.

When the DC-DC converter 100 operates in the above-described manner, the converter 100 is in a "no deadtime" operational mode. That is, at any given time, energy is being transmitted from the input source to the output load (note that the switching transient time is negligible compared to the cycle time of operation). In this case, $V_{rect}$ switches between $nV_{in}$ and $(n/2)V_{in}$. The output voltage is regulated by controlling the length of time $V_{rect}$ is at the value $nV_{in}$, versus the length of time $V_{rect}$ is at the value $(n/2)V_{in}$. If the switching period of the Pulse Width Modulated (PWM) driving signals for the switching elements 103–107 is equal to $2T_0$, then the duty ratio is equal to $D_0=(t3-t2)/T0$, which is indicative of the conduction time of the switching element 105. The duty ratio has a value between 0 and 1 (equivalently referred to as being between 0% and 100%). The complementary duty ratio, $1-D_0$, is indicative of the conduction time of the switching element 107. Changing the value of $D_0$ changes the average value of $V_{rect}$, so that $$V_0 = nV_{in}(1+D_0)/2. \qquad (2)$$

From equation (2), it can be seen that to maintain the property of no deadtime operation, the input voltage $V_{in}$ is limited within a 2:1 voltage range. If the input voltage range is less than 2:1, then the transformer turns ratio n assures that the output voltage $V_o$ can be achieve at both the low and high line input, subject to the constraint that the duty ratio is a nonnegative number less than 1.

For example, suppose that $V_{inmax}=2V_{inmin}$. The turns ratio n is then selected so that at $V_{inmax}$, $D_0=0$. Thus, $n=2Vo/V_{inmax}$. In this case, when the input DC voltage is equal to $V_{inmin}$, the converter 100 operates as a full-bridge converter with equal conduction time for the switching elements in the full bridge, i.e., the switching elements 103–106 each have a 50% duty ratio. The duty ratio of the switching element 107 is 0 (i.e., the switching element 107 is off during the entire period T). When the input DC voltage is $V_{inmax}$, the switching elements 105–106 each have a duty ratio equal to 0, while the duty ratio of the switching element 107 is 100% (i.e., the switching element 107 turns on during the period T). In these two situations, the voltage across the filter inductor 115 is equal to zero, and the ripple current through the inductor 115 is equal to zero. When the input voltage $V_{in}$ changes between $V_{inmin}$ and $V_{inmax}$, the duty ratio of the switching elements 105–106 change between 50% and 0, and the duty ratio of the switching element 107 is from 0 to 100%.

In the event the input voltage range is greater than 2:1, at the lower end of the input voltage $V_{in}$, the converter 100 can operate in the full-bridge converter mode. In this mode, the duty ratio of the switching element 107 is 0, and deadtime is used to help regulate the output voltage $V_o$. The switching elements 103–106 therefore have equal duty ratios less than 50%. The switching elements 103 and 106 turn on and off simultaneously. The switching elements 104–105 also turn on and off simultaneously, and do not turn on when the switching elements 103 and 106 are turned on.

At the upper end of the input voltage $V_{in}$, the converter 100 operates as described above for the high input voltage condition. In this mode, the control signals for the switching elements are as depicted in FIG. 2, with the switching element 107 having a duty ratio less than 100%. To maximize the no deadtime operation range, the transformer 110 may be configured so that at the high input voltage, the duty ratio of the switching element 107 is 100%. In this case, the converter 100 loses its no deadtime operation when $V_{in}$ is less than $V_{inmax}/2$. Alternatively, if it is desired to operate the converter 100 at a higher input voltage $V_{in}$, then another mode of operation is to always keep the switching element 107 on, the switching element 105 off, and the switching element 106 off. In this case, the converter 100 operates like a half bridge converter. The switching elements 103–104 have equal duty ratios less than 50%, and are never turned on simultaneously. When the switching elements 103–104 are both turned off, there is no voltage applied to the primary winding 111, and there is deadtime. When the switching element 103 is turned on, the voltage on the primary winding $V_{111}$ is equal to half the input voltage, $V_{in}/2$. When the switching element 104 is turned on, the voltage on the primary winding $V_{111}$ is negative half the input voltage, $-V_{in}/2$. To further increase the input voltage range, it is possible to combine the two deadtime operational modes described above.

The output filter inductance value of a conventional full-bridge converter is determined by the condition that under light load (usually, approximately 5–10% of the full load current), the current through the inductor is kept continuous. Given the same specifications of a conventional full-bridge converter, a comparison can be made between the inductance sizes in the converter 100 and in the conventional full-bridge converter. Specifically, let the parameters for the full bridge converter be denoted by the subscript F. Further, assume the same design specifications for the two converters, i.e., input voltage range $V_{inmax}:V_{inmin}=2:1$, output voltage $V_o$, output current $I_o$, switching frequency f and period T (on output rectification waveforms $f_0=2f$, $T_0=2T$), duty ratio D (i.e., the primary side of the transformer), $D_0=2D$ (i.e., the secondary side of the transformer), and the turns ratio of the output winding to the input winding=n:1.

It should be appreciated that the below analysis is based on idealized converter components.

For the full-bridge converter, $$V_{o,F} = nD_{0,F}V_{in}. \quad (3)$$

The peak-to-peak current on $L_F$ $\Delta i_{L,F}$ for $0 < t < D_{0,F}$ satisfies $$V_{rect,F} - V_0 = L_F \frac{\Delta i_{p,F}}{D_0 T_0} \quad (4)$$

and $$D_{min,F} = V_o/(nV_{in,max}) = V_o/(2nV_{in,min}) = 0.5. \quad (5)$$

Thus, $$\Delta i_{p,F} = \frac{nT_0 V_{in,min}}{L_F} \frac{V_i - V_{in,min}}{V_{in}}, \quad (6)$$

$$\Delta i_{p,F,max} = 0.5 T_0 V_o / L_F \quad (7)$$

For the converter 100, $$V_o = \frac{nV_{in}}{2}(1 + D_0), \quad (8)$$

and the relation between the voltage across and the current through the inductor 115 is $$V_{115} = V_{rect} - V_o = L_{115}\frac{di}{dt} = L_{115}\frac{\Delta i_{L_{115}}}{D_0 T_0}. \quad (9)$$

So, the peak-to-peak inductor $L_{115}$ current is $$\Delta i_{L_{115}} = \frac{D_0 T_0}{L_{115}}(nV_{in} - V_0) = \frac{nT_0}{L_{115}}\frac{1}{V_{in}}(V_{in,max} - V_{in})(V_{in} - V_{in,min}), \quad (10)$$

which has a maximum value $$\Delta i_{L_{115}max} = (\sqrt{2} - 1)^2 \frac{T_0}{L_{115}} V_o. \quad (11)$$

From equations (7) and (11) above for peak-to-peak currents, if the full bridge converter and the converter 100 have the same inductance value $L_{115} = L_F = L$, then $$\frac{\Delta i_{L,F,max}}{\Delta i_{L_{115},max}} = \frac{0.5}{(\sqrt{2}-1)^2} = 2.914. \quad (12)$$

So, when using the same inductor in the output filters, the peak-to-peak current of the converter 100 is only about one-third of that of the conventional full-bridge converter. If the two converters have the same peak-to-peak current value, $$\Delta i_{L,F,max} = \Delta i_{L_{115},max}, \quad (13)$$

then $$L_F = 2.914 L_{115}. \quad (14)$$

In this case, the inductance of the converter 100 is nearly one-third of that of conventional full-bridge converter. It can then be expected that the inductor current $i_{L_{115}}$ has a slew rate approximately three times faster than that of the conventional full bridge converter. Further, the maximum peak-to-peak voltage drop across the inductor $L_{115}$ decreases in comparison to the full-bridge converter. So, the physical size of the inductor core of the converter 100 can be smaller than the size of the core used for the filter inductor of the conventional full-bridge converter.

Figure 3:
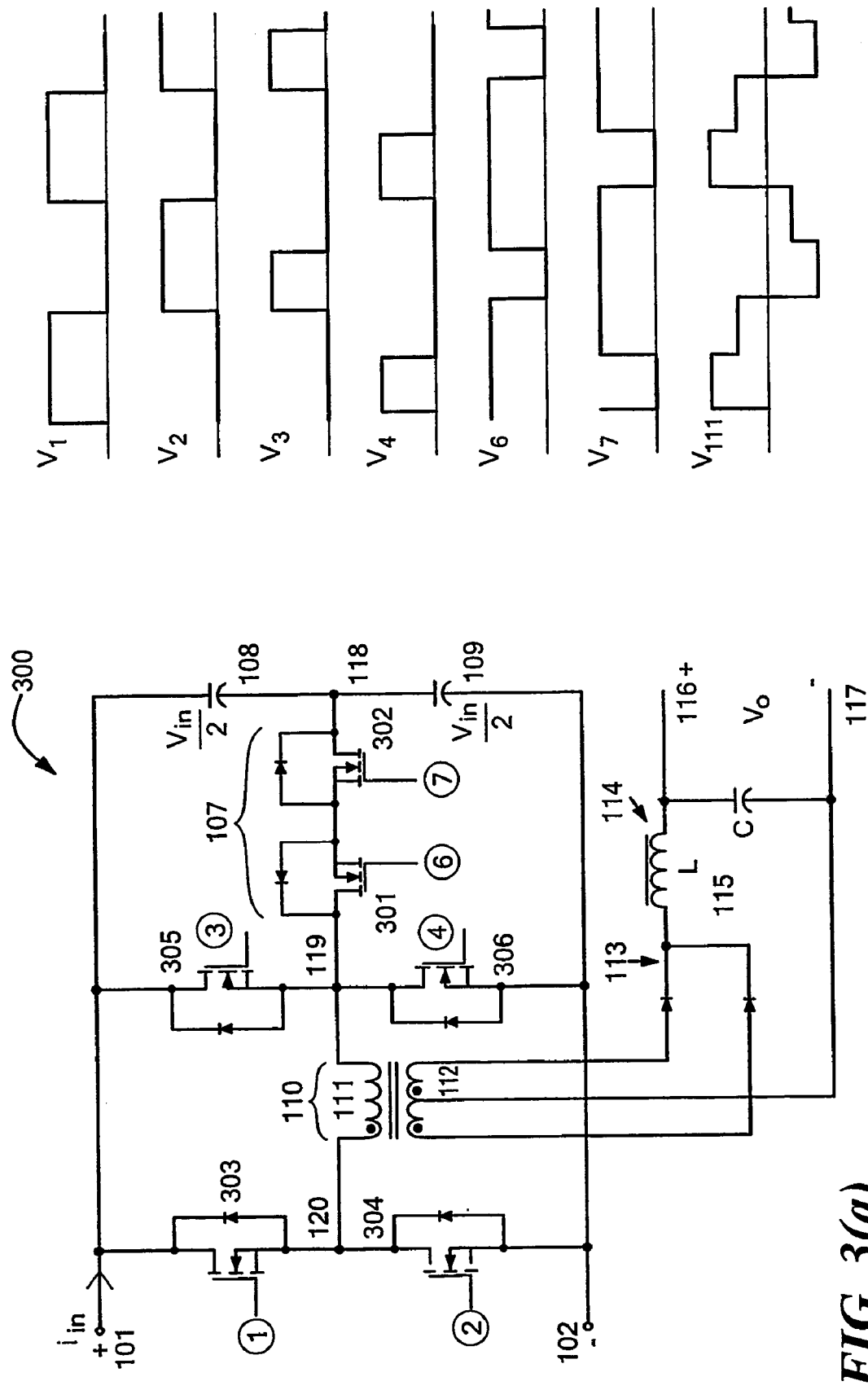

FIG. 3a depicts an alternative embodiment 300 of the DC-DC converter 100 of FIG. 1. It is noted that the ideal switching elements 103–107 of the converter 100 are replaced in the DC-DC converter 300 by non-ideal MOSFET switching elements 303–307, respectively. Each of the MOSFETs 303–307 is depicted in FIG. 3a with its inherent body diode to indicate the direction of its current blocking capability when turned off. It is understood that any other suitable components may be employed for the switching elements 303–307. The DC-DC converter 300 is configured so that the switching element 107 can be controlled bi-directionally. As shown in FIG. 3a, two MOSFETs 301–302 are used to implement the function of the switching element 107. Thus, the switching element 107 is both bi-directional current carrying and bi-directional blocking. The switching elements 303–306 operate at the same frequency. The switching element 303 is off when the switching element 305 is on (see the waveforms for control signals $V_1$ and $V_3$, FIG. 3b). Further, the switching element 304 is off when the switching element 306 is on (see the waveforms for control signals $V_2$ and $V_4$, FIG. 3b). Moreover, the time sequences of the other control signals are essentially the same as described above with reference to FIG. 1. Specifically, when the control signals (i.e., the gate to source voltages) $V_6$ and $V_7$ are both high, the switching elements 301 and 302 both conduct. This permits current to flow between nodes 118 and 119. If either $V_6$ or $V_7$ is a low voltage level, using the timing signals depicted in FIG. 3b, then no current flows between nodes 118 and 119. Therefore, in this illustrative embodiment, $V_5$ of FIG. 2 is mathematically represented by logically ANDing the control signals $V_6$ with $V_7$ of FIG. 3b. As described above with reference to FIG. 1, when $V_1$ is high, the switching element 303 is turned on, and when $V_1$ is low, the switching element 303 is turned off. In a similar manner, $V_2$ controls the switching element 304, $V_3$ controls the switching element 305, and $V_4$ controls the switching element 306.

MOSFETs may be used to form the synchronous rectifier instead of diodes. In this case, self-driven synchronous rectification can simplify the design and improve power efficiency because the waveforms on the transformer windings have no deadtime.

Practical implementations of the presently disclosed DC-DC converter generally have waveforms that depart slightly from the idealized waveforms described above. For example, transient times and overshoots typically occur at the switching element control voltage transitions. Further, rectifier voltage drops typically cause the output voltage levels and the voltage levels at the various nodes to change somewhat from the levels described above, and power efficiency is slightly reduced. However, despite these non-ideal results, the operation of the converter 300 (see FIG. 3a) is essentially the same as that of the converter 100 (see FIG. 1).

If the values of the capacitors 108–109 are selected so that there is non-equal voltage across them, then it is still possible to operate the converter 300. Specifically, the primary transformer winding 311 has approximately zero average voltage across it at each completed switching cycle, or at the end of any other suitable time period. This may be achieved by non-symmetric operation of the converter 300.

For example, with reference to the idealized converter 100 (see FIG. 1), if the capacitor 108 has a higher voltage than the capacitor 109, then the voltage at the node 118, $V_{118}$, becomes less than $V_{in}/2$. When the switching elements 103 and 106 are turned on, the voltage across the primary winding $V_{111}$ is approximately equal to $V_{in}$. Then, the switching element 106 turns off, and the switching element 107 turns on. The voltage across the primary winding 111 changes from $V_{in}$ to $V_{in}-V_{118}>V_{in}/2$. In the negative cycle, the switching elements 103 and 107 turn off. The primary winding voltage $V_{111}$ quickly transitions to a voltage approximately equal to $-V_{in}$. Then, the switching element 108 turns off, and the switching element 107 turns on. The primary winding voltage $V_{111}$ becomes approximately equal to $-V_{118}>-V_{in}/2$. In order to keep volt-second balance on the transformer 110, the average positive voltage on the transformer 110 should be approximately equal to the absolute value of the average voltage on the transformer 110 in the negative cycle. This can be achieved by altering the duty ratio of at least some of the switching elements 103–107. For example, the switching element 107 may turn on longer in the positive cycle than in the negative cycle. Alternatively, the switching element 103 may have a shorter duty ratio than the switching element 102. Deadtime could also be used to create non-symmetric operation. Other methods are also possible. When capacitors are used as the electrical elements 108–109, a practical constraint is that the duty ratios should be selected to give the capacitors 108–109 sufficient time to recharge.

When batteries or other DC-DC converters are used for the electrical elements 108–109, the voltages across the elements 108–109 are essentially constant. In this case, it is not necessary to recharge the electrical elements 108–109. Further, it would not be necessary to apply an input voltage across the input terminals 101–102. For example, in solar arrays, solar cells are typically strung together in series. Such solar cells may be employed for the electrical elements 108–109. Likewise, batteries are frequently strung together. The series combination of such batteries may therefore be taken as the electrical elements 108–109. It should be appreciated that any other suitable electrical elements may be employed. The switching elements 103–106 would be operated so that the average voltage across the transformer 110, over an adequate length of time, is approximately equal to zero.

Figure 4:
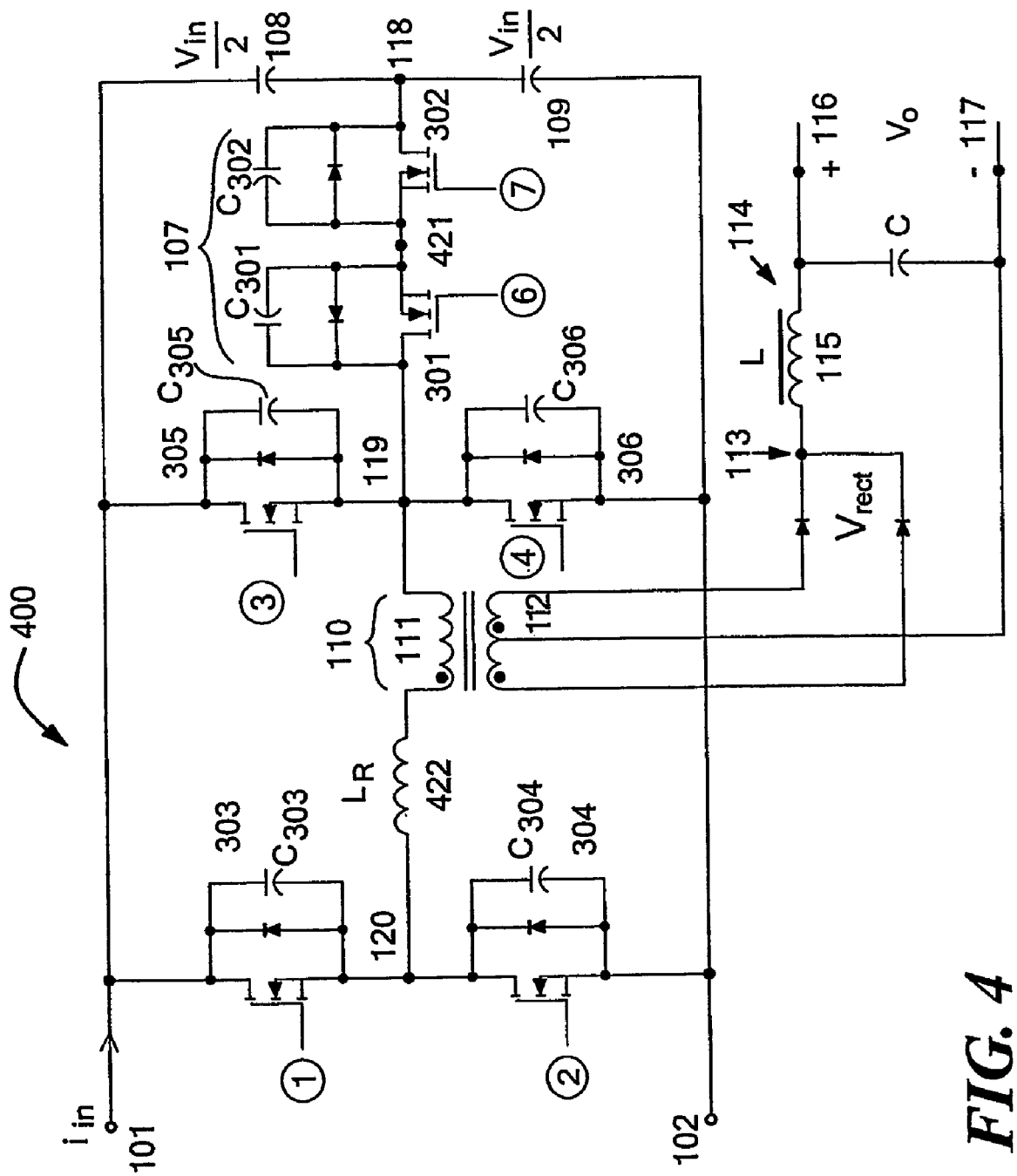
FIG. 4 is a schematic diagram of a second alternative embodiment of the converter of FIG. 1.

FIG. 4 depicts a second alternative embodiment 400 of the DC-DC converter 100 of FIG. 1. In the illustrated embodiment, the DC-DC converter 400 has the Zero Voltage Switching (ZVS) property. Although the control signals $V_1-V_4$ and $V_6-V_7$ of the converter 400 are not phase shift signals, the ZVS property can be obtained via the proper time selection of the control signals $V_1-V_4$ and $V_6-V_7$. The ZVS property for the switching elements 301–302 is realized independently of load condition, whereas for the other switching elements 303–306, it is dependent on the load condition and the circuit parameters (as is generally the case for ZVS realization).

All of the capacitors in parallel with the switching elements 301–306 of FIG. 4 are the output capacitance, $C_{oss}$, of the respective capacitors. The inductor 422, $L_R$, utilized as a resonant inductance in the transient process, may be the leakage inductance of the transformer 110. The inductor 422 may alternatively be an external series inductance added to broaden the ZVS range. The inductor 422 is in series with the primary winding 111, and is shown connected to a first connection of the primary winding 111, but could be connected to the second connection of the primary winding instead.

Figure 5:
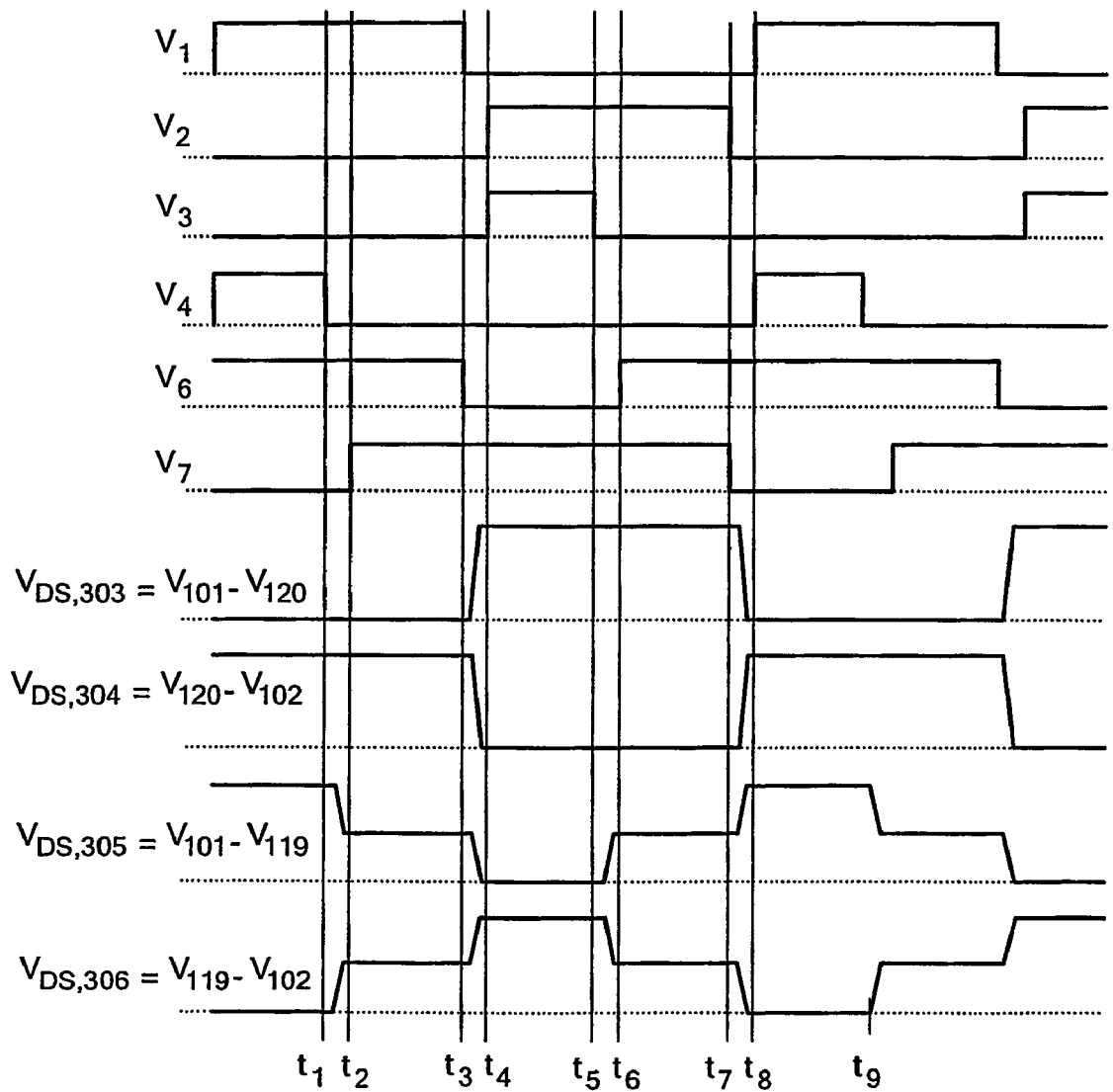
FIG. 5 is a timing diagram illustrating circuit waveforms produced by the converter of FIG. 4.

With reference to FIG. 5, the time sequence from time $t_1$ to $t_9$ is one operation cycle. Consider the time interval $t_1<t<t_2$. With the turn off of switching element 306 at $t_1$, the current through $L_R$, which cannot change instantly, begins to charge $C_{303}$ (see FIG. 4). This makes the drain-source voltage of the switching element 306, $V_{DS,306}=V_{119}-V_{102}$, increase. In the meantime, $C_{305}$ and $C_{302}$ discharge, and the drain-source voltage of the switching element 305, $V_{DS,305}=V_{101}-V_{119}$, and the drain-source voltage of the switching element 302, $V_{DS,302}=V_{118}-V_{421}$, decrease. Note that the drain-source voltage of the switching element 301, $V_{DS,301}=V_{119}-V_{421}$, is zero because it is kept conducting during this period. When the drain voltage $V_{119}$ of the switching element 306 increases to $V_{in}/2$, the body diode of the switching element 302 conducts, and its drain-source voltage $V_{DS,302}$ is clamped to zero. Then, at $t_2$, the switching element 302 is driven on at zero voltage by the control circuit, and takes over the primary current by short circuiting its body diode. The loss-less ZVS of the switching element 302 is realized. The primary voltage during this time changes from $V_{in}$ to $V_{in}/2$. The energy keeps transmitting to the output load with decreased power.

Consider the time interval $t_2<t<t_3$. Both of the switching elements 301–302 are conducting. This is a power conversion stage. The primary current is approximately equal to the reflected secondary inductor current, which is decreasing during this period.

Consider the time interval $t_3<t<t_4$. At time $t_3$, the beginning of this transition interval, the switching elements 303 and 301 are turned off by the control circuit. $C_{303}$, $C_{306}$ and $C_{301}$ are charged, and their drain-source voltages increase. Correspondingly, $C_{304}$ and $C_{305}$ discharge, when the voltage between the nodes 120 and 119 changes from $V_{in}/2$ to zero, then to negative. The secondary side rectifiers commute during this period. The current through LR continues to drive the charging and discharging of the capacitors as described above. After the drain-source voltages of the switching elements 304–305 drop to zero, their source voltages are clamped to ground and $V_{in}$, respectively. Then, the two switches are turned on at zero drain-source voltage by the control circuit.

Consider the time interval $t_4<t<t_5$. At time $t_4$, the switching elements 304–305 are on. The voltage across the primary winding is $V_{in}$, and the current in the primary winding changes to the opposite direction. Power conversion continues at this stage with more power transmitted to output load.

The operation of the converter 400 during the time intervals $t_5<t<t_6$, $t_6<t<t_7$, $t_7<t<t_8$ and $t_8<t<t_9$ is similar to the operation during the intervals described above, with the exception that the charging and the discharging of the capacitors are reversed. It is noted that the converter 400 with the ZVS property can utilize the no deadtime characteristic to easily accomplish self-driven synchronous rectification at the output.

Figure 6:
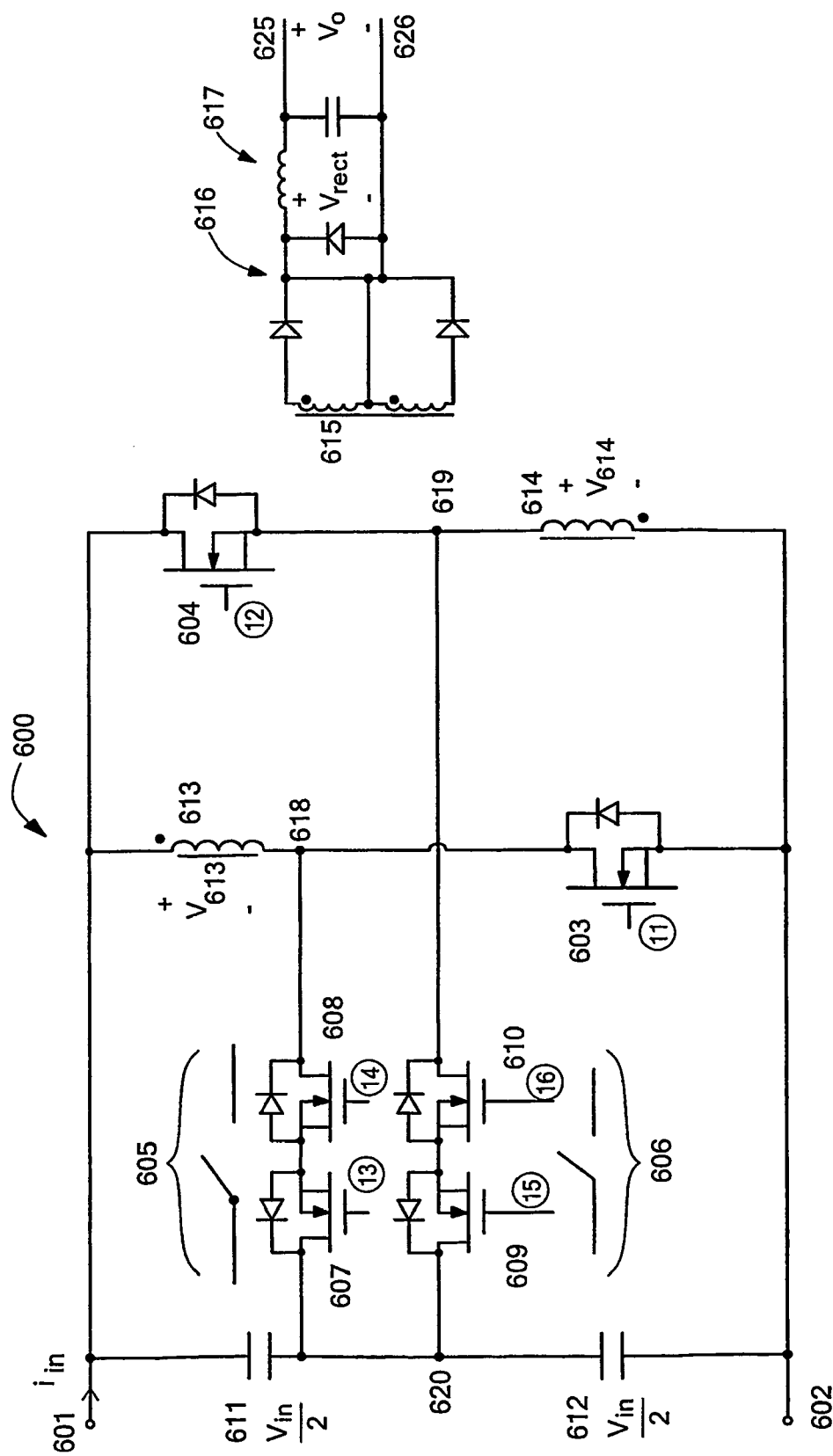
FIG. 6 is a schematic diagram of a third alternative embodiment of the converter of FIG. 1.

FIG. 6 depicts a third alternative embodiment 600 of the converter 100 (see FIG. 1) in a push-pull configuration. The DC-DC converter 600 comprises a push-pull converter including switching elements 603–604, and primary windings 613–614 of a transformer 621. The primary winding 613 and switching element 603 are connected in series across input terminals 601–602 to form a node 618. Further, the switching element 604 and the primary winding 614 are connected in series across the input terminals 601–602 to form a node 619. Moreover, electrical elements 611–612 are connected in series across the input terminals 601–602 to form a node 620. It is noted that the electrical elements 611–612 are depicted as capacitors in the presently disclosed embodiment. It is appreciated, however, that other suitable electrical elements, e.g., batteries, other DC-DC converters, or combinations thereof, may be employed. A switching element 605 connects the nodes 620 and 618, and provides a one-direction current path from the node 618 to the node 620. A switching element 606 connects the nodes 620 and 619, and provides a one-direction current path from the node 620 to the node 619. The switching elements 603–604 are configured as respective MOSFETs, however, any other suitable electrical element may be employed. The switching elements 605–606 may be implemented by any suitable electrical elements that perform one-direction switching. As shown in FIG. 6, the switching element 605 includes two MOSFETs 607–608 in series, and the switching element 606 includes two MOSFETs 609–610 in series. Any other suitable electrical components, e.g., one MOSFET and one diode connected in series to perform one-direction switching, may be employed in place of the serially connected MOSFETs. In the illustrated embodiment, the voltage across the capacitor 611 is equal to the voltage across the capacitor 612. Accordingly, the voltage at the node 620 is approximately equal to one half of the input voltage $V_{in}$.

The voltage across a center-tapped secondary winding 615 is applied to a rectifier 616 to obtain a rectified voltage $V_{rect}$, which in turn is applied to a filter circuit 617 (e.g., a low pass filter). The output voltage is the filtered voltage taken across nodes 625–626.

Figure 7:
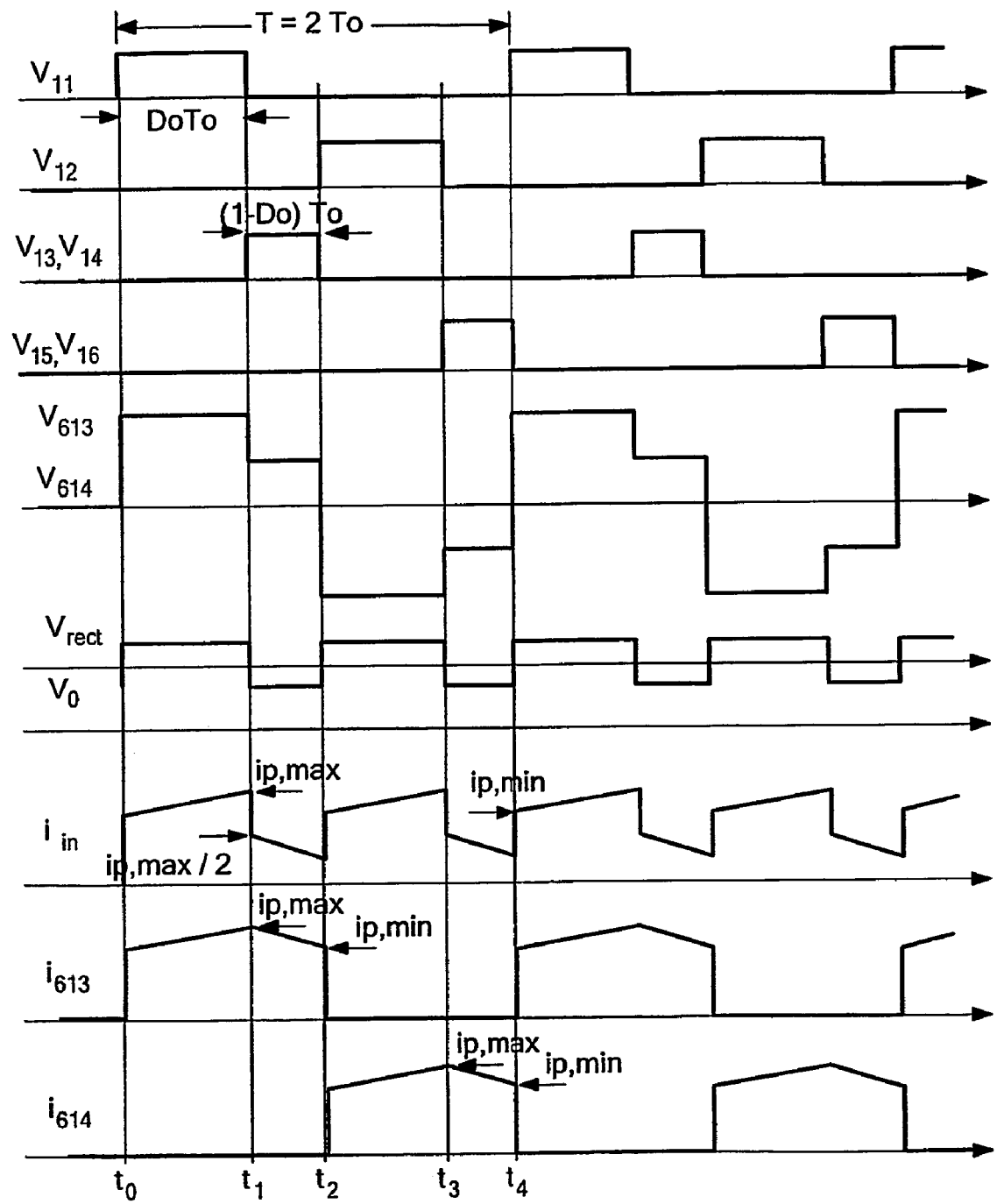
FIG. 7 is a timing diagram illustrating circuit waveforms produced by the converter of FIG. 6.

FIG. 7 depicts illustrative waveforms of the DC-DC converter 600 (see FIG. 6) including idealized components. It should be appreciated that the time sequences of the control signals $V_{13}$, $V_{14}$, $V_{15}$ and $V_{16}$ in FIG. 7 are described herein for purposes of illustration, and that other suitable time sequences are possible. High voltage levels applied to the control signals of the switching elements cause the switching elements to close, and low voltage levels cause the switching elements to open. $V_{11}$, $V_{12}$, $V_{13}$, $V_{14}$, $V_{15}$, and $V_{16}$ are the control signals of the switching elements 603, 604, 607, 608, 609, and 610, respectively. Suppose the converter 600 works in steady state, and its output inductor current is under continuous conduction mode. The dot ends of the windings of the transformer in FIG. 6 refer to as positive.

From time $t_0$ to $t_1$, the switching element 603 is turned on. The voltages $V_{613}$ and $V_{614}$ of the transformer primary windings 613–614 are approximately equal to the input voltage $V_{in}$. During this period, the input current $i_{in}$ increases, and equals the current $i_{613}$ (which is positive from the terminal 601 to the node 618) of the primary winding 613, and reaches to $I_{p,max}$ at time $t_1$.

At time $t_1$, the switching element 603 is off, and the switching element 605 (i.e., the MOSFETs 607–608) is on. The primary winding voltages $V_{613}$ and $V_{614}$ are approximately equal to $V_{in}/2$, and the input current $i_{in}$ decreases from $i_{p,max}/2$. Also, $i_{613}$, decreasing from $i_{p,max}$, is supplied by $i_{in}$, the discharging current of the capacitor 611 and the charging current of capacitor 612. The current $i_{614}$ remains zero.

At time $t_2$, the switching element 605 (i.e., the MOSFETs 607–608) turns off. The switching element 604 turns on. After a short transient time, the voltages $V_{618}$ and $V_{619}$ of the primary windings 618 and 619, respectively, become approximately equal to the negative input voltage, $-V_{in}$. The primary winding current $i_{619}$ (which is positive from the node 619 to the terminal 602) of the primary winding 619 transits from a value of zero immediately before $t_2$, to a value of $i_{p,min}$ just after $t_2$. Meanwhile, $i_{613}$ goes from $I_{p,min}$ to zero. Then, from $t_2$ to $t_3$, $i_{614}$ changes from $i_{p,min}$ to $i_{p,max}$.

At time $t_3$, the switching element 604 turns off, and the switching element 606 (i.e., the MOSFETs 609–610) turns on. Then, the primary winding voltages $V_{613}$ and $V_{614}$ are approximately equal to $-V_{in}/2$. The input current $i_{in}$ becomes approximately equal to $i_{p,max}/2$. After $t_3$, the primary winding current $i_{614}$ changes from $i_{p,max}$ towards $i_{p,min}$, reaching $i_{p,min}$ at $t_4$. From $t_3$ to $t_4$, the primary winding current $i_{614}$ is supplied by the input current $i_{in}$, the charging current of capacitor 611, and the discharging current of capacitor 612. The current $i_{613}$ remains zero. From time $t_4$, after a very short transient time, $V_{613}$ and $V_{614}$ change polarity and the process repeats as described above.

When the converter 600 (see FIG. 6) operates as described above, it is in the no deadtime operation mode. It is noted that the output voltage equations, and the relationship of the output filter inductance to the ripple current passing through the output inductor, for the converter 600 are essentially the same as those described above with reference to the converter 100 (see FIG. 1).

The voltage $V_{rect}$ is the absolute value of the primary winding voltage $V_{613}$ times the transformer turns ratio n. The filtered (i.e., averaged) value of $V_{rect}$ is the output voltage $V_o$. It is possible to regulate the output voltage $V_o$ by controlling the amount of time that $V_{rect}$ has value $V_{in}$ versus value $V_{in}/2$. Because $V_{rect}$ in FIG. 6 is like $V_{rect}$ in FIG. 3a, benefits of the proposed topology, in comparison with conventional push-pull converters include (1) reduced inductor volume, (2) reduced inductance value, and (3) reduced input current-ripple. Further, it is possible to introduce deadtime to regulate the output voltage when input voltage range is greater than 2:1.

By operating the switching elements as described above, the capacitors can charge and discharge on each cycle. Although different operational timing of the switching elements is possible, when capacitors are used for the switching elements, it is important to keep charge balance on the capacitors to maintain constant voltage across the capacitors. If batteries or other suitable electrical elements are employed, this is not a concern.

Figure 8:
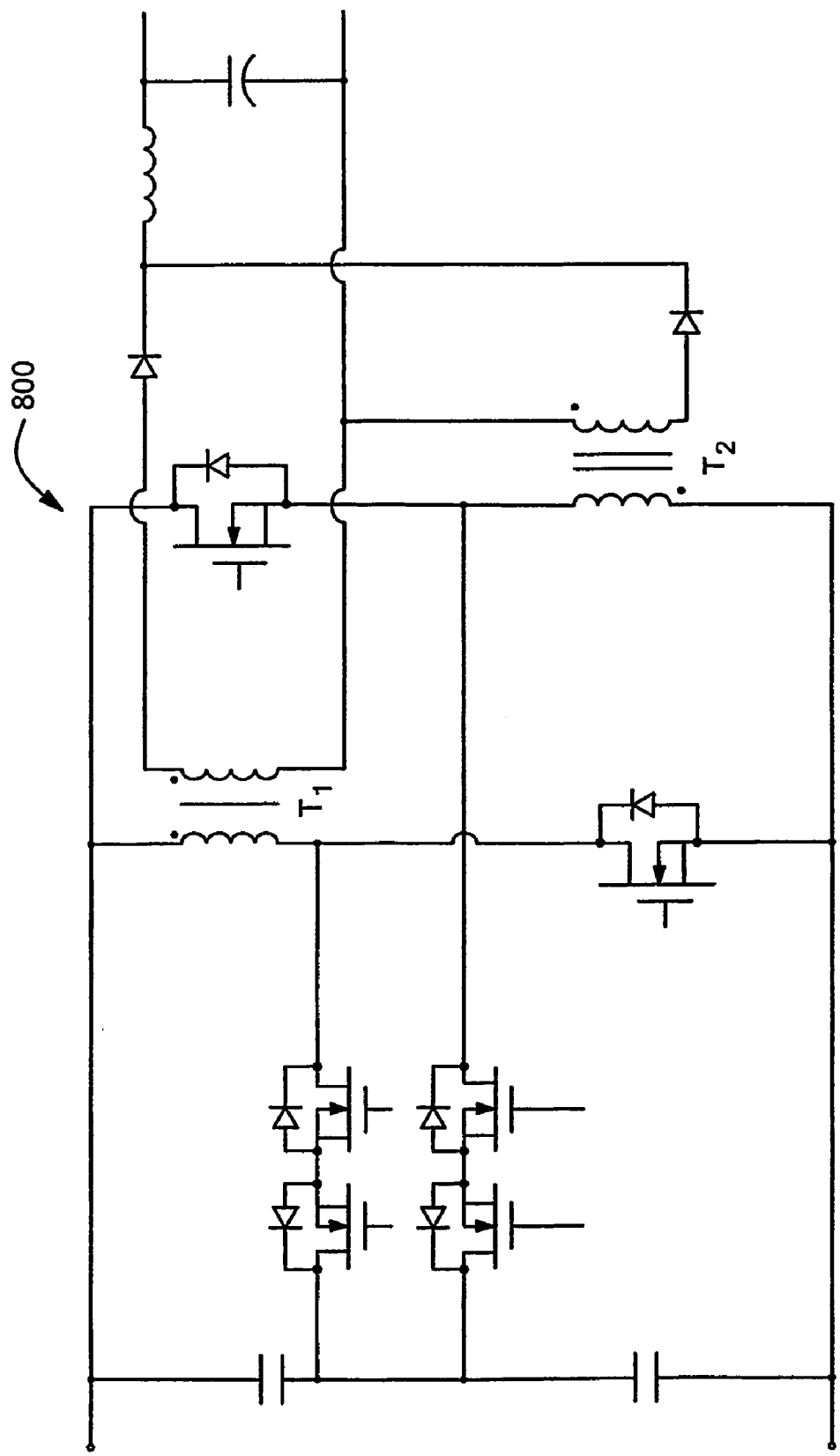
FIG. 8 is a schematic diagram of a fourth alternative embodiment of the converter of FIG. 1.

FIG. 8 depicts a fourth alternative embodiment 800 of the converter 100 (see FIG. 1) in a dual-forward implementation. The DC-DC converter 800 operates in essentially the same manner as the DC-DC converter 600, with the exception that there are two transformers, each with a primary and secondary winding. Further, a transformer reset is employed to maintain flux balance in the core.

Figure 9A:
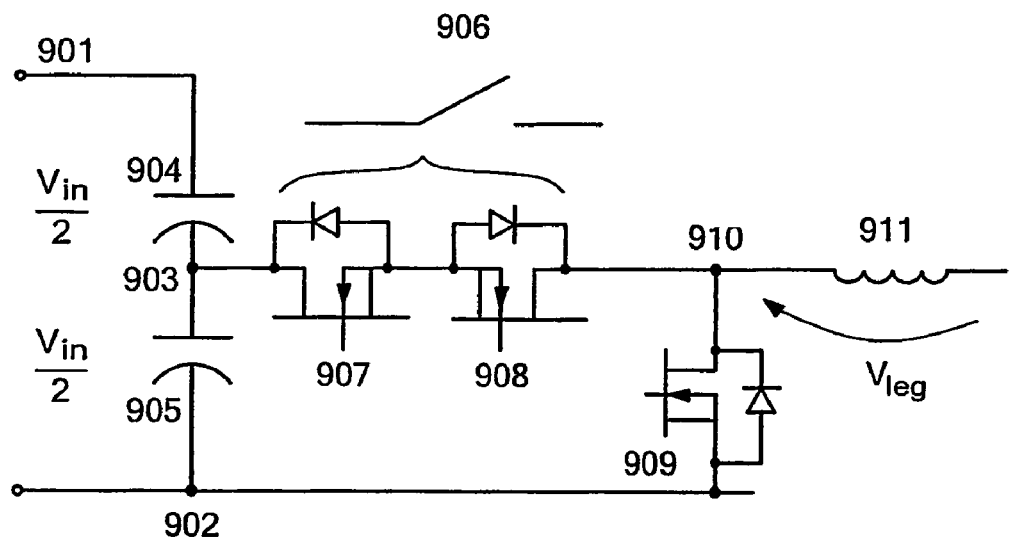
FIGS. 9a–9b are schematic diagrams of electrical components and connections employed in the converters of FIGS. 1, 4, 6, and 8.
Figure 9B:
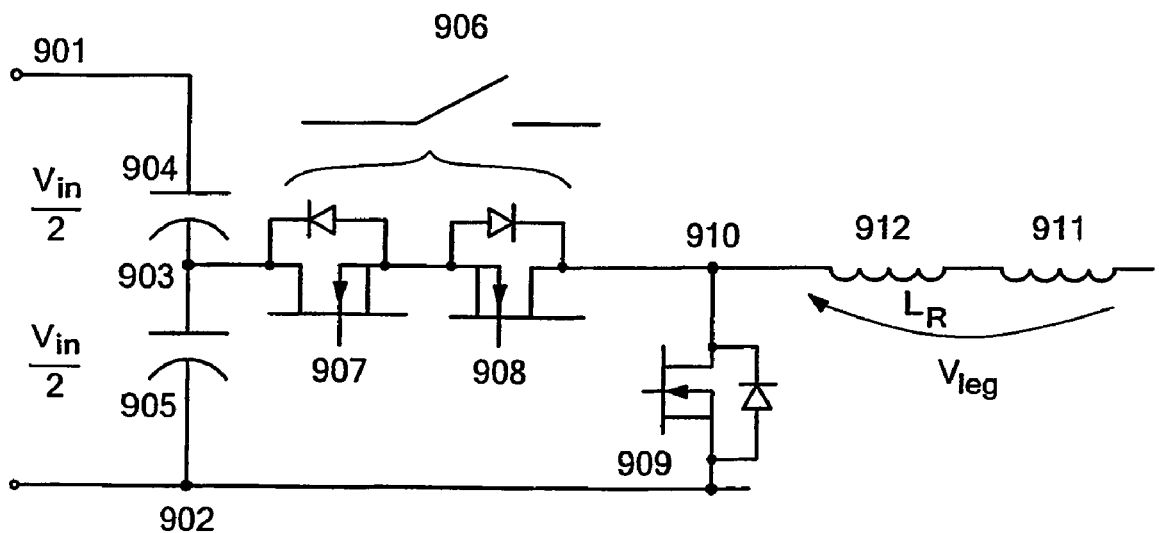

FIGS. 9a–9b depict illustrative electrical components and connections that may be employed in the DC-DC converters 100, 300, 400, 600, and 800. As shown in FIGS. 9a–9b, there are two electrical elements 904–905 connected in series across two input terminals 901 and 902. A node 903 between the electrical elements 904–905 has a voltage, $V_{in}/2$. There is also a primary winding 911. In FIG. 9a, the primary winding 911 has one of its connections coupled to two switching elements 906 and 909. The switching element 909 connects a node 910 to the input terminal 902. The switching element 906 (shown as the serially connected MOSFETs 907–908) connects the node 903 to the node 910. FIG. 9b depicts similar connections, with the exception that the primary winding 911 is in series with a resonant inductor 912, for application in converters having the ZVS property.

In the illustrated embodiment, the switching elements 906 and 909 are not on at the same time. When the switching element 906 is on and switching element 909 is off, the voltage at the node 910 is equal to the voltage at the node 903, i.e., $V_{in}/2$. When the switching element 906 is turned off and the switching element 909 is turned on, the voltage at the node 910 is equal to the voltage at the node 902, which for purposes of illustration is assumed to be ground. Thus, the primary winding 911 has one end connected to the electrical element 905 at $V_{in}/2$ volts, or connected to ground at 0 volts. It is also possible to have both of the switching elements 906 and 909 turned off.

In the event the second connection of the primary winding 911 is connected to the input terminal 901, perhaps via one or more switching elements, then Vleg of FIGS. 9a–9b may be $V_{in}$ or $V_{in}/2$, depending on the control signals of the switching elements. Thus, no deadtime topologies are possible by creating $V_{rect}$ as in FIG. 2. Further, $V_{rect}$ switches from $nV_{in}$ to $nV_{in}/2$. In conventional dual-ended converters, the rectified secondary winding voltage typically switches from $nV_{in}$ to 0 volts.

Figure 10:
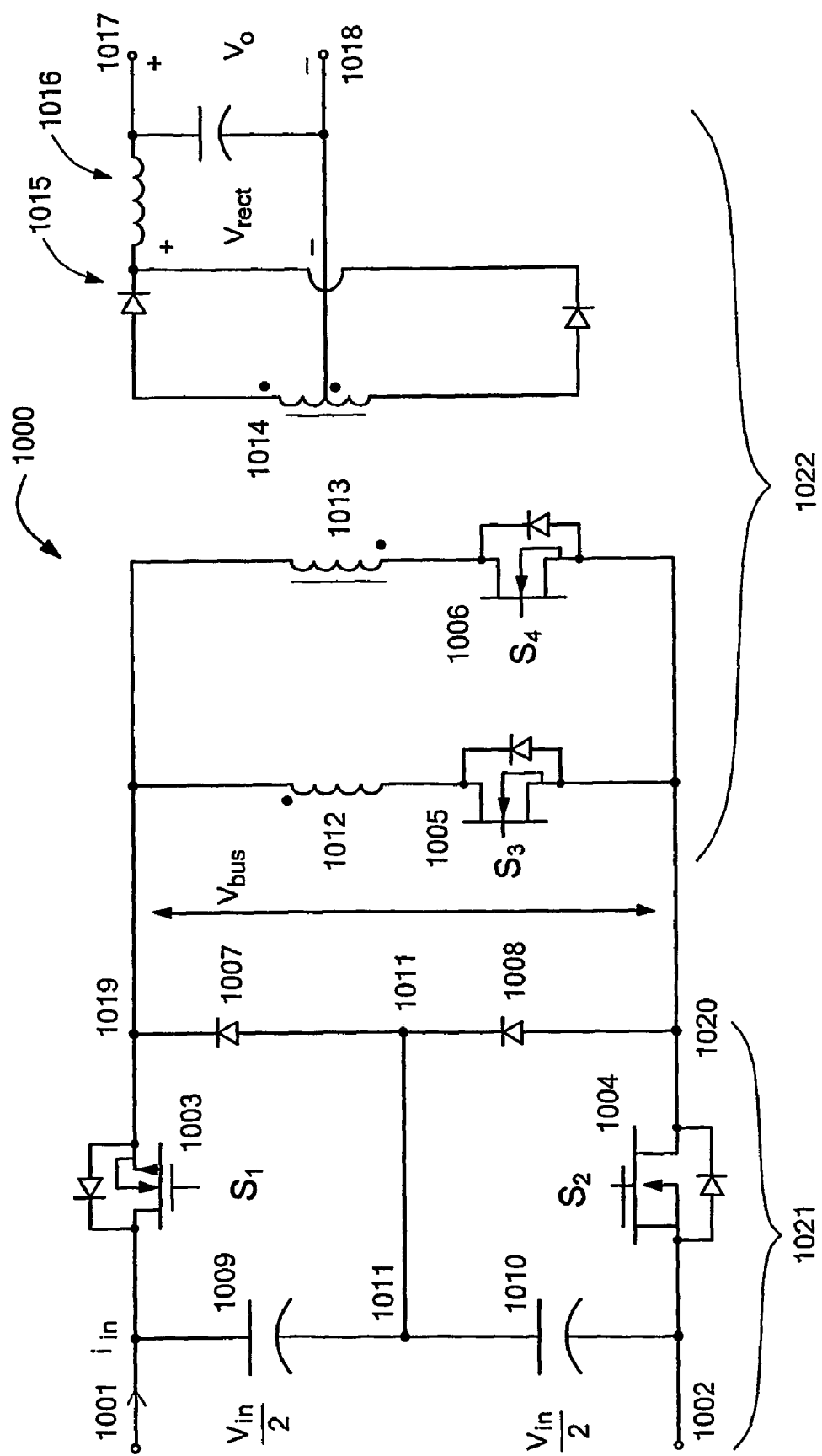
FIG. 10 is a schematic diagram of a push-pull DC-DC converter coupled to a three-level switch cell according to the present invention.

The above description, and the description that follows, are based on ideal operation of the DC-DC converters. If capacitors are used as the electrical elements 904–905, then after a capacitor is discharged, it is subsequently recharged to keep the DC link voltage $V_{903}$ constant. For example, if symmetric operation of a converter is utilized, this would mean that the charge time and the discharge time of each capacitor are the same. This is why in FIG. 6 (see also FIG. 8), the switching element 604 and the primary winding 614 are connected as shown. In a conventional push-pull converter, it is often desirable to connect the sources of the primary switching elements (which in FIG. 6 would be the switching elements 603 and 604). This makes driving the switching elements 603–604 easier because they share the same ground. That is, conventional push-pull configurations would typically connect the first connection of the second primary winding 614 to the first input terminal 601. The switching element 604 would be connected in series with the primary winding 614, so that one connection of the switching element 604 is connected to the second connection of the second primary winding 615, and the second connection of switching element 604 is connected to the second input terminal 602. This configuration is possible for the converter 600 of FIG. 6 (and the converter 800 of FIG. 8) if the electrical elements do not require equal charge and discharge, e.g., if the electrical elements are batteries or other voltage sources. On the other hand, if the electrical elements are capacitors, then additional charge and discharge techniques must be used to supplement the circuit. This is because the capacitor 611 would normally not be recharging. However, the DC-link charge balance voltage problem for the push-pull converter 600 can be corrected by changing the switching element configuration, as depicted in FIG. 10.

The DC-DC converter 1000 (see FIG. 10) comprises the cascade connection of a push-pull DC-DC converter 1022 with a three-level switch cell 1021. The push-pull converter 1022 includes one transformer with two primary windings 1012–1013. A switching element 1005 is in series with the first primary winding 1012, and is connected across input terminals 1019–1020. Similarly, a switching element 1006 is in series with the second primary winding 1013, and is connected across the nodes 1019–1020. In this configuration, it is possible, although not necessary, to have the source of the switching elements 1005–1006 connected, as depicted in FIG. 10. As described above, this makes it simpler to control the turn on and the turn off of these switching elements. As shown in FIG. 10, a secondary winding 1014 is center tapped and connected to a rectifier 1015. It is understood that other suitable secondary winding and rectifier configurations are possible. The rectified voltage $V_{rect}$ is applied to a filter 1016, and the output voltage is taken across terminals 1017–1018.

The three-level switch cell 1021 includes the two input terminals 1001–1002 and two output terminals 1019–1020. The two output terminals of the three-level switch cell 1021 are the two inputs of the push-pull DC-DC converter 1022. Electrical elements 1009–1010 are connected in series across the input terminals 1001 and 1002, forming a DC-link node 1011, which has a voltage of half the input voltage, $V_{in}/2$. A switching element 1003 connects the three-level switch cell input terminal 1001 to the node 1019, which is a first input to the push-pull circuit 1022. Another switching element 1004 connects the three-level switch cell second input terminal 1002 to the node 1020. Diodes are employed as switching elements 1007–1008, which are connected in series across the nodes 1019–1020. As described above, other suitable types of switching elements could be used, provided they have reverse current blocking capabilities. A node 1011 between the two diodes 1007–1008 is the DC-link node.

Figure 11:
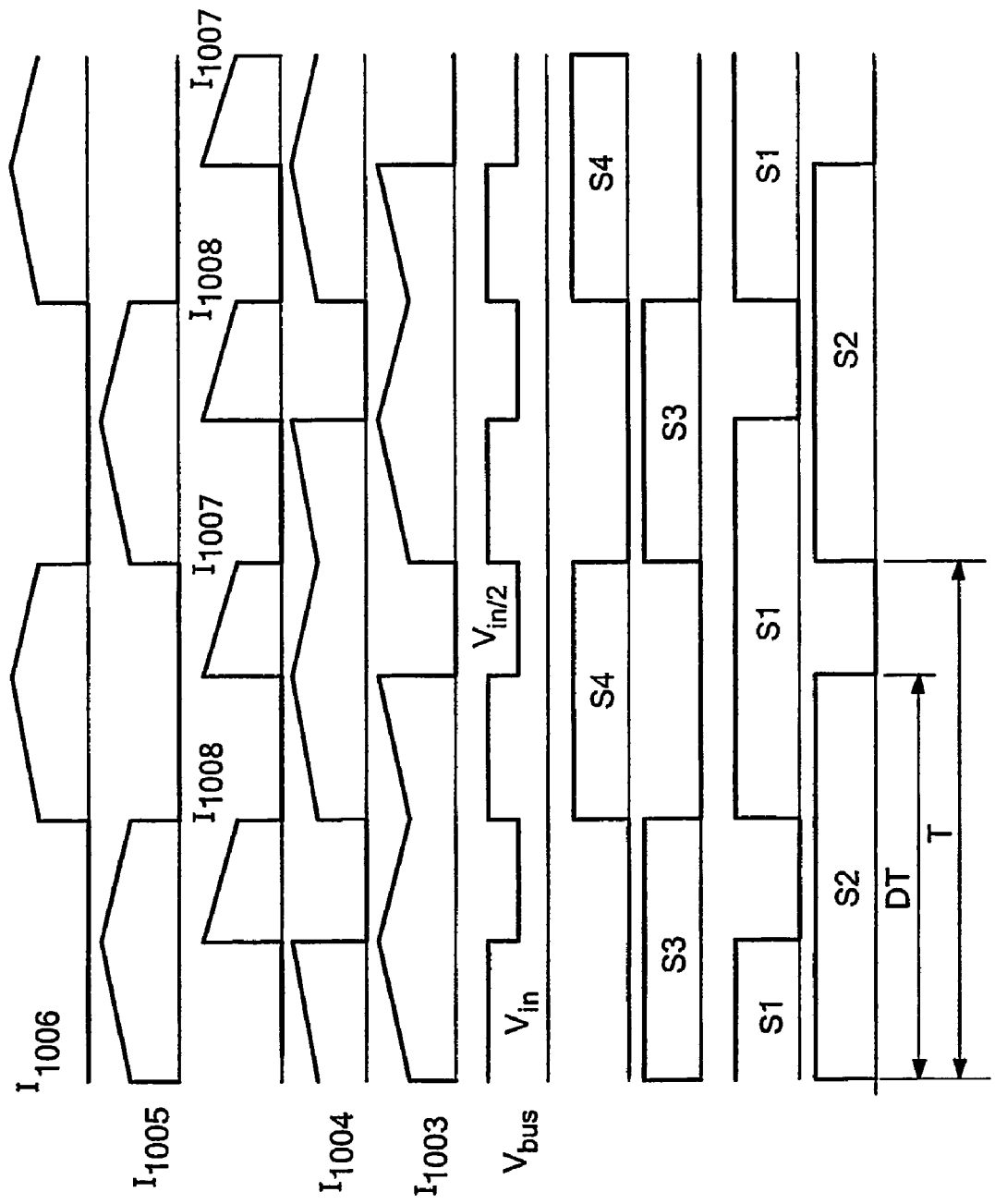
FIG. 11 is a timing diagram illustrating circuit waveforms produced by the converter of FIG. 10.

The converter 1000 operates with no deadtime provided that the input voltage range is within 2:1. Otherwise, deadtime is used for regulation of the output voltage. For purposes of illustration, it is assumed that the input voltage range is less than 2:1. FIG. 11 depicts illustrative circuit waveforms for the converter 1000. A signal $S_1$ controls the switching element 1003. When $S_1$ is a high voltage level, the switching element 1003 is turned on. When $S_1$ is a low voltage level, the switching element 1003 is turned off. Similarly, a signal $S_2$ controls the switching element 1004, a signal $S_3$ controls the switching element 1005, and a signal $S_4$ controls the switching element 1006.

As shown in FIG. 11, the switching elements 1005–1006 are turned on complimentarily with 50% duty cycle. The switching elements 1003–1004 have the same duty ratio, and operate at the same switching frequency as the switching elements 1005–1006. Regulation of the output voltage is achieved by adjusting the duty ratios of the switching elements 1003–1004. When $S_1$ and $S_2$ are both high, the switching elements 1003–1004 are both turned on. Full input voltage is applied to the push-pull converter 1022 because $V_{bus}=V_{in}$. Assume that $S_4$ is high, also, and therefore $S_3$ is low. Then, the switching element 1006 is on, and the switching element 1005 is off. Full input voltage is applied to the second primary winding 1013, and the input current equals the second primary winding current $I_{1013}$. No current passes through the diodes 1007 and 1008. After this, $S_2$ goes to a low voltage level. Further, $S_1$ and $S_4$ remain high, while $S_3$ remains low. The switching element 1004 turns off and blocks current (the body diode of the MOSFET 1004 also blocks current). Current is diverted through the diode 1008. The DC link voltage at the node 1011 is $V_{in}/2$, and therefore the voltage at the node 1020 becomes ideally $V_{in}/2$. Hence, after a short transition time, $V_{1020}$ changes from 0 volts to $V_{in}/2$ when the switching element 1004 turns off, and subsequently, $V_{bus}$ changes from $V_{in}$ to $V_{in}/2$. The primary winding current $i_{1013}$ is supplied by the discharging capacitor current $i_{1009}$, and by the charging capacitor current $i_{1010}$. The input current is equal to charging capacitor current $i_{1010}$.

The next half cycle of operation is symmetric to that described above. From $S_1$, $S_4$ high and $S_2$, $S_3$ low, the next state is to turn $S_4$ low, turn $S_3$ high, and turn $S_2$ high. $S_1$ remains high. Because both $S_1$ and $S_2$ are high, the switching elements 1003 and 1004 are on. Switching elements (i.e., the diodes) 1007–1008 are off, and $V_{bus}$ is equal to the input voltage $V_{in}$. Current flows through the first primary winding 1012 from the node 1019 into the switching element 1005, and is equal to the input current, $i_{in}$. No current flows through the primary winding 1013 (after a short transition time). In the next state, $S_1$ turns off. The switching element 1003 turns off and blocks current (the body diode of the MOSFET 1003 also blocks current). Current is diverted through the diode 1007 from the input node 1001 through the electrical element 1009. The diode 1008 blocks current, and thus the switching element 1008 is off. The DC link voltage at the node 1011 is $V_{in}/2$, and therefore the voltage at the node 1019 ideally becomes $V_{in}/2$. Hence, after a short transition, $V_{1019}$ changes from $V_{in}$ volts to $V_{in}/2$ after the switching element 1003 turns off. The voltage at the node 1020 remains at approximately zero volts. Therefore, $V_{bus}$ changes from $V_{in}$ to $V_{in}/2$ when the switching element 1003 turns off. The primary winding current $i_{1012}$ is supplied by the charging capacitor current $i_{1009}$, and by the discharging capacitor current $i_{1010}$. The input current is equal to the charging capacitor current $i_{1009}$.

By utilizing the symmetric operation above, the capacitors have equal charge and discharge times. Thus, the DC-link voltage at the node 1011 can be kept at $V_{in}/2$. Further, by creating $V_{bus}$, as described above and as depicted in FIG. 11, no deadtime operation is achieved. For the push-pull winding configuration shown, $V_{rect}=nV_{bus}$, in which n is the number of secondary winding turns divided by the number of primary winding turns. The output voltage is the filtered (i.e., averaged) value of $V_{rect}$. As in the other topologies described above, regulation of output voltage is achieved by controlling the length of time that $V_{rect}$ is equal to $V_{in}/2$, and by controlling the length of time that $V_{rect}$ is equal to $V_{in}$. Thus, the advantages of the previously described converters 100, 300, 400, 600 and 800 are achieved. The lower output filter inductance value and volume are required because $V_{rect}$ has a minimum value of $V_{in}/2$, and not necessarily 0 volts.

As in the other circuit topologies described above, in the event the input voltage range is greater than 2:1, deadtime can be used to regulate the voltage. For example, when the input voltage is high, both of the switching elements 1003–1004 can be turned off to provide a $V_{bus}$ level equal to zero volts. Therefore, $V_{rect}$ would also be zero volts. There are several ways to implement this deadtime effectively. For example, assume the switching elements 1003–1004 are alternately turned on with equal time and a duty ratio less than 50%. Further, let the switching elements 1005–1006 be turned on complimentarily with 50% duty cycle. Moreover, restrict $S_1$ and $S_3$ to transition to high at the same instant of time, and restrict $S_2$ and $S_4$ to transition to high at the same instant of time. Then, when either $S_1$ or $S_2$ are high, $V_{bus}=V_{in}/2$. When both $S_1$ and $S_2$ are off, $V_{bus}=0$.

A common feature of the DC-DC converter of FIG. 9a and the DC-DC converter 1000 (see FIG. 10) is that the converter 1000 includes the electrical circuit of FIG. 9a, only with different types of switching elements. That is, comparing FIG. 9a to FIG. 10, (1) the input terminals 901–902 correspond to the input terminals 1001–1002, (2) the electrical elements 1009–1010 correspond to the electrical elements 904–905, (3) the switching element 906 corresponds to the switching element 1007, (4) the switching element 909 corresponds to the switching element 1003, and (5) the primary winding 911 corresponds to the primary winding 1012. The types of switching elements employed depends on the specific directional conducting and blocking requirements of the switching elements. However, from the point of view of ideal switching elements, the circuit of FIG. 9a is included in the converter 1000 of FIG. 10.

Figure 12:
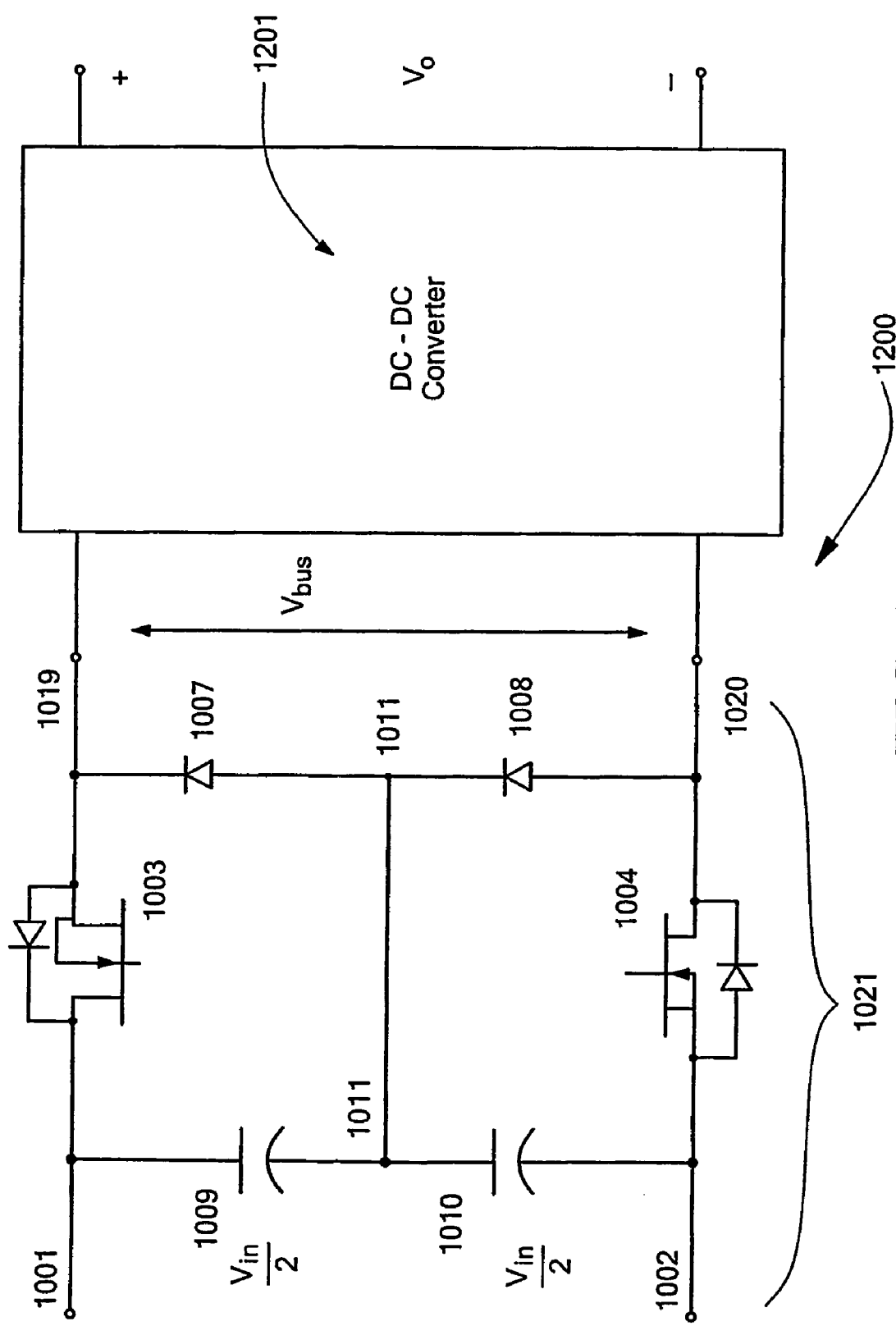
FIG. 12 is a schematic diagram of the three-level switch cell of FIG. 10 coupled to a generalized DC-DC converter.

There are benefits to using the three level switching cell 1021 (see FIG. 10) because it can be used with any DC-DC converter, as shown in FIG. 12. Specifically, FIG. 12 depicts the output terminals 1019–1020 of the three level switch cell 1021, which can be connected to the input terminals of a DC-DC converter. The purpose of the three level switch cell 1021 is to create an input voltage of the DC-DC converter that can be equal to one of three levels—$V_{in}$, $V_{in}/2$, or 0 volts. Assuming symmetric operation, the duty ratio of the switching element 1003 equals the duty ratio of the switching element 1004. For example, suppose both of the switching elements 1003 and 1004 are on. Then, $V_{bus}=V_{in}$, and the output current provided by the switching cell into the DC-DC converter is provided by source input $V_{in}$. Suppose that the switching element 1003 turns off while switching element 1004 remains on. Then, the diode (i.e., the switching element) 1007 conducts, and the voltage at the node 1019 becomes the DC-link voltage $V_{1011}$, and $V_{bus}=V_{in}/2$. The output current of the three-level switching cell 1021 is provided by the charging capacitor current $i_{1009}$ and the discharging capacitor current $i_{1010}$. In order to keep the constant DC-link voltage $V_{1011}$, if capacitors are used as the electrical elements 1009–1010, charge balance on the capacitors must be maintained. One way to achieve this is as described above with reference to the operation of converter 1000. That is, in the next half cycle of operation, the switching element 1003 turns on while the switching element 1004 remains off, in order to create $V_{bus}=V_{in}/2$. In this mode, the diode (i.e., the switching element) 1008 conducts current, $V_{1020}=V_{in}/2$, and thus $V_{bus}=V_{in}/2$. The output current of the three-level switching cell 1021 is provided by the discharging capacitor current $i_{1009}$ and the charging capacitor current $i_{1010}$. By keeping the operation of the three level switching cell 1021 symmetric so that the duty ratio of switching element 1003 equals the duty ratio of switching element 1004, the capacitors have equal charge and discharge times. So, the DC-link voltage $V_{1011}$ can be kept approximately constant. Similar to before, if the voltages across the capacitors are not equal, then non-symmetric operation of the switches may be used to maintain charge balance. Finally, there is a third possible state for the switching cell 1021, in which both of the switching elements 1003–1004 are turned off. In this case, $V_{bus}=0$, and there is no output current to the three level switching cell 1021.

The benefits of using the three level switching cell 1021 vary depending on the topology employed. For isolated dual-ended DC-DC converters, such as push-pull and full bridge, it is possible to operate the dual-ended DC-DC converter with primary switches having a 50% duty ratio. This reduces the input current ripple. So, when the three level switch cell 1021 is used, as described above, the benefits may include (1) no deadtime operation when the input voltage range is less than 2:1, (2) lower output filter inductance value, and (3) lower output filter inductance volume.

Figure 13A:
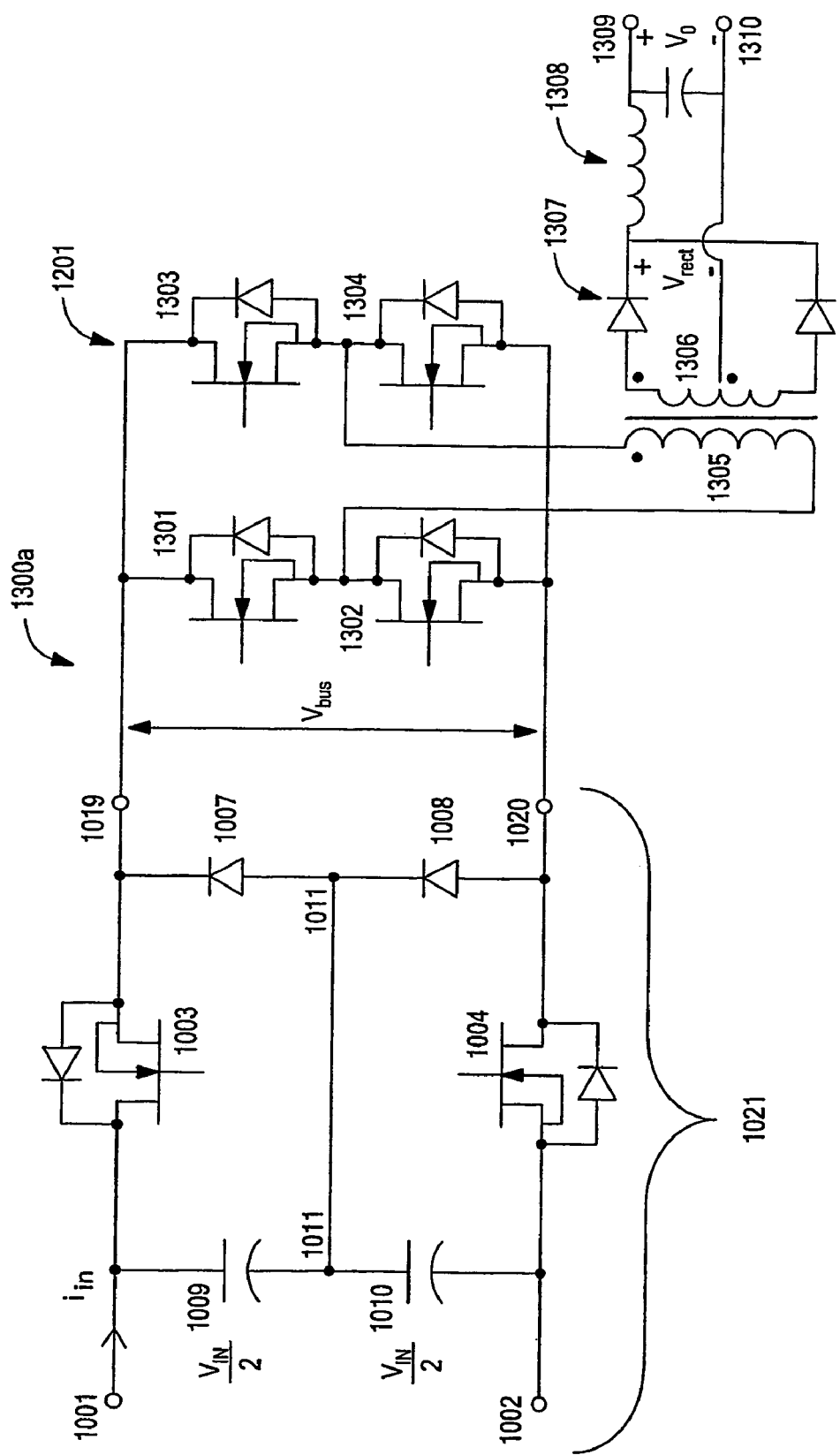
FIG. 13a is a schematic diagram of the three-level switch cell of FIG. 10 coupled to a full-bridge DC-DC converter.
Figure 13B:
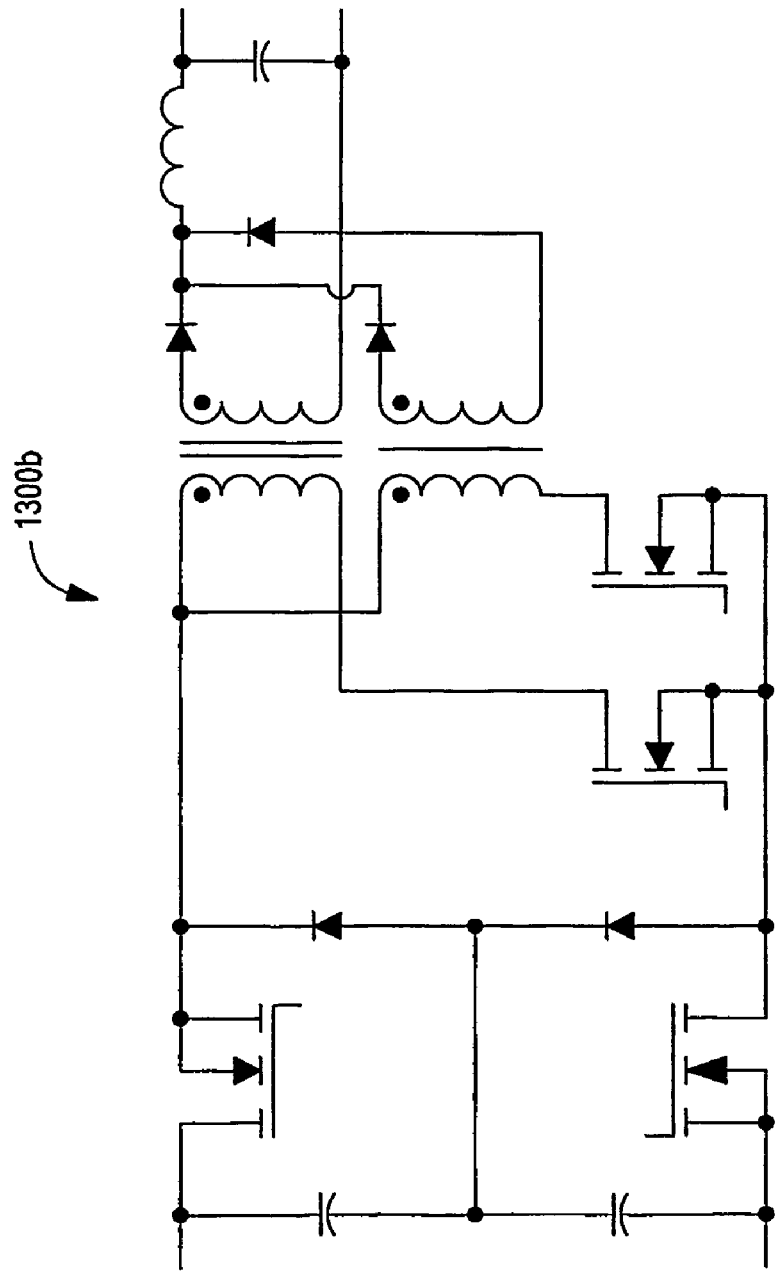
FIG. 13b is a schematic diagram of a dual-forward converter employing the three-level switch cell of FIG. 10.
Figure 13C:
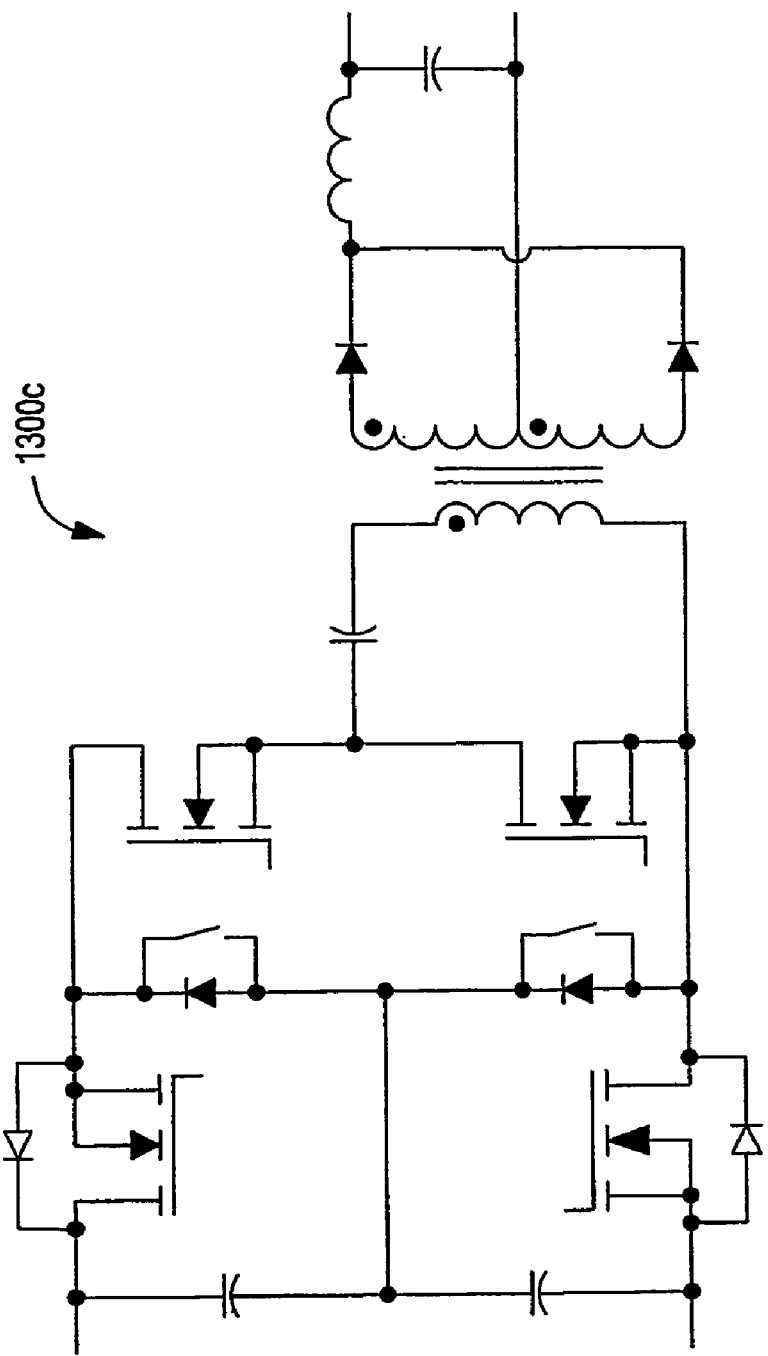
FIG. 13c is a schematic diagram of a half-bridge converter employing the three-level switch cell of FIG. 10.

FIGS. 13a–13c depict alternative embodiments 1300a–1300c of DC-DC converters including the three level switch cell 1021. As shown in FIGS. 13a–13c, the converter 1300a is configured as a full-bridge converter, the converter 1300b is configured as a dual-forward converter, and the converter 1300c is configured as an asymmetrical half-bridge converter.

As shown in FIG. 13a, the three level switch cell 1021 is connected to the full-bridge converter 1201. Suppose the input voltage range is less than 2:1. Then, for this converter, the switching elements 1003–1004 operate with same duty ratio, but with 180° phase shift. Switching elements 1301 and 1304 turn on and off together, and complementary-to switching elements 1302–1303, which also turn on and off together. Each switch has a 50% duty cycle, and the same switching frequency as the switching elements 1003–1004. When both of the switching elements 1003–1004 are turned on while the switching elements 1301 and 1304 are turned on at the same time, a full input voltage is applied to the primary winding of transformer. Thus, $V_{bus}=V_{in}$. The input current equals the primary winding current. Next, the switching element 1004 is turned off while the switching element 1003 is kept on. The diode (i.e., the switching element) 1008 conducts. So, the voltage at the node 1020 becomes the DC link voltage, and $V_{bus}=V_{in}/2$. The output inductor is discharged with half the input voltage. The capacitor 1009 discharges, and the capacitor 1010 charges. The primary winding current is supplied with the discharging current of capacitor 1009 and the charging current of capacitor 1010. The input current is equal to charging current of capacitor 1010.

The next half cycle of operation is symmetrical to the first one. The switching element 1004 is turned on again, so that both of the switching elements 1004 and 1003 are turned on. At the same time, the switching elements 1302–1303 are turned on, and switching elements 1301 and 1304 are turned off. Full input voltage is applied to charge the output inductor, and $V_{bus}=V_{in}$. The input current equals the primary winding current. Next, the switching element 1003 is turned off while the switching element 1004 is kept on. Further, the diode (i.e., the switching element) 1007 conducts. So, the voltage at the node 1019 becomes the DC-link voltage, and $V_{bus}=V_{in}/2$. The output inductor is discharged with half the input voltage. The capacitor 1009 is charged, and capacitor 1010 is discharged. The primary winding current is supplied with the charging current of the capacitor 1009, and the discharging current of the capacitor 1010. The input current is equal to charging current of the capacitor 1009.

When operated as described above, $V_{rect}=nV_{bus}$, in which n is the transformer turns ratio. Thus, $V_{rect}$ and $V_{bus}$ are as described above with reference to the converter 1000 (see FIG. 10). Therefore, the inductance value and the inductor volume of the output filter is reduced.

For wider input voltage range, it is possible to apply deadtime for control purposes, or to make $V_{bus}=0$. This is also possible for input voltage ranges of less than 2:1. Any combination of $V_{bus}$ levels are possible as the input of the DC-DC converter 1201 (see FIG. 12). However, charge balance issues are to be dealt with if capacitors are employed, as well as keeping a zero average voltage value across the transformer.

FIGS. 13b–13c depict other dual-ended topologies that employ the three-level switch cell 1021. It is understood that other suitable topologies are also possible. The operation is similar to that of the converters 1000 and 1300 described above, and similar benefits are achieved.

Figure 14:
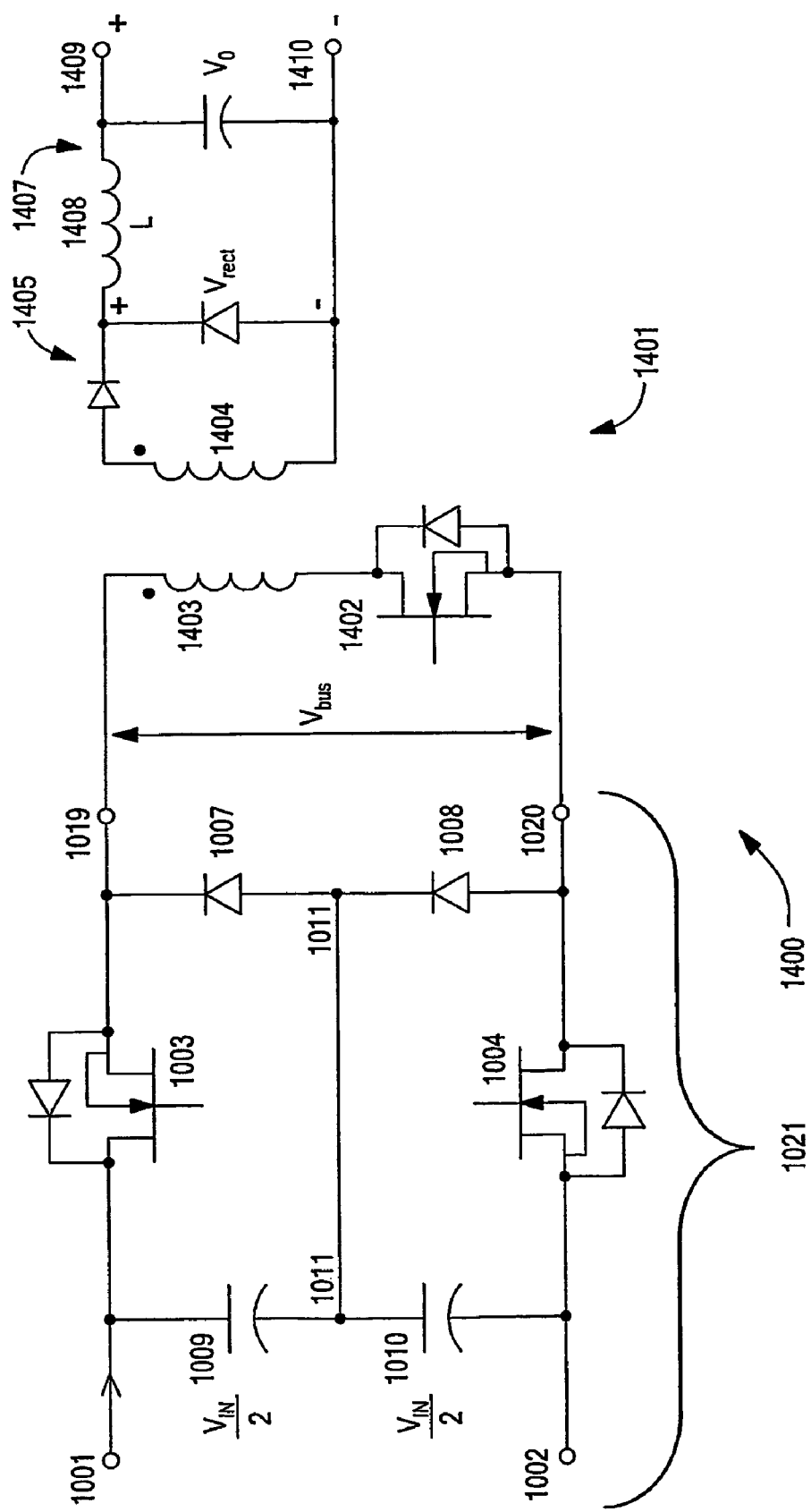
FIG. 14 is a schematic diagram of an isolated single-ended forward DC-DC converter employing the three-level switch cell of FIG. 10.

The benefits of reduced inductor size using the three level switch-cell 1021 can also be achieved in isolated single ended converters, such as the forward converter 1400 of FIG. 14. In the converter 1400, the output terminals of three-level switch cell 1021 are connected to the input terminals of a single ended forward converter. This is just one type of single ended topology that may be used, and other suitable single ended topologies are possible. A reset winding for the forward converter is not shown. Alternatively, clamp or other techniques may be employed to maintain flux balance on the core. The technique to achieve this is not important for understanding the basic principles of operation of the converter 1400.

Figure 15:
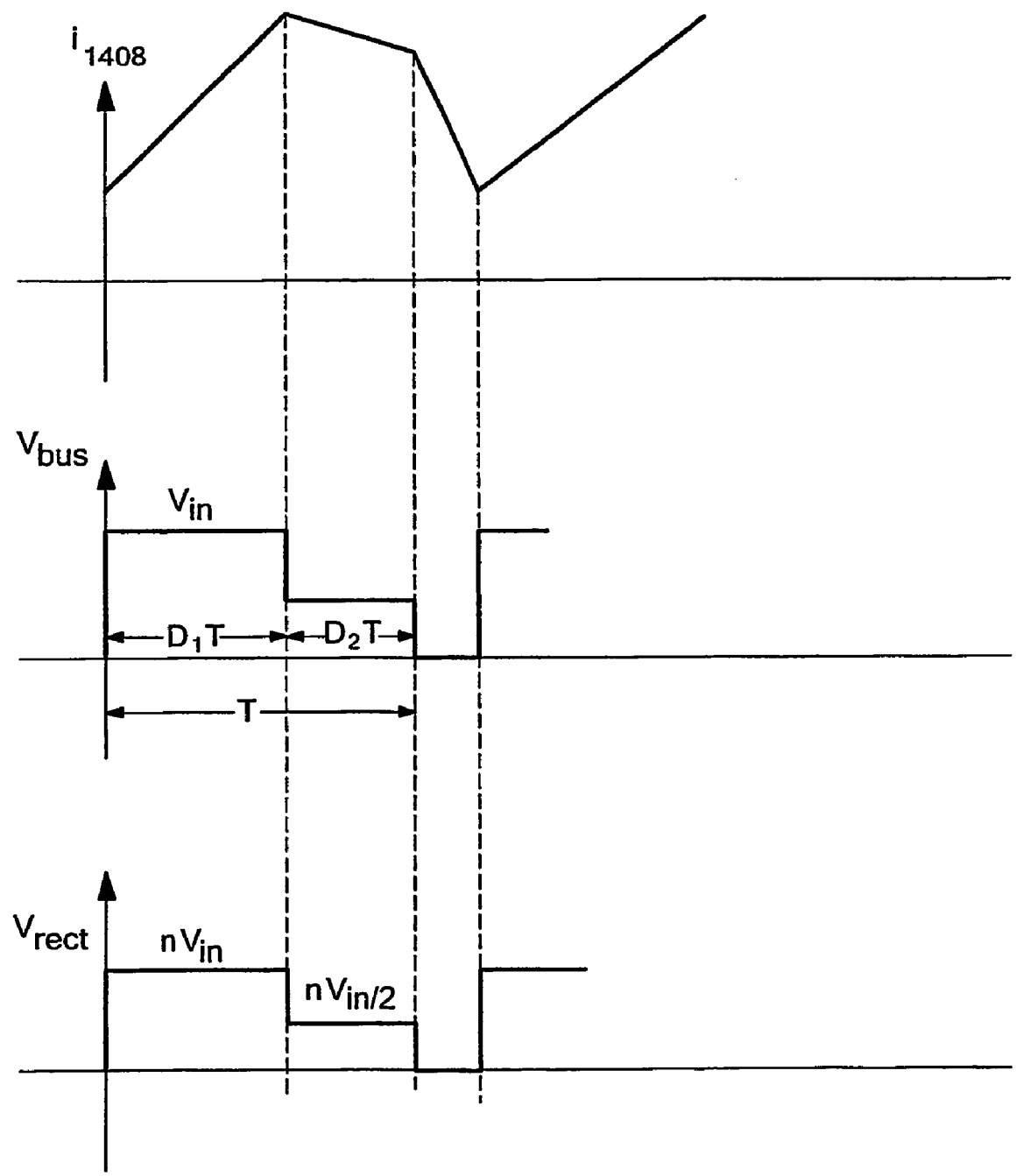
FIG. 15 is a timing diagram illustrating circuit waveforms produced by the converter of FIG. 14.

As shown in FIG. 15, $V_{bus}$ is illustrated as T periodic having a value of either $V_{in}$, $V_{in}/2$, or 0 volts. Suppose the switching elements 1003–1004, and the switching element 1402 are turned on at the same time. Full input voltage is applied to the primary winding 1403 of the transformer, making $V_{bus}=V_{in}$. The inductor current $i_{1408}$ increases. Then, the switching element 1004 is turned off while the switching elements 1003 and 1402 remain on. The diode (i.e., the switching element) 1008 turns on. So, the voltage at the node 1020 becomes the DC link voltage, and $V_{bus}=V_{in}/2$. The inductor current decreases because $V_{rect}=nV_{in}/2<V_o$. The capacitor (i.e., the electrical element) 1009 discharges, and the capacitor 1010 charges. The primary winding current is supplied with the discharging current of the capacitor 1009, and the charging current of the capacitor 1010. The input current is equal to the charging current of the capacitor 1010. Next, the switching element 1402 is turned off at the same time the transformer resets. If the switching element 1003 is turned off, as in FIG. 15, then $V_{bus}=0$. It is noted that the value of $V_{bus}$ is unimportant during the transformer reset, so other values are permissible. The input current and the primary winding current are zero. The inductor current $i_{1408}$ flows though the freewheeling diode on the secondary side, and decreases. The next half cycle of operation is symmetrical to the first half cycle.

The output voltage of the converter 1400 is the filtered (i.e., averaged) voltage of $V_{rect}$. Therefore, the voltage transfer ratio of the converter 1400 is $$\frac{V_o}{V_i} = n\left(D_1 + \frac{D_2}{2}\right). \tag{15}$$

Here, the duty ratio D1 is the fraction of each period that $V_{bus}=V_{in}$, and the duty ratio D2 is the fraction of each period that $V_{bus}=V_{in}/2$, as indicated in FIG. 15. It is noted that n is the turns ratio of the transformer, as described above. The inductor current ripple is smaller for the converter 1400 compared to the conventional single ended forward converter 1401. This is shown by calculating the volt-second product across the inductor 1408, and by showing that it is smaller than that of the conventional 2-level converter 1401.

The volt-second product of the converter 1400:

$$\frac{V_o T(1-D_1-D_2/2)}{1+D_2/2D_1}. \tag{16}$$

The volt-second product of the conventional converter 1401:

$$V_o T(1-D). \tag{17}$$

It is noted that $(1-D)=(1-D_1-D_2/2)$ for the same $V_{in}$ and $V_o$. Thus, the converter 1400 has reduced the volt-second product for the output inductor 1408 by a factor of $$\frac{1}{1+D_2/2D_1} < 1. \tag{18}$$

This implies that a smaller core and a smaller inductance value are possible.

Figure 16A:
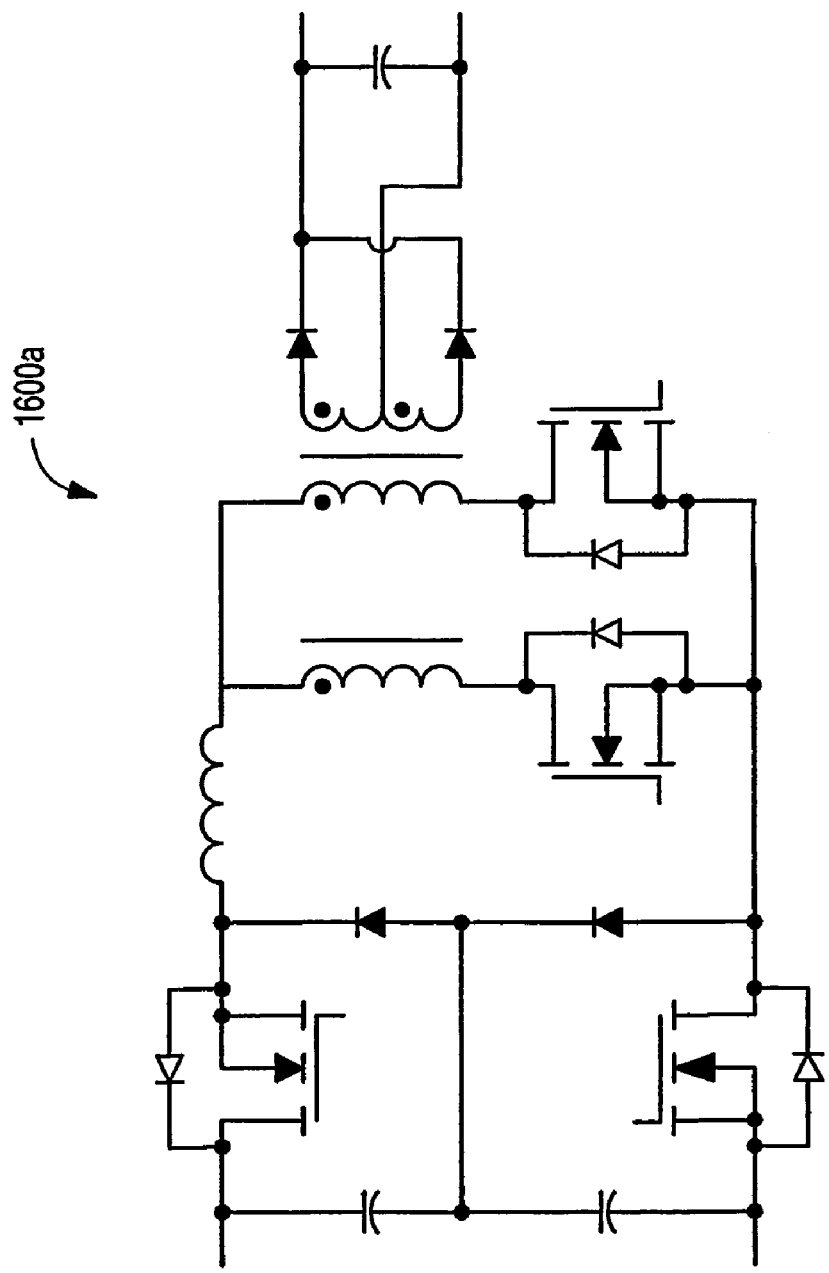
FIG. 16a is a schematic diagram of a current-fed push-pull buck DC-DC converter.
Figure 16B:
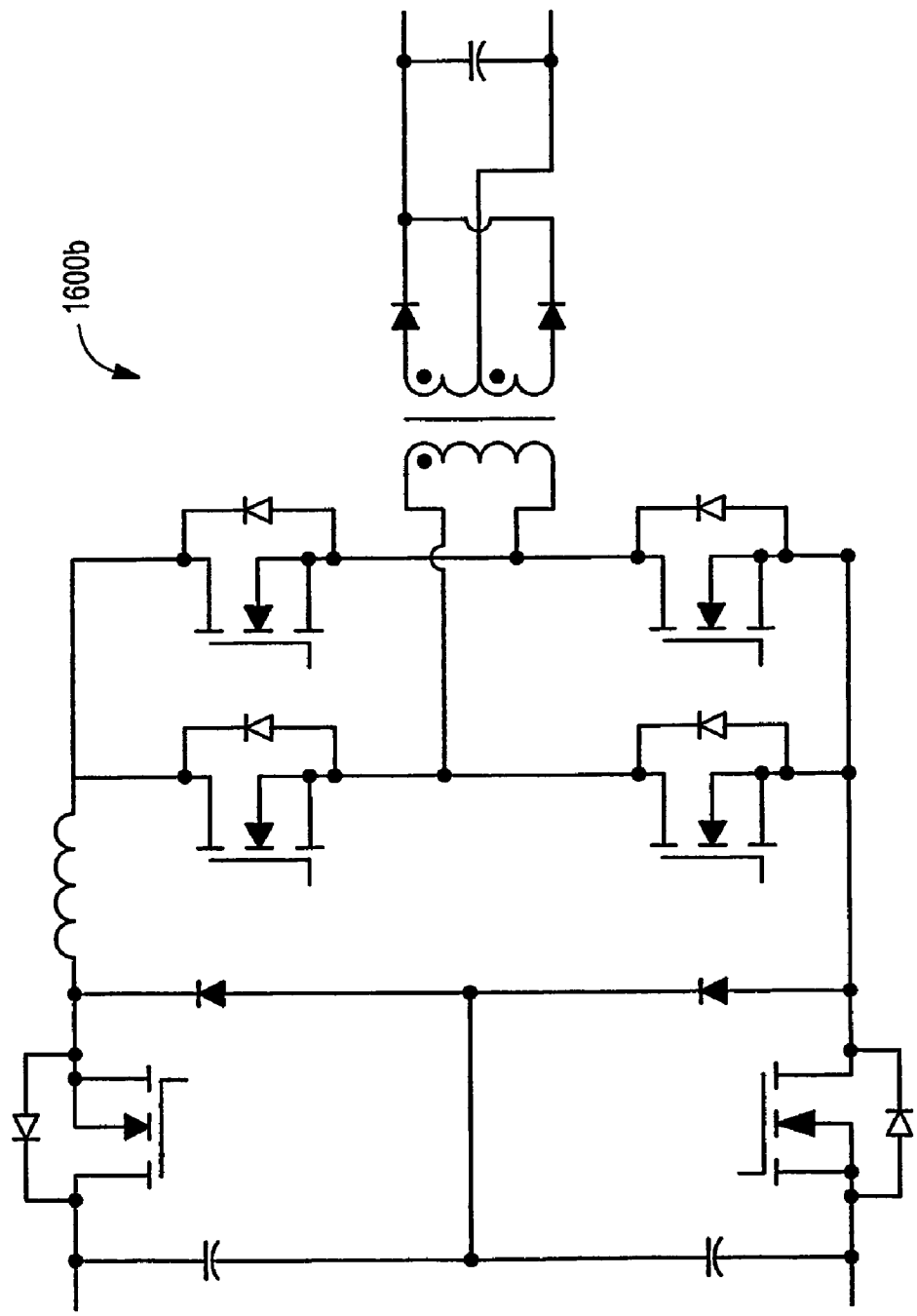
FIG. 16b is a schematic diagram of a current fed full-bridge DC-DC converter.
Figure 16C:
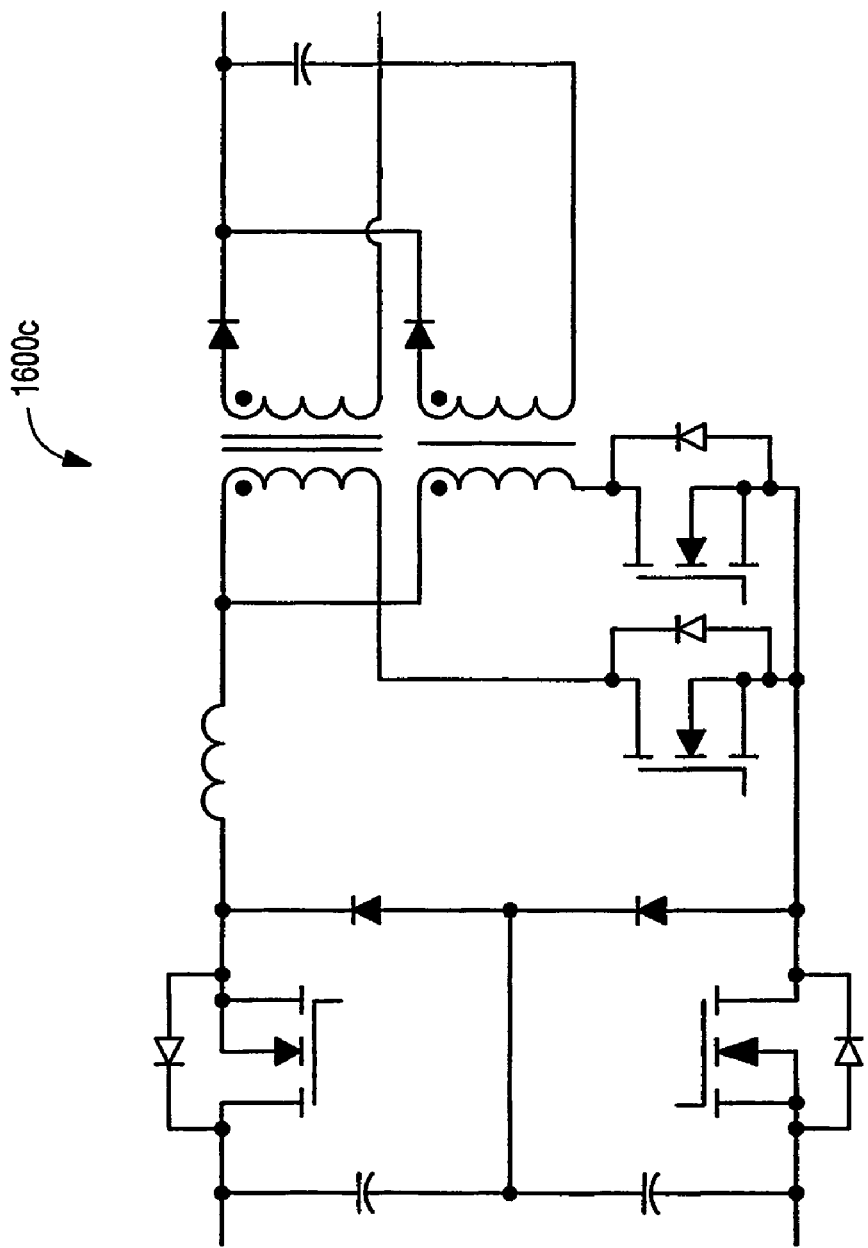
FIG. 16c is a schematic diagram of a current fed dual-forward DC-DC converter.

FIGS. 16a–16c depict the three-level switch cell 1021 connected to several types of current fed DC-DC converters 1600a–1600c. FIG. 16a depicts the converter 1600a configured as a current-fed push-pull buck converter, FIG. 16b depicts the converter 1600b configured as a current-fed full-bridge converter, and FIG. 16c depicts the converter 1600c configured as a current-fed dual-forward converter. It is understood that alternative configurations are possible.

DC-DC converters are considered to be voltage fed converters when the filter inductor is located on the secondary side of the transformer. In current fed topologies, the inductor is moved to the primary side of the transformer. This has benefits in multi-output DC-DC converters because only one inductor core is required. The three level switch-cell 1021 connected to current fed topologies achieves the benefits of reduced value and reduced volume of the inductor, which is on the primary side. The voltage stresses on the switching elements are reduced as well.

Figure 17:
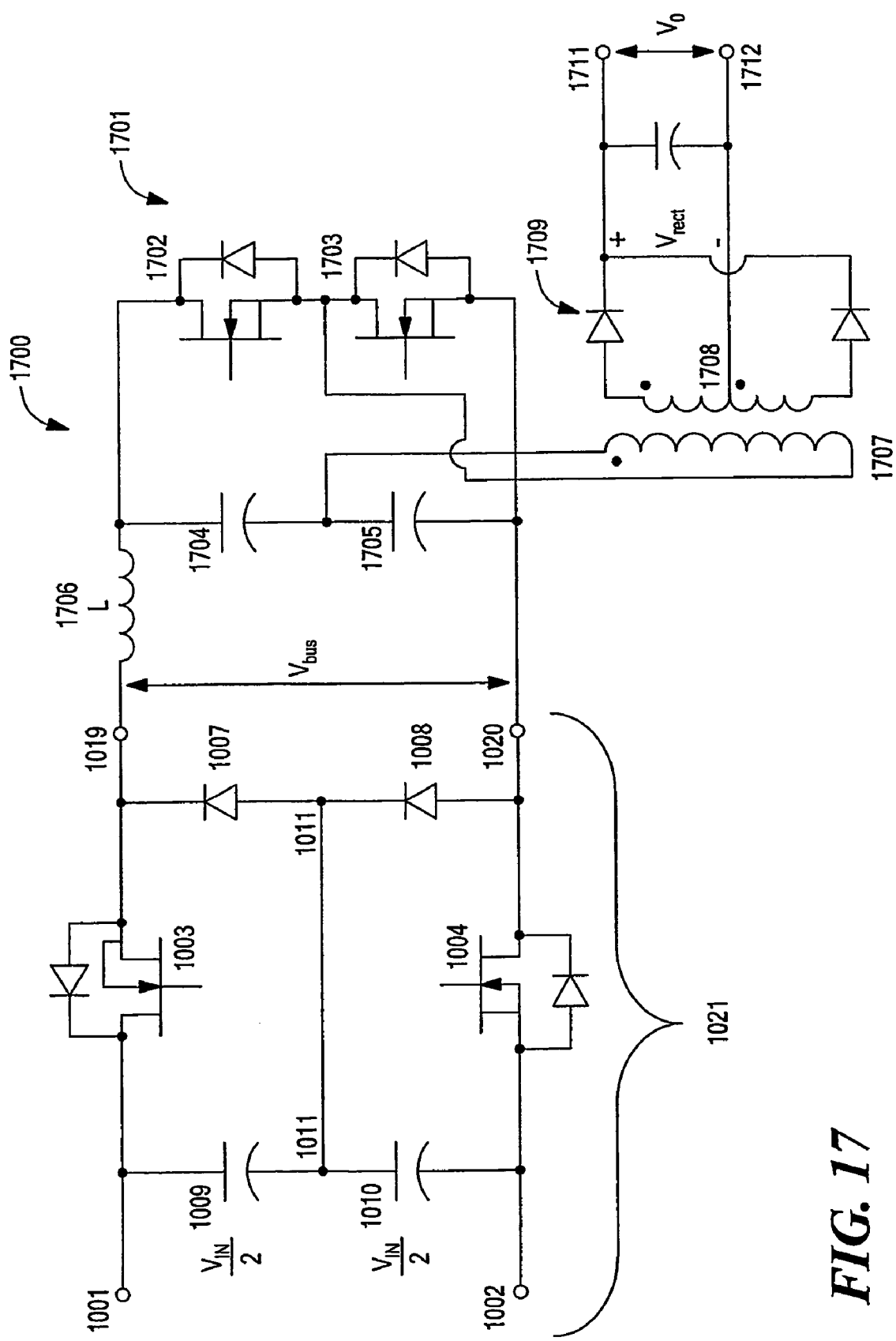
FIG. 17 is a schematic diagram of a current fed half-bridge DC-DC converter employing the three level switch cell of FIG. 10.

The operation of current fed topologies is similar to that of voltage fed topologies. For example, the current fed half-bridge is depicted in FIG. 17 with the three level switch cell. The output of three level switch cell 1021 is connected to the input of current fed half bridge 1701. Because the two capacitors 1704–1705 operate as a voltage source, the elements 1021 and 1704–1706 make up a buck stage.

The operation of DC-DC converter 1700 is similar to that of the converter 1400. The switching elements 1003–1004 and 1703 are turned on at the same time, and the switching element 1704 is off. The full input voltage is applied, and the input voltage to the current fed half bridge converter 1701 is $V_{bus}=V_{in}$. In current fed topologies, $V_{rect}=V_o$. This output voltage is reflected to the primary winding, and the primary winding voltage is $V_o/n$, in which n is the turns ratio, as defined above. The capacitors 1704–1705 each have a steady state voltage equal to the reflected output voltage, $V_{1704}=V_{1705}=V_o/n$. So, when the switching element 1703 is on, the inductor has a positive voltage across it, $V_{in}-2V_o/n$, and the inductor current $I_{1706}$ increases. Next, the switching element 1004 is turned off while the switching elements 1003 and 1703 remain on. The diode (i.e., the switching element) 1008 conducts. The voltage at the node 1019 becomes the DC-link voltage. So, the voltage across the inductor becomes $V_{in}/2-2V_o/n$, which is less than zero assuming less than 2:1 input voltage range. Thus, the inductor current $i_{1706}$ decreases. The next half cycle of operation is symmetrical to the first half cycle. Charge balance of the capacitors included in the converter 1700 is achieved via symmetrical operation of the converter.

Without the three-level switch cell 1021, the inductor voltage would switch between $V_{in}-2V_o/n$ and $-2V_o/n$, which is a larger peak to peak value compared to the value in the converter 1700. Thus, the converter 1700 requires a reduced inductance value.

For an input voltage range greater than 2:1, the switching elements 1003–1004 can both turn off, so that $V_{bus}=0$ volts. In this case, the inductor current will freewheel through the diodes 1007–1008. It should also be noted that sometimes an additional small inductor is added to the output filter 1710, for eliminating the transient current shock. The operation of the current fed half bridge is typical for the three-level switch cell connected to other current fed topologies. It is understood that the topologies of FIG. 16 are not exhaustive, and other suitable topologies are possible.

Figure 18:
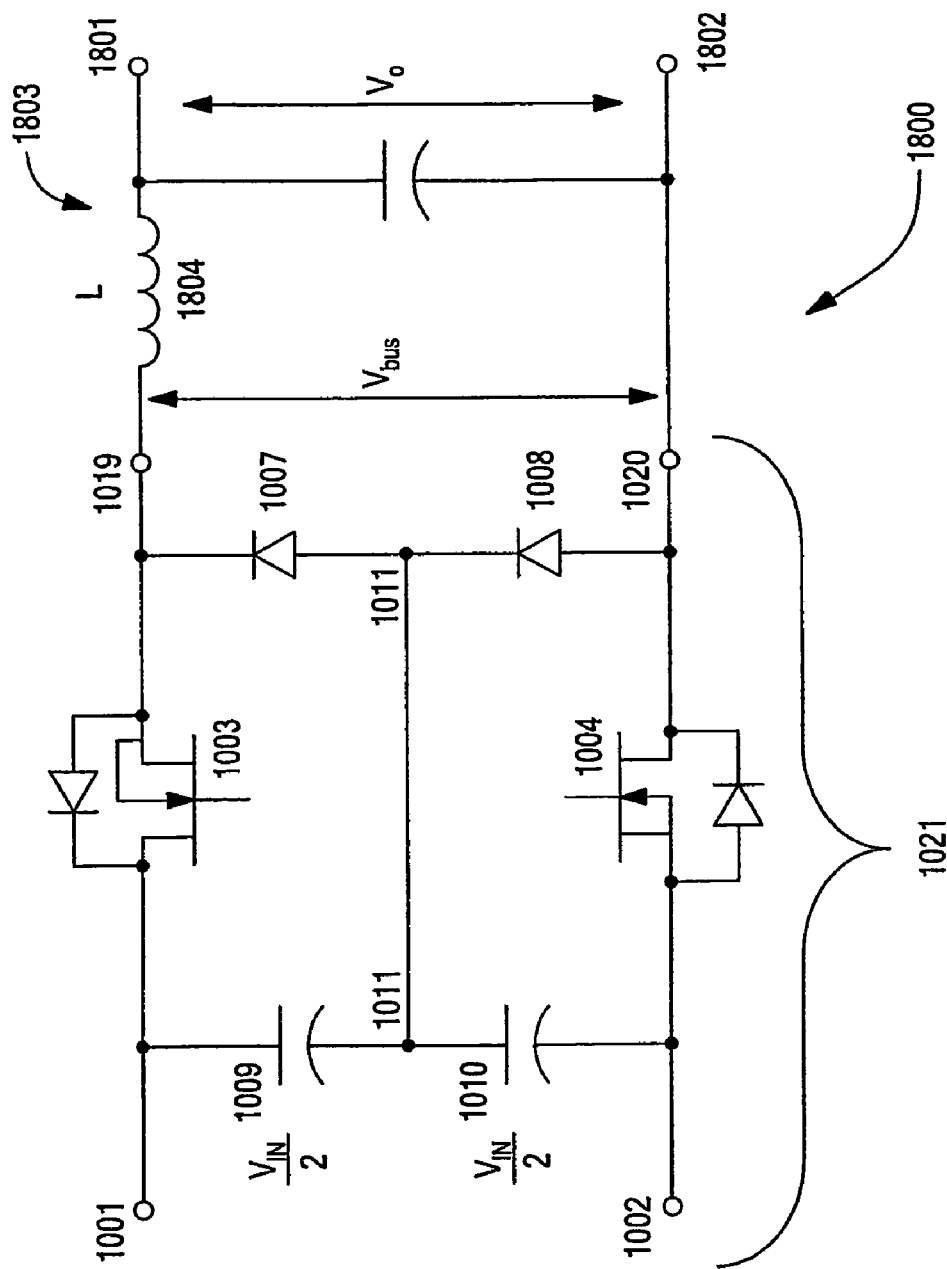
FIG. 18 is a schematic diagram of a three-level buck DC-DC converter employing the three-level switch cell of FIG. 10.

FIG. 18 depicts the three-level switch cell used in a three-level buck converter 1800 that has no isolation. Three-level switch cell 1021 is attached directly to an output filter 1803. Thus, the output voltage $V_o$ taken across terminals 1801–1802 is the filtered (i.e., averaged) value of $V_{bus}$. The operation of the DC-DC converter 1800 is similar to that of the converter 1700. The switching elements 1003–1004 are turned on at the same time. The full input voltage, $V_{bus}=V_{in}$, is applied to the filter 1803. The inductor current $i_{1804}$ increases, and no current passes through the diodes 1007–1008. Then, the switching element 1004 is turned off. The diode (i.e., the switching element) 1008 turns on. So, the voltage at the node 1020 becomes the DC link voltage, and $V_{bus}=V_{in}/2$. Assuming $V_{in}/2<V_o$, the inductor current decreases. The capacitor (i.e., the electrical element) 1009 discharges, and the capacitor 1010 charges. The input current is equal to the charging current of the capacitor 1010. The next half cycle of operation is symmetrical to the first half cycle. Thus, $V_{bus}$ is the same as shown in FIG. 11.

For the case when $V_{in}/2>V_o$, the switching cell operates for some time interval with $V_{bus}=0$ volts. One way to achieve this is by symmetrically operating the three-level switch cell 1021 to switch between $V_{bus}=V_{in}/2$ and $V_{bus}=0$ volts, via proper control of the duty ratios. When $V_{bus}=0$ volts, both of the switching elements 1003–1004 are turned off, and the diodes 1007–1008 are both freewheeling. Controlling the length of freewheel time helps regulate the average value of $V_{bus}$ (which is equal to $V_o$). To create $V_{bus}=V_{in}/2$, the switching elements 1003–1004 are alternately turned on an off in a symmetrical manner, as described above. The converter 1800 is referred to herein as a three-level switch cell buck converter.

Figure 19:
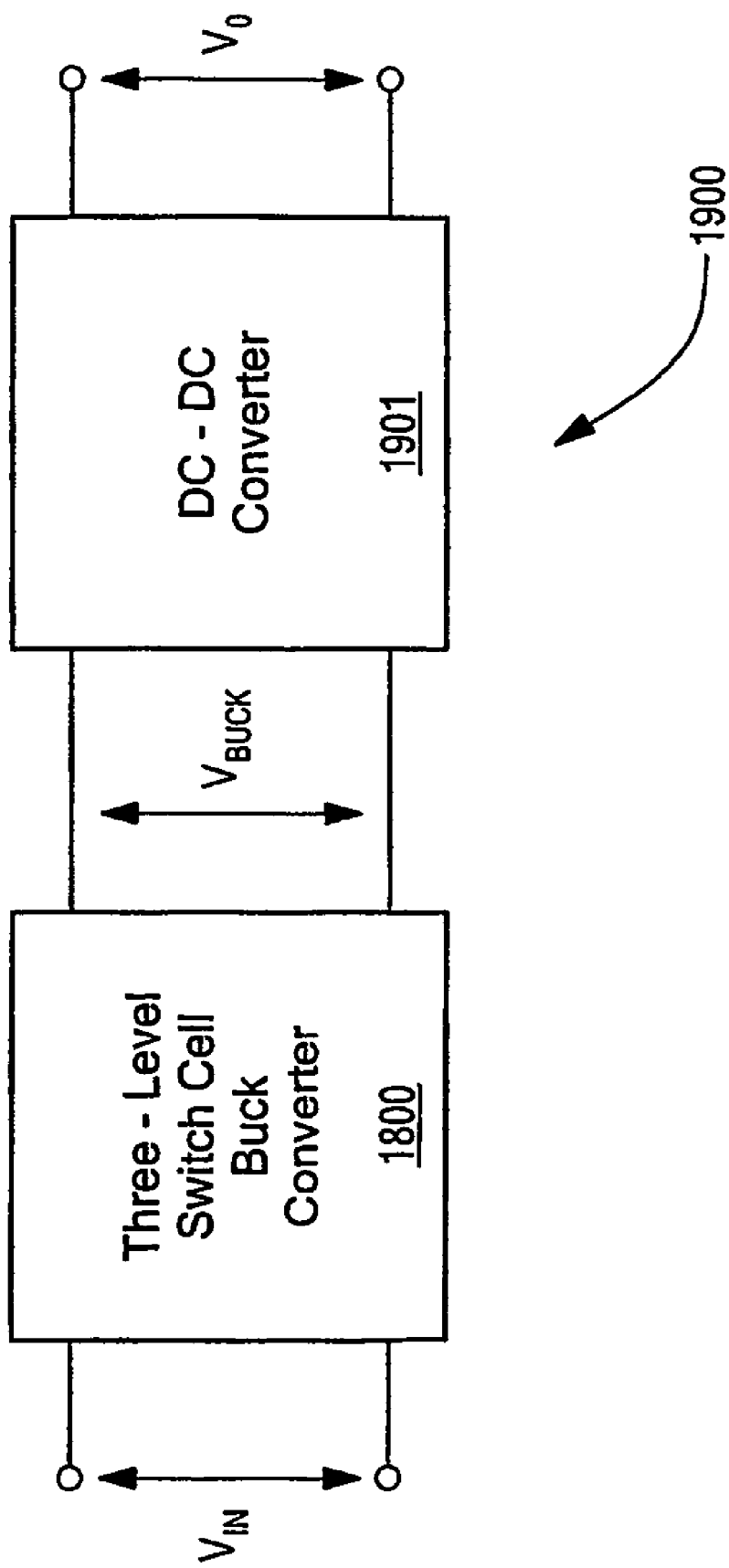
FIG. 19 is a block diagram of the three-level buck DC-DC converter of FIG. 18 coupled to another DC-DC converter.
Figure 20:
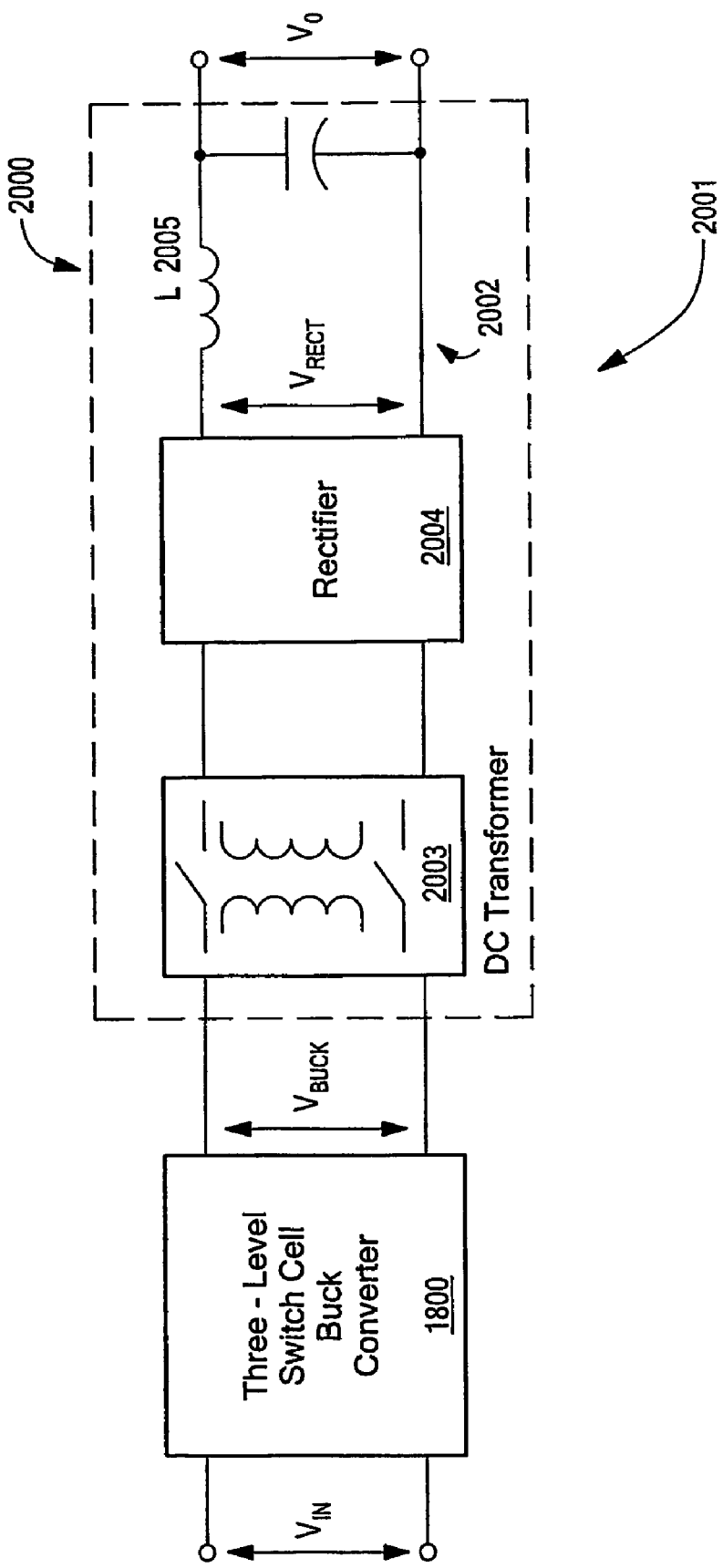
FIG. 20 is a detailed view of the DC-DC converter coupled to the three-level buck DC-DC converter of FIG. 18.

Three-level switch cell buck converter 1800 can be used in a manner similar to the three-level switch cell 1021 in FIG. 12. FIG. 19 shows that the three-level switch cell buck converter 1800 has an output that can be directly connected to the input of another DC-DC converter 1901 to form a single DC-DC converter 1900. Although it is possible to separately regulate the output $V_o$ of DC-DC converter 1901 from the output $V_{Buck}$ of the three-level switch cell buck converter 1800, there are classes of converters in which DC-DC converter is not separately controlled. For example, in the case when DC-DC converter 1901 is a dual-ended converter, it is possible to operate the DC-transformer switches in 1901, as shown in FIG. 20, at 50% duty ratio. The output voltage of DC-DC converter 1900, Vo, is regulated by controlling the output voltage of the three-level switch cell buck converter 1800. That is, Vo=n$V_{Buck}$. Thus, the duty ratios of the three-level switch cell buck switching elements are used to control the output of the isolated dual-ended DC-DC converter $V_o$. Such a configuration is generally referred to as a two-stage DC-DC converter, as shown in FIG. 20.

For the two stage converter 2001, it is possible to keep the duty ratio of the DC-DC transformer 2003 (half-bridge, full-bridge, push-pull, dual-forward, etc.) switches to be 50%, which leads to no deadtime, and a smaller inductor 2005 in the output filter 2002. Regulation of output voltage $V_o$ is obtained by regulating $V_{Buck}$ using the techniques described above.

FIGS. 21a–21g depict specific examples of two-stage DC-DC converters that utilize the three-level switch cell buck converter 1800. It is understood that these are merely illustrative examples, and other suitable configurations of such two-stage converters are possible.

Figure 21A:
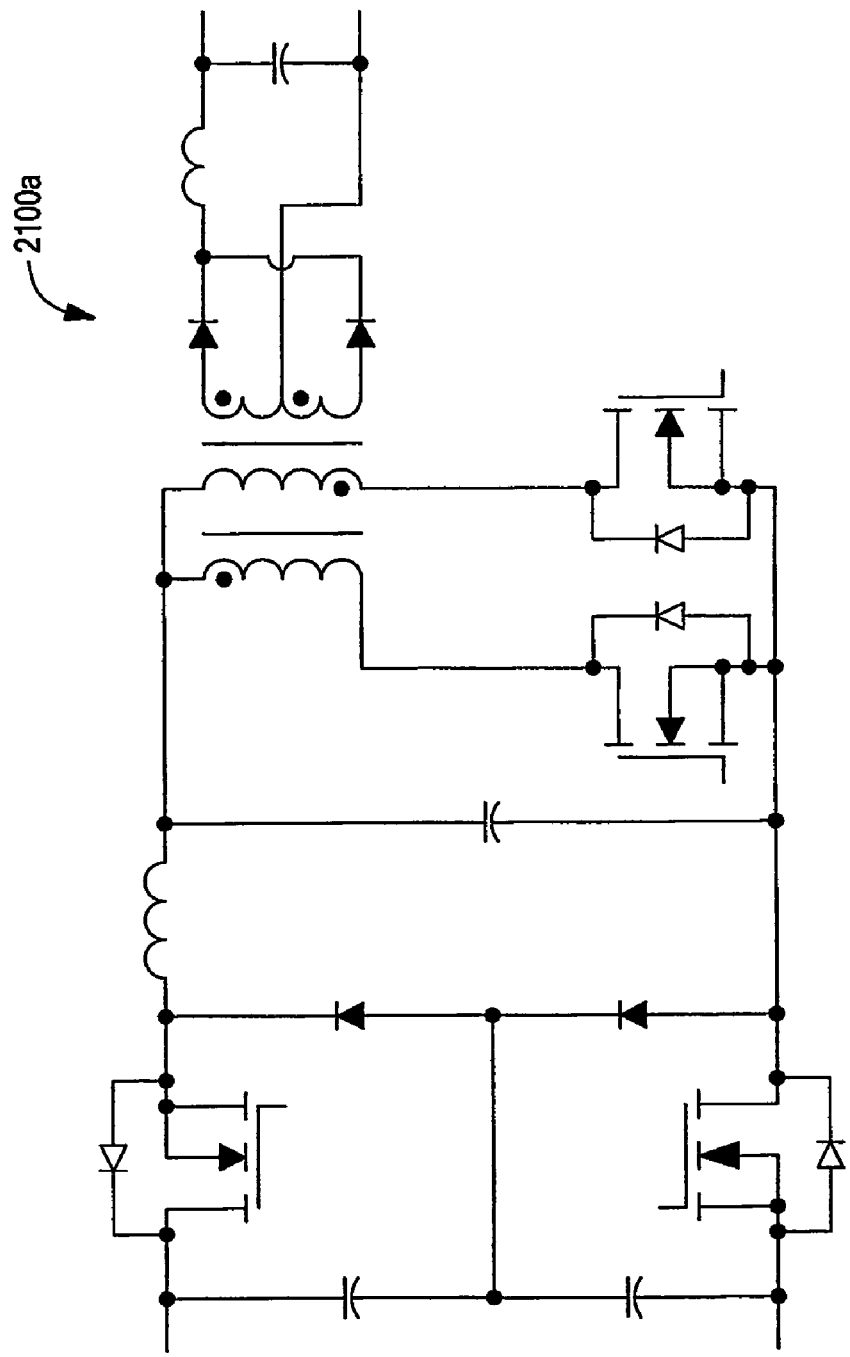
FIG. 21a is a schematic diagram of a three-level two-stage buck and push-pull DC-DC converter.
Figure 21B:
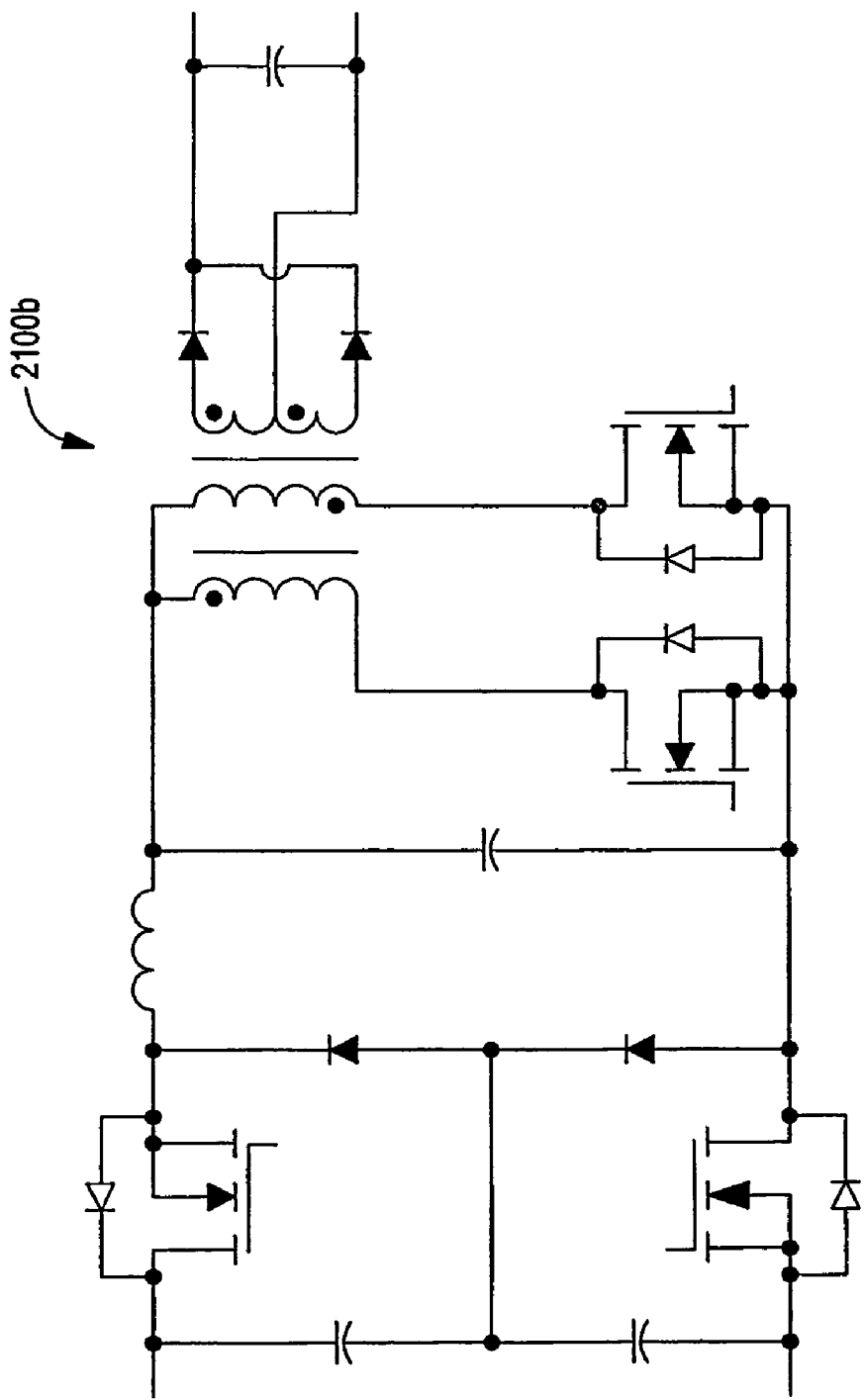
FIG. 21b is a schematic diagram of an alternative embodiment of a three-level two-stage buck and push-pull DC-DC converter.
Figure 21C:
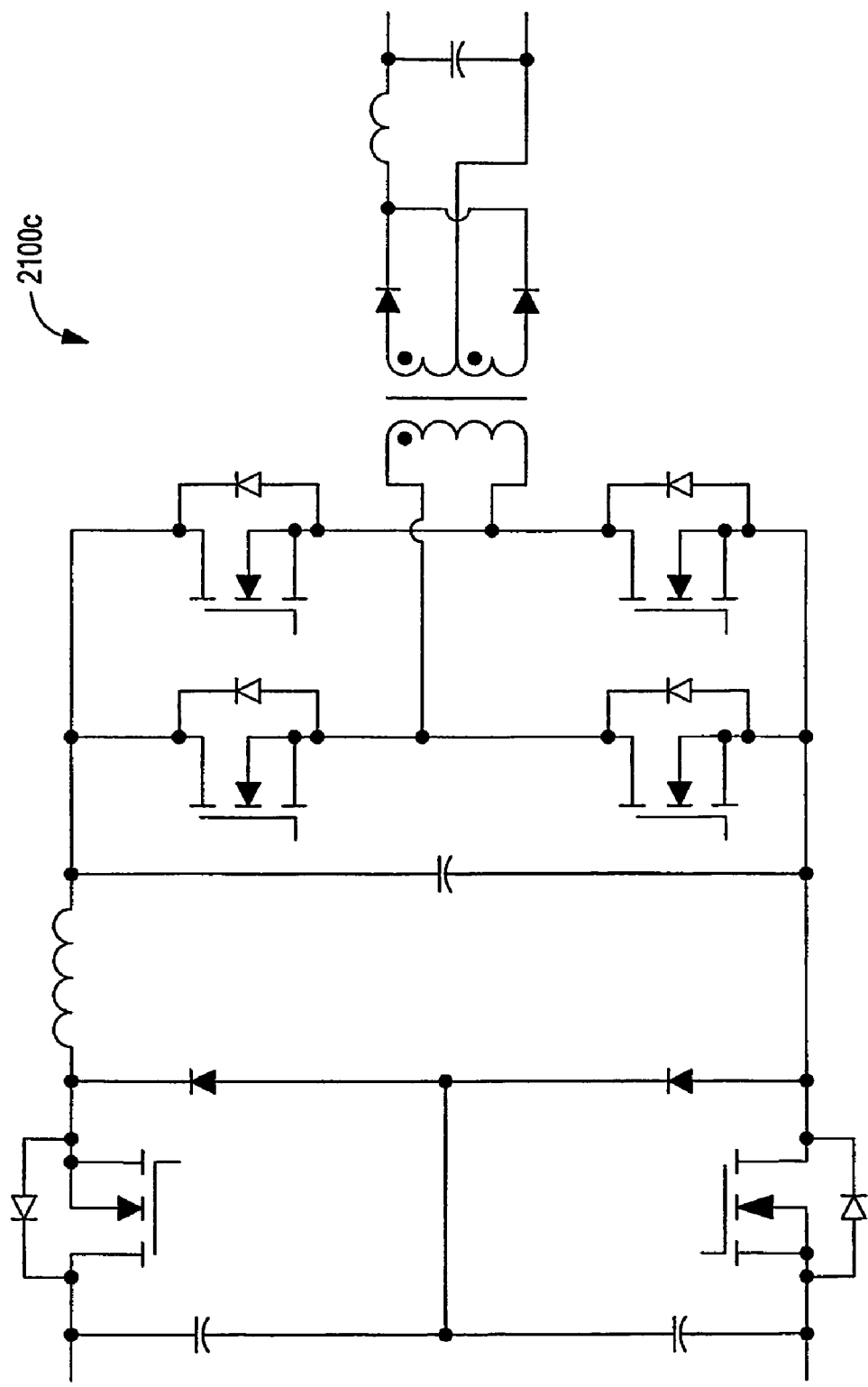
FIG. 21c is a schematic diagram of a three-level two-stage full-bridge DC-DC converter.
Figure 21D:
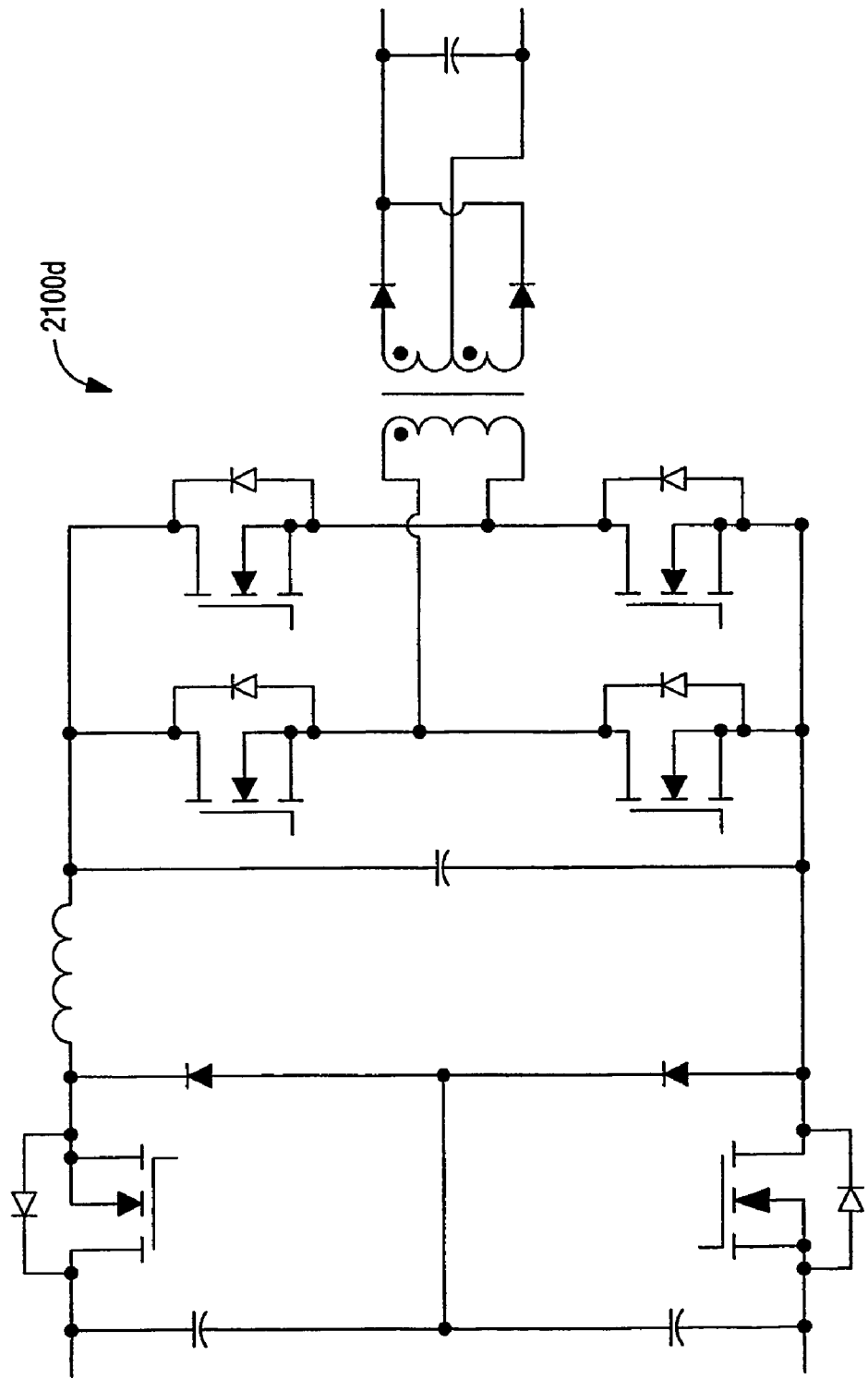
FIG. 21d is a schematic diagram of an alternative embodiment of a three-level two-stage full-bridge DC-DC converter.
Figure 21E:
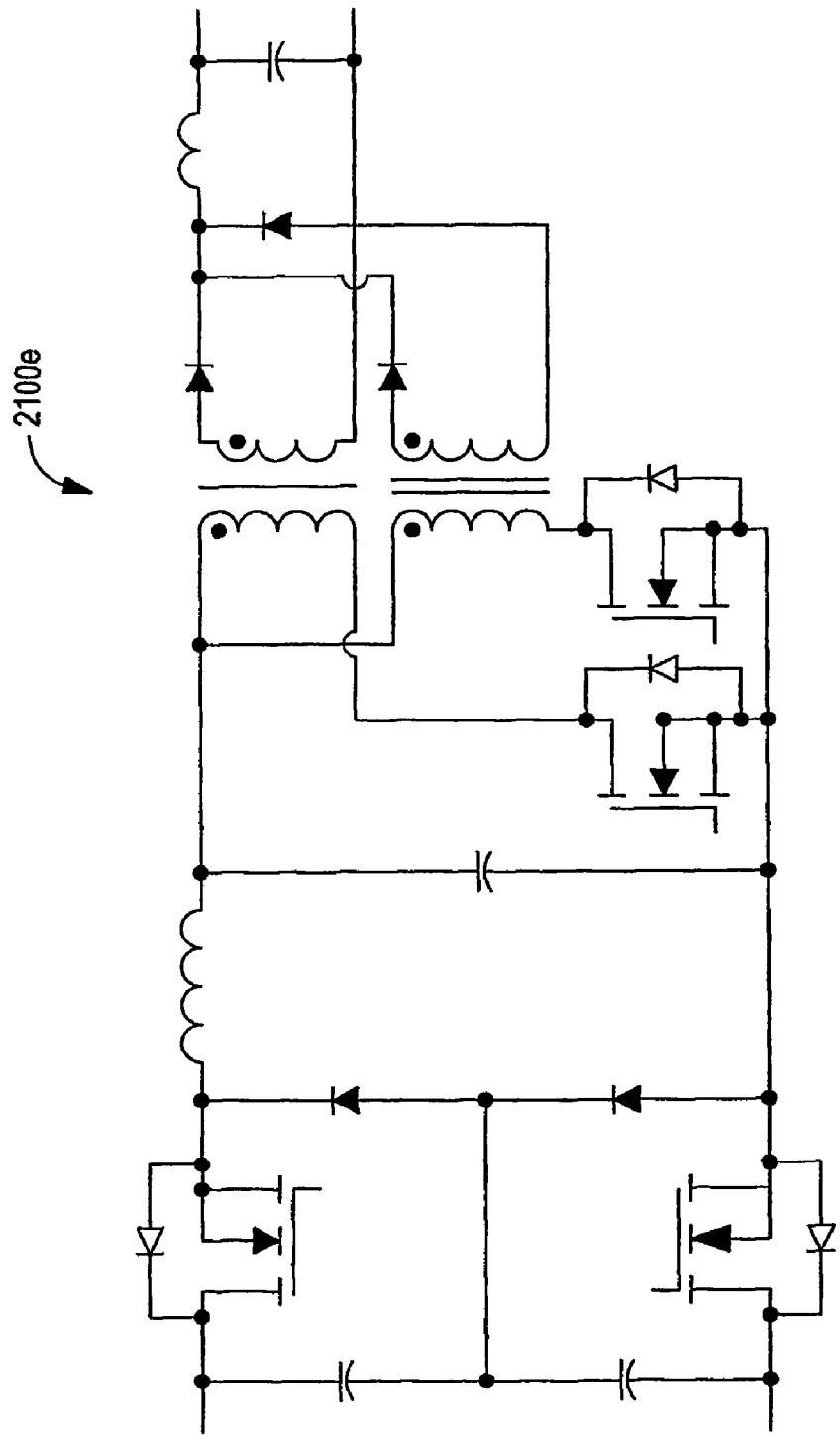
FIG. 21e is a schematic diagram of a three-level two-stage dual-forward converter.
Figure 21F:
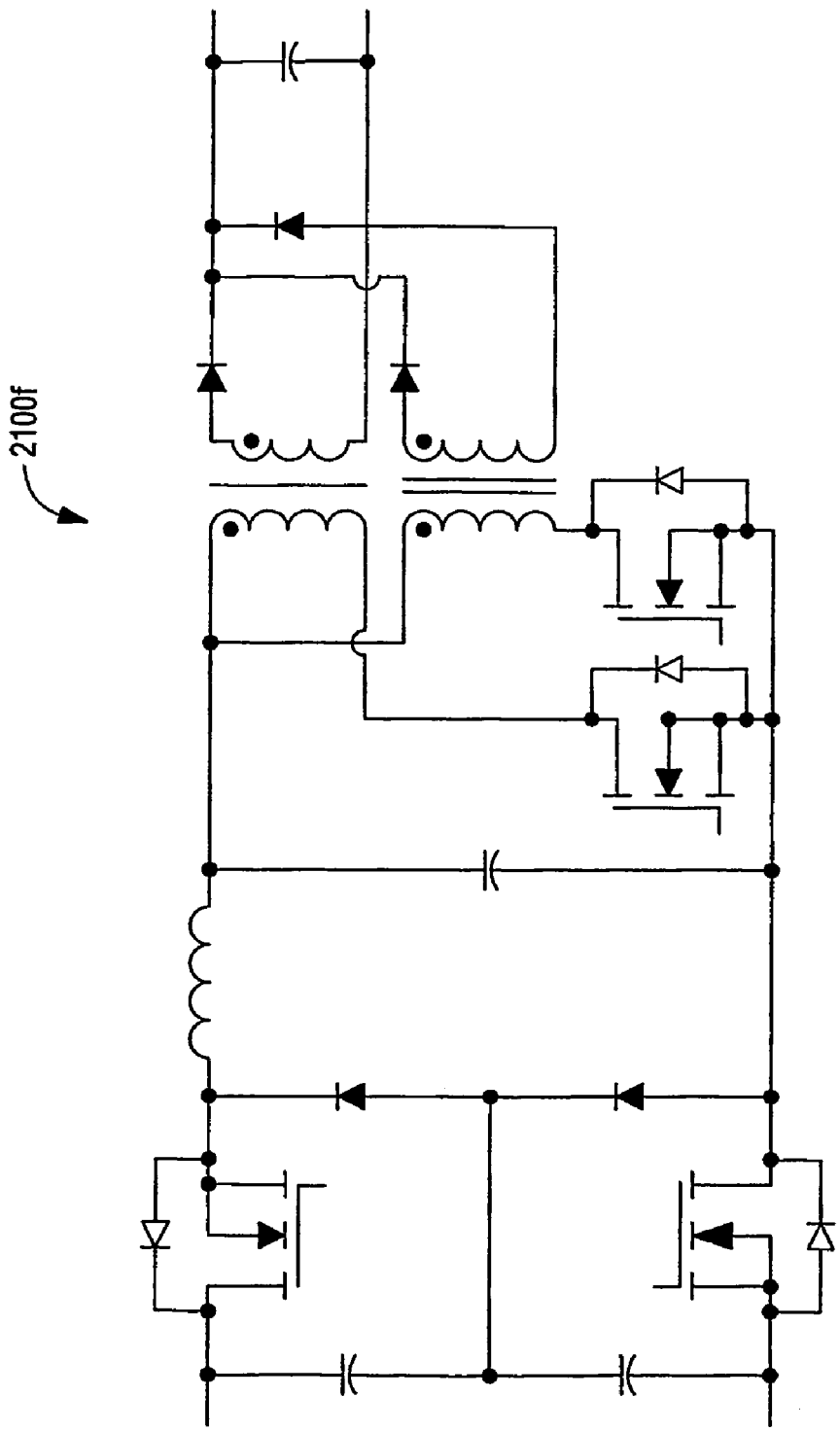
FIG. 21f is a schematic diagram of an alternative embodiment of a three-level two-stage dual-forward converter.
Figure 21G:
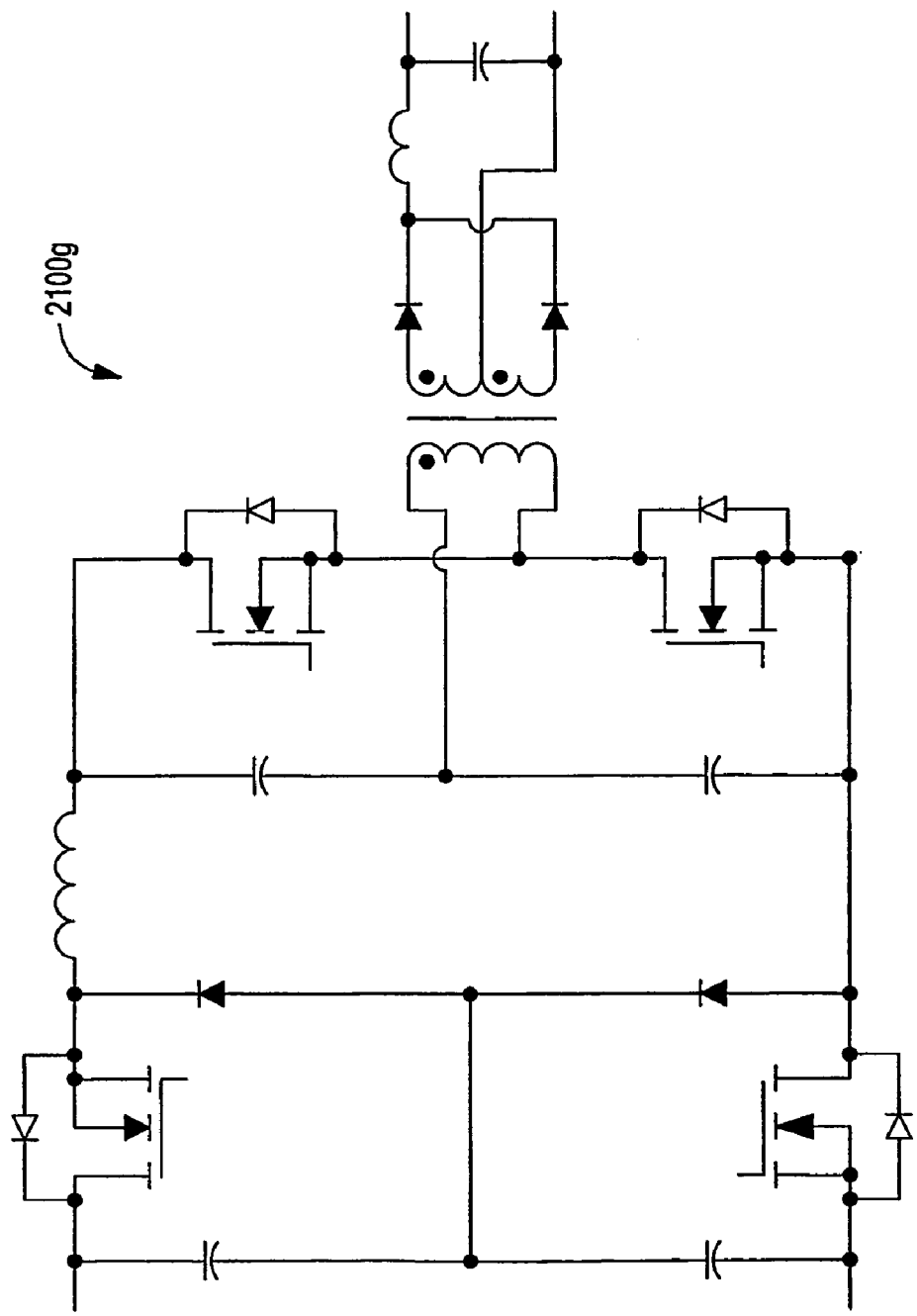
FIG. 21g is a schematic diagram of a three-level two-stage half-bridge converter.

Ideally, no inductor is needed in the output filter, but from a practical implementation viewpoint, it is often added to suppress the transient current and to improve filtering. Hence, the DC-DC converters 2100a–2100g of FIGS. 21a–21g are depicted with and without the output filter inductor. When an additional output filter inductor is added, it is typically small. FIG. 21a depicts the converter 2100 a configured as a three-level two-stage buck and push-pull converter, FIG. 21b depicts the converter 2100b configured as another embodiment of the three-level two-stage buck and push-pull converter, FIG. 21c depicts the converter 2100c configured as a three-level two-stage full-bridge converter, FIG. 21d depicts the converter 2100d configured as another embodiment of the three-level two-stage full-bridge converter, FIG. 21e depicts the converter 2100e configured as a three-level two-stage dual-forward converter, FIG. 21f depicts the converter 2100f configured as another embodiment of the three-level two-stage dual-forward converter, and FIG. 21g depicts the converter 2100g configured as a three-level two-stage half-bridge converter. It is appreciated that other suitable configurations are possible.

Figure 22A:
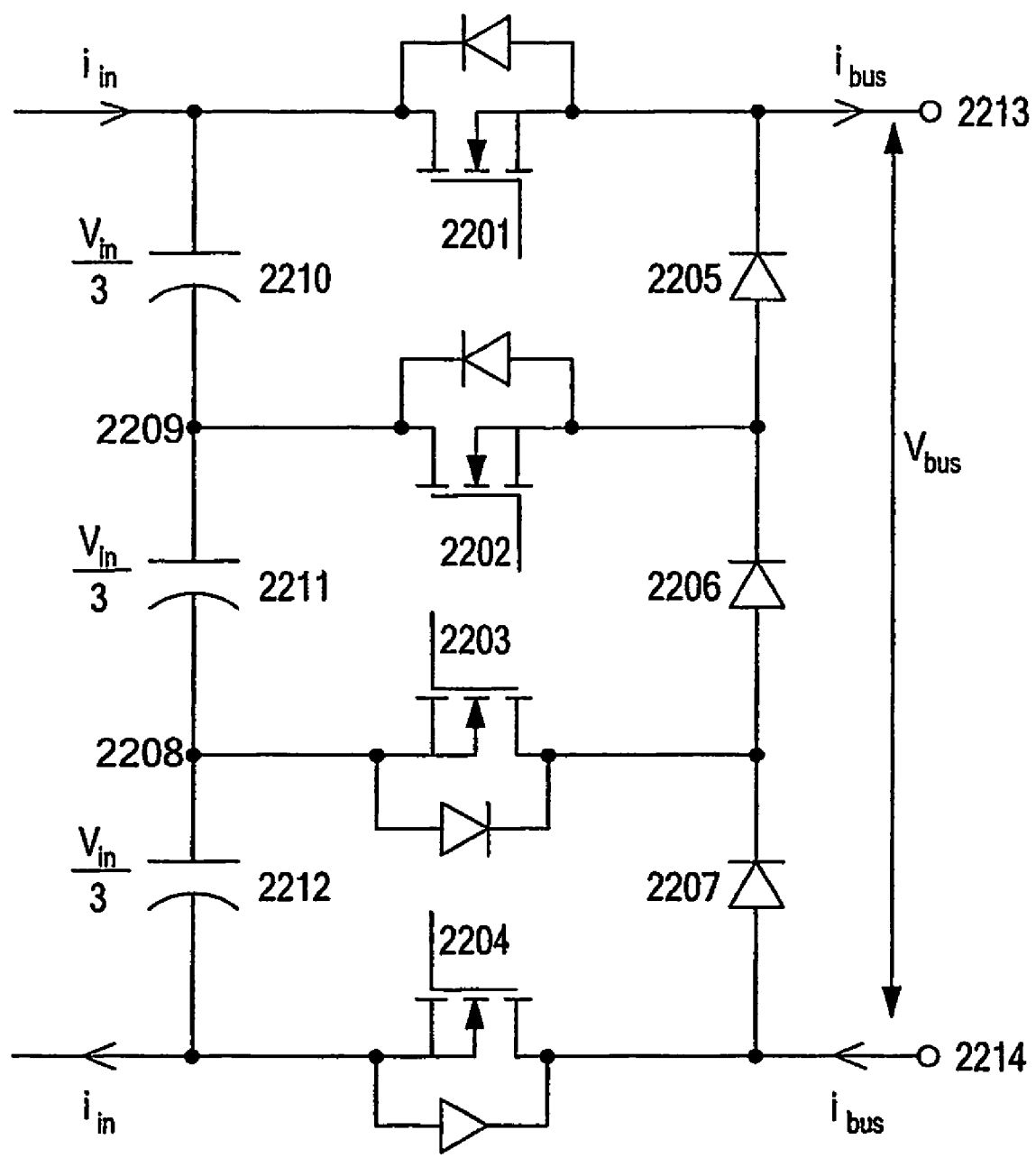
FIG. 22a is a schematic diagram of a four-level switch cell.
Figure 22B:
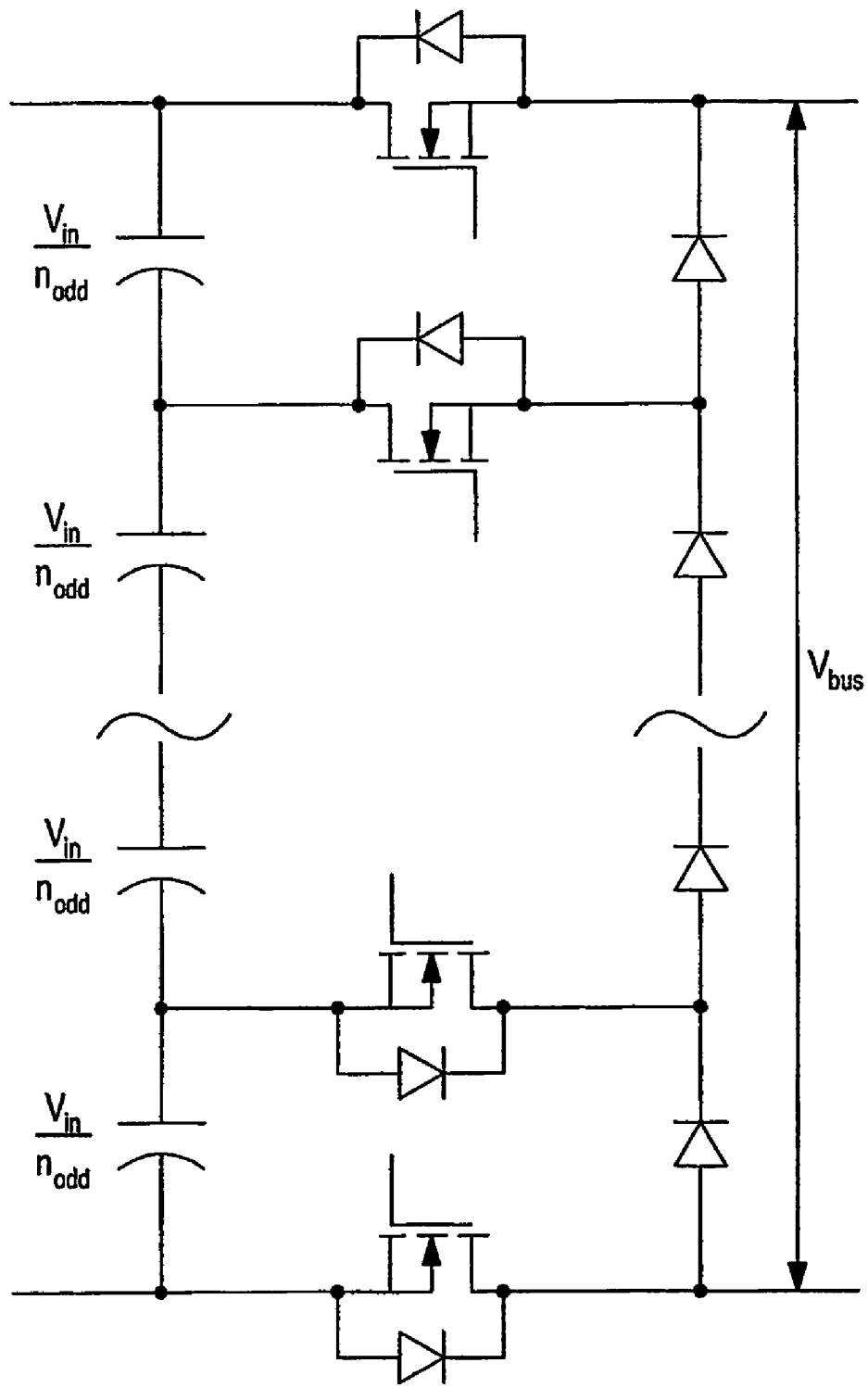
FIG. 22b is a schematic diagram of the switch cell of FIG. 22a generalized for ($n_{odd}$+1) levels.
Figure 22C:
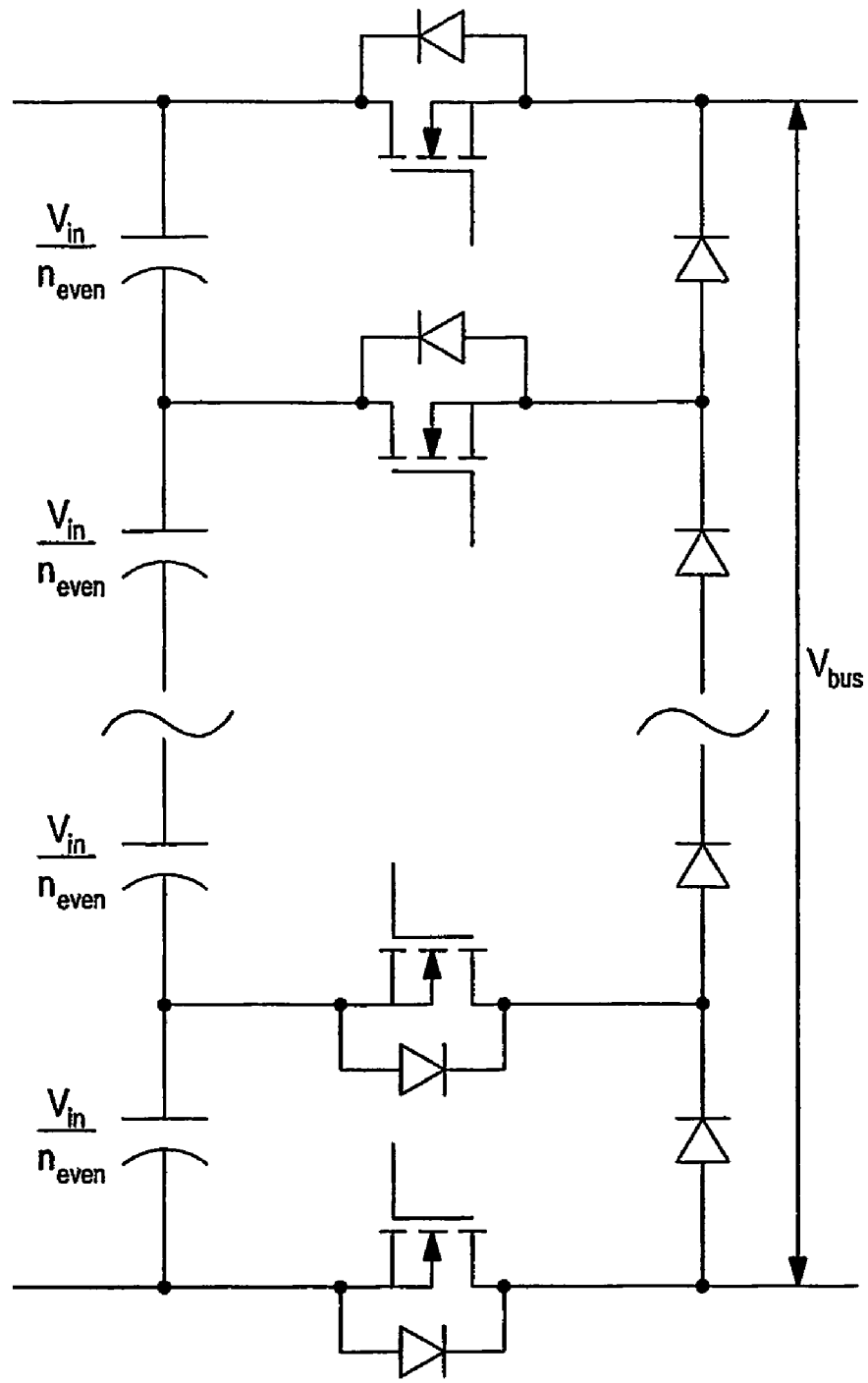
FIG. 22c is a schematic diagram of the switch cell of FIG. 22a generalized for ($n_{even}$+1) levels.

FIGS. 22a–22c depict alternative embodiments 2200a–2200c of the three-level switch cell 1021. FIG. 22a depicts the four-level switch cell 2200a, which operates like the switch cell 1021, with the exception that it is now possible to create $V_{bus}=V_{in}$, $V_{bus}=2V_{in}/3$, $V_{bus}=V_{in}/3$, or $V_{bus}=0$ volts.

Specifically, suppose that, in the first ⅓ cycle, the switching elements 2201 and 2204 are on and the switching elements 2202–2203 are off. Then $V_{bus}=V_{in}$. Next, the switching element 2204 is turned off, and the diodes 2207–2206 conduct, while the diode 2205 blocks current and remains off. Current flows from the diode 2207 to the diode 2206, and through the body diode of the switching element 2202. Thus, $V_{2214}=V_{2209}=2V_{in}/3$, and therefore $V_{bus}=V_{in}/3$. Assume that the electrical elements 2210–2212 are capacitors. Then, the capacitor $C_{2210}$ discharges, while the capacitors $C_{2211}$ and $C_{2212}$ charge.

In the second ⅓ cycle, the switching element 2204 is turned on again, so that both of the switching elements 2201 and 2204 are on. Full voltage is applied, and $V_{bus}=V_{in}$. Next, the switching elements 2201 and 2204 are both turned off, and the switching elements 2202–2203 are turned on at the same time. The diodes 2207 and 2205 conduct. One third of the input voltage is applied, $V_{bus}=V_{in}/3$. The capacitors 2210–2212 are charged.

In the third ⅓ cycle, the switching elements 2202–2203 are turned off while the switching elements 2201 and 2204 are turned on at the same time. Full voltage is applied, and $V_{bus}=V_{in}$. Next, the switching element 2201 turns off. The diodes 2205–2206 conduct, making $V_{bus}=V_{in}/3$. The capacitor 2212 discharges, and the capacitors 2210–2211 are charged.

Provided the operation as described above is symmetric, the capacitors will maintain charge balanced. If the electrical elements are not capacitors, then charge balance is unimportant. Finally, if the switching elements 2201–2204 are turned off, then $V_{bus}=0$ volts.

The switch cell 2200b of FIG. 22b generalizes the switch cell 2200a of FIG. 22a for the case where there are $n_{odd}$ electrical elements, in which $n_{odd}$ is an odd number. The switch cell 2200c of FIG. 22c comprises the generalized ($n_{even}+1$) level switching cell, in which $n_{even}$ is an even number.

All of the switching cells 2200a–2200c of FIGS. 22a–22c can be used in the same manner as the three-level switching cell 1021 of FIG. 10. For example, they can be directly connected to any DC-DC converter, or they can be connected to an LC filter to form a general (n+1) level switch cell buck converter like the converter 1400 (see FIG. 14). This n-level switch cell buck converter can then be connected to any DC-DC converter like the converters 1900 and 2000 (see FIGS. 19–20).

It will further be appreciated by those of ordinary skill in the art that modifications to and variations of the above-described DC-DC converters providing reduced deadtime may be made without departing from the inventive concepts disclosed herein. Accordingly, the invention should not be viewed as limited except as by the scope and spirit of the appended claims.

What is claimed is:

1. A DC-DC power converter, comprising:
   first and second input terminals;
   at least one electrical element connected to at least one of the first and second input terminals, the at least one electrical element being operative, in the event a first voltage is applied across the first and second input terminals, to provide a second voltage having a value between the first voltage value and a reference voltage value;
   at least one transformer having at least one primary winding and at least one secondary winding;
   a switch assembly including a plurality of switching elements, the switch assembly being operatively connected to the first input terminal, the second input terminal, the electrical element, and the transformer primary winding, wherein the switch assembly is operative, in the event the first voltage is applied across the first and second input terminals, to switchably apply the first voltage, the second voltage, and the reference voltage, across the transformer primary winding to generate at least one third voltage across the transformer secondary winding;
   a plurality of output terminals; and
   a rectifier connected between the transformer secondary winding and the output terminals.

2. The DC-DC power converter of claim 1 further including a filter connected between the rectifier and the output terminals.

3. The DC-DC power converter of claim 1 wherein the electrical element is selected from the group consisting of a capacitor, a battery, a solar cell, and a second DC-DC power converter.

4. The DC-DC power converter of claim 1 wherein the switch assembly comprises:
   first and second switching elements each having a first connection and a second connection, wherein the first connection of the first switching element is connected to the first input terminal, the second connection of the first switching element is connected to the first connection of the second switching element, and the second connection of the second switching element is connected to the second input terminal;
   third and fourth switching elements each having a first connection and a second connection, wherein the first connection of the third switching element is connected to the first input terminal, the second connection of the third switching element is connected to the first connection of the fourth switching element, and the second connection of the fourth switching element is connected to the second input terminal; and
   wherein a first connection of the transformer primary winding is connected to the second connection of the first switching element, and a second connection of the transformer primary winding is connected to the second connection of the third switching element.

5. The DC-DC power converter of claim 4 wherein the switch assembly further includes a fifth switching element having a first connection and a second connection, wherein the first connection of the fifth switching element is connected to a first connection of the at least one electrical element, and the second connection of the fifth switching element is connected to the first connection of the transformer primary winding.

6. The DC-DC power converter of claim 1 wherein the at least one electrical element includes first and second electrical elements each having a first connection and a second connection, wherein the first connection of the first electrical element is connected to the first input terminal, the second connection of the first electrical element is connected to the first connection of the second electrical element, and the second connection of the second electrical element is connected to the second input terminal.

7. The DC-DC power converter of claim 6 wherein the first and second electrical elements comprise respective capacitors.

8. The DC-DC power converter of claim 5 wherein the fifth switching element includes a plurality of switching sub-elements.

9. The DC-DC power converter of claim 1 further including at least one inductor, the inductor and the transformer primary winding being serially connected, and wherein the switch assembly is operative, in the event the first voltage is applied across the first and second input terminals, to switchably apply the first voltage, the second voltage, and the reference voltage across the inductor and the transformer primary winding.

10. The DC-DC power converter of claim 9 wherein at least one of the plurality of switching elements is operative to provide the Zero Voltage Switching (ZVS) property.

11. The DC-DC power converter of claim 1 wherein the transformer includes first and second primary windings each having a first connection and a second connection, and the switch assembly comprises:
    first and second switching elements, the first switching element and the first transformer primary winding being connected across the first and second input terminals and forming a first node, and the second switching element and the second transformer primary winding being connected across the first and second input terminals and forming a second node; and
    third and fourth switching elements, the third switching element being connected across a first connection of the electrical element and the first node, and the fourth switching element being connected across the first connection of the electrical element and the second node.

12. The DC-DC power converter of claim 11 further including a filter connected between the rectifier and the output terminals.

13. The DC-DC power converter of claim 11 wherein each of the third and fourth switching elements comprise a respective plurality of switching sub-elements.

14. The DC-DC power converter of claim 11 wherein the transformer includes first and second secondary windings.

15. The DC-DC power converter of claim 1 further comprising a first transformer and a second transformer each including a primary winding and a secondary winding, each of the primary and secondary windings having a first connection and a second connection, and the switch assembly comprises:
    first and second switching elements, the first switching element and the primary winding of the first transformer being connected across the first and second input terminals and forming a first node, and the second switching element and the primary winding of the second transformer being connected across the first and second input terminals and forming a second node; and
    third and fourth switching elements, the third switching element being connected across a first connection of the electrical element and the first node, and the fourth switching element being connected across the first connection of the electrical element and the second node.

16. The DC-DC power converter of claim 15 further including a filter connected between the rectifier and the output terminals.

17. A method of operating a DC-DC power converter, comprising the steps of:
    in the event a first voltage is applied across first and second input terminals of the DC-DC power converter, providing a second voltage having a value between the first voltage value and a reference voltage value by at least one electrical element connected to at least one of the first and second input terminals;
    switchably applying the first voltage, the second voltage, and the reference voltage across a primary winding of a transformer by a switch assembly, thereby generating at least one third voltage across a secondary winding of the transformer, the switch assembly being operatively connected to the first input terminal, the second input terminal, the electrical element, and the transformer primary winding; and
    providing the at least one third voltage to a rectifier by the transformer secondary winding, thereby generating a fourth rectified voltage at output terminals of the DC-DC power converter.

18. The method of claim 17 further including the step of providing the fourth rectified voltage to a filter by the rectifier, the filter being disposed between the rectifier and the output terminals.

19. The method of claim 17 wherein the first providing step includes providing the second voltage by the at least one electrical element, the electrical element being selected from the group consisting of a capacitor, a battery, and a second DC-DC power converter.

20. The method of claim 17 wherein the applying step includes switchably applying at least the first voltage and the second voltage across the transformer primary winding by the switch assembly, wherein the first voltage has a minimum value and a maximum value, the first voltage maximum value being less than or equal to two times the first voltage minimum value, and wherein the switch assembly includes a plurality of switching elements, the respective switching elements operating according to at least one predetermined duty ratio to allow the DC-DC power converter to operate with no deadtime.

21. The method of claim 17 wherein the applying step includes switchably applying the first voltage, the second voltage, and the reference voltage across the transformer primary winding by the switch assembly, wherein the first voltage has a minimum value and a maximum value, the first voltage maximum value being greater than two times the first voltage minimum value, and wherein the switch assembly includes a plurality of switching elements, the respective switching elements operating according to at least one predetermined duty ratio to allow the DC-DC power converter to operate with a predetermined amount of deadtime.

22. The method of claim 17 wherein the applying step includes switchably applying the first voltage, the second voltage, and the reference voltage across the transformer primary winding and at least one inductor, the transformer primary winding and the at least one inductor being serially connected.

23. The method of claim 22 wherein the applying step includes switchably applying the first voltage, the second voltage, and the reference voltage across the transformer primary winding and the at least one inductor, the first voltage, the second voltage, and the reference voltage being switchably applied while satisfying the Zero Voltage Switching (ZVS) property in at least one of a plurality of switching elements included in the switch assembly.

24. A DC-DC power converter, comprising:
a switch assembly including
first and second input terminals,
at least one electrical element connected to at least one of the first and second input terminals, the at least one electrical element being operative, in the event a first voltage is applied across the first and second input terminals, to provide a second voltage having a value between the first voltage value and a reference voltage value,
first and second output terminals, and
a switch subassembly including a plurality of switching elements, the switch subassembly being operatively connected to the first input terminal, the second input terminal, and the electrical element, wherein the switch subassembly is operative, in the event the first voltage is applied across the first and second input terminals, to switchably apply the first voltage, the second voltage, and the reference voltage across the first and second output terminals; and
a second DC-DC power converter operatively connected to the first and second output terminals of the switch assembly, the second DC-DC power converter being configured to receive the first voltage, the second voltage, and the reference voltage applied across the first and second output terminals, and to generate at least one third voltage.

25. The DC-DC power converter of claim 24 wherein the electrical element is selected from the group consisting of a capacitor, a battery, a solar cell, and a third DC-DC power converter.

26. The DC-DC power converter of claim 24 wherein the switch assembly comprises:
first and second switching elements each having a first connection and a second connection, the first connection of the first switching element being connected to the second connection of the second switching element to form a first node, and the first node being connected to a first connection of the electrical element;
third and fourth switching elements, the third switching element being connected between the first input terminal and the second connection of the first switching element, and the fourth switching element being connected between the second input terminal and the first connection of the second switching element; and
wherein the second connection of the first switching element and the first connection of the second switching element are connected to the first and second output terminals, respectively.

27. The DC-DC power converter of claim 26 wherein the first and second switching elements comprise respective diodes.

28. The DC-DC power converter of claim 26 wherein the at least one electrical element includes first and second electrical elements, the first and second electrical elements being serially connected to form the first connection of the at least one electrical element.

29. The DC-DC power converter of claim 28 wherein the first and second electrical elements comprise respective capacitors.

30. The DC-DC power converter of claim 24 wherein the second DC-DC power converter comprises an isolated DC-DC power converter.

31. The DC-DC power converter of claim 30 wherein the isolated DC-DC power converter comprises a dual-ended power converter.

32. The DC-DC power converter of claim 31 wherein the dual-ended power converter is selected from the group consisting of a full-bridge converter, a half-bridge converter, and a push-pull converter.

33. The DC-DC power converter of claim 30 wherein the isolated DC-DC power converter comprises a dual-forward converter.

34. The DC-DC power converter of claim 30 wherein the isolated DC-DC power converter includes at least one primary winding, at least one secondary winding, and at least one inductor operatively coupled to the primary winding.

35. The DC-DC power converter of claim 30 wherein the isolated DC-DC power converter comprises a current-fed DC-DC power converter.

36. The DC-DC power converter of claim 35 wherein the current-fed DC-DC power converter is selected from the group consisting of a current-fed half-bridge DC-DC converter, a current-fed full-bridge DC-DC converter, a current fed push-pull DC-DC converter, and a current fed dual-forward converter.

37. The DC-DC power converter of claim 30 wherein the isolated DC-DC power converter comprises a single-ended converter.

38. A method of operating a DC-DC power converter, comprising the steps of:
in the event a first voltage is applied across first and second input terminals of a switch assembly, providing a second voltage having a value between the first voltage value and a reference value by at least one electrical element included in the switch assembly;
switchably applying the first voltage, the second voltage, and the reference voltage across first and second output terminals of the switch assembly by a switch subassembly, the switch subassembly including a plurality of switching elements and being operatively connected to the first input terminal, the second input terminal, and the electrical element;
receiving the first voltage, the second voltage, and the reference voltage applied across the first and second output terminals of the switch assembly by a second DC-DC power converter; and
generating at least one third voltage by the second DC-DC power converter.

39. The method of claim 38 wherein the providing step includes providing the second voltage by the at least one electrical element, the electrical element being selected from the group consisting of a capacitor, a battery, and a third DC-DC power converter.

40. The method of claim 38 wherein the receiving and generating steps include receiving the first voltage, the second voltage, and the reference voltage, and generating the at least one third voltage, by the second DC-DC power converter, the second DC-DC power converter comprising an isolated DC-DC power converter.

41. The method of claim 40 wherein the receiving and generating steps include receiving the first voltage, the second voltage, and the reference voltage, and generating the at least one third voltage, by the isolated DC-DC power converter, the isolated DC-DC power converter comprising a dual-ended power converter.

42. The method of claim 38 wherein the applying step includes switchably applying at least the first voltage and the second voltage across the first and second output terminals of the switch assembly, wherein the first voltage has a minimum value and a maximum value, the first voltage maximum value being less than or equal to two times the first voltage minimum value, and wherein the respective switching elements operate according to at least one predetermined duty ratio to allow the DC-DC power converter to operate with no deadtime.

43. The method of claim 38 wherein the applying step includes switchably applying the first voltage, the second voltage, and the reference voltage across the first and second output terminals of the switch assembly, wherein the first voltage has a minimum value and a maximum value, the first voltage maximum value being greater than two times the first voltage minimum value, and wherein the respective switching elements operate according to at least one predetermined duty ratio to allow the DC-DC power converter to operate with a predetermined amount of deadtime.

44. A DC-DC power converter, comprising:
a switch assembly including
first and second input terminals,
at least one electrical element connected to at least one of the first and second input terminals, the at least one electrical element being operative, in the event a first voltage is applied across the first and second input terminals, to provide a second voltage having a value between the first voltage value and a reference voltage value,
first and second output terminals, and
a switch subassembly including a plurality of switching elements, the switch subassembly being operatively connected to the first input terminal, the second input terminal, and the electrical element, wherein the switch subassembly is operative, in the event the first voltage is applied across the first and second input terminals, to switchably apply the first voltage, the second voltage, and the reference voltage across the first and second output terminals; and
a filter operatively connected to the first and second output terminals of the switch assembly, the filter being configured to receive the switchably applied first, second, and reference voltages, and to generate at least one third filtered voltage.

45. The DC-DC power converter of claim 44 further including a second DC-DC power converter operatively connected to the filter, the second DC-DC power converter being configured to receive the at least one third filtered voltage, and to generate at least one fourth voltage.

46. The DC-DC power converter of claim 44 wherein the electrical element is selected from the group consisting of a capacitor, a battery, and a third DC-DC power converter.

47. The DC-DC power converter of claim 44 wherein the switch assembly comprises:
first and second switching elements each having a first connection and a second connection, the first connection of the first switching element being connected to the second connection of the second switching element to form a first node, and the first node being connected to a first connection of the electrical element; third and fourth switching elements, the third switching element being connected between the first input terminal and the second connection of the first switching element, and the fourth switching element being connected between the second input terminal and the first connection of the second switching element; and
wherein the second connection of the first switching element and the first connection of the second switching element are connected to the first and second output terminals, respectively.

48. The DC-DC power converter of claim 47 wherein the first and second switching elements comprise respective diodes.

49. The DC-DC power converter of claim 47 wherein the at least one electrical element includes first and second electrical elements, the first and second electrical elements being serially connected to form the first connection of the at least one electrical element.

50. The DC-DC power converter of claim 49 wherein the first and second electrical elements comprise respective capacitors.

51. The DC-DC power converter of claim 44 wherein the second DC-DC power converter comprises an isolated DC-DC power converter.

52. The DC-DC power converter of claim 51 wherein the isolated DC-DC power converter comprises a dual-ended power converter.

53. The DC-DC power converter of claim 52 wherein the dual-ended power converter is selected from the group consisting of a full-bridge converter, a half-bridge converter, a dual-forward converter, and a push-pull converter.

54. The DC-DC power converter of claim 51 wherein the isolated DC-DC power converter comprises a dual-forward converter.

55. The DC-DC power converter of claim 51 wherein the isolated DC-DC power converter includes at least one primary winding, at least one secondary winding, and at least one inductor operatively coupled to the primary winding.

56. The DC-DC power converter of claim 51 wherein the isolated DC-DC power converter comprises a current-fed DC-DC power converter.

57. The DC-DC power converter of claim 56 wherein the current-fed DC-DC power converter is selected from the group consisting of a current-fed half-bridge DC-DC converter, a current-fed full-bridge DC-DC converter, a current fed push-pull DC-DC converter, and a current fed dual-forward converter.

58. The DC-DC power converter of claim 51 wherein the isolated DC-DC power converter comprises a single-ended converter.

59. A method of operating a DC-DC power converter, comprising the steps of:
in the event a first voltage is applied across first and second input terminals of a switch assembly, providing a second voltage having a value between the first voltage value and a reference value by at least one electrical element included in the switch assembly;
switchably applying the first voltage, the second voltage, and the reference voltage across first and second output terminals of the switch assembly by a switch subassembly, the switch subassembly including a plurality of switching elements and being operatively connected to the first input terminal, the second input terminal, and the electrical element;

receiving the first voltage, the second voltage, and the reference voltage applied across the first and second output terminals of the switch assembly by a filter; and generating at least one third filtered voltage by the filter.

60. The method of claim 59 further including the steps of receiving the at least one third filtered voltage by a second DC-DC power converter; and
generating at least one fourth voltage by the second DC-DC power converter.

61. The method of claim 59 wherein the providing step includes providing the second voltage by the at least one electrical element, the electrical element being selected from the group consisting of a capacitor, a battery, and a third DC-DC power converter.

62. The method of claim 59 wherein the second receiving step includes receiving the at least one third filtered voltage by the second DC-DC power converter, the second DC-DC power converter comprising an isolated DC-DC power converter.

63. The method of claim 62 wherein the second receiving step includes receiving the at least one third filtered voltage by the isolated DC-DC power converter, the isolated DC-DC power converter comprising a dual-ended power converter.

64. The method of claim 62 wherein the second receiving step includes receiving the at least one third filtered voltage by the isolated DC-DC power converter, the isolated DC-DC power converter comprising a dual forward converter.

65. The method of claim 59 wherein the applying step includes switchably applying at least the first voltage and the second voltage across the first and second output terminals of the switch assembly, wherein the first voltage has a minimum value and a maximum value, the first voltage maximum value being less than or equal to two times the first voltage minimum value, and wherein the respective switching elements operate according to at least one predetermined duty ratio to allow the DC-DC power converter to operate with no deadtime.

66. The method of claim 60 wherein the applying step includes switchably applying at least the first voltage and the second voltage across the first and second output terminals of the switch assembly, and wherein the respective switching elements operate according to at least one predetermined duty ratio to allow the DC-DC power converter to operate with no deadtime.

67. The method of claim 59 wherein the applying step includes switchably applying the first voltage, the second voltage, and the reference voltage across the first and second output terminals of the switch assembly, wherein the first voltage has a minimum value and a maximum value, the first voltage maximum value being greater than two times the first voltage minimum value, and wherein the respective switching elements operate according to at least one predetermined duty ratio to allow the DC-DC power converter to operate with a predetermined amount of deadtime.

* * * * *

UNITED STATES PATENT AND TRADEMARK OFFICE
CERTIFICATE OF CORRECTION

PATENT NO.      : 6,995,987 B2
APPLICATION NO. : 10/499937
DATED           : February 7, 2006
INVENTOR(S)     : Wei Song et al.

It is certified that error appears in the above-identified patent and that said Letters Patent is hereby corrected as shown below:

Column 6, line 50, "to to" should read --$t_0$ to--;

Column 7, line 6, "$I_{111}$" should read --$i_{111}$--;

Column 12, line 40, "LR" should read --$L_R$--; and

Column 23, line 1, "2100 a" should read --2100*a*--.

Signed and Sealed this

Nineteenth Day of September, 2006

JON W. DUDAS
*Director of the United States Patent and Trademark Office*